US006937832B2

(12) United States Patent
Sato et al.

(10) Patent No.: US 6,937,832 B2
(45) Date of Patent: Aug. 30, 2005

(54) PROCESS CARTRIDGE, MOUNTABLE TO AN IMAGE FORMING APPARATUS, HAVING FIRST CONTACT PORTION TO BE GUIDED BY A GUIDE WHEN MOUNTED AND SECOND CONTACT PORTION TO LIMIT CARTRIDGE ROTATION OR MOVEMENT WHEN MOUNTED, AND IMAGE FORMING APPARATUS MOUNTING SUCH A PROCESS CARTRIDGE

(75) Inventors: Minoru Sato, Shizuoka-Ken (JP); Satoshi Kurihara, Shizuoka-Ken (JP); Yoshiyuki Batori, Shizuoka-Ken (JP); Masanari Morioka, Shizuoka-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/417,078

(22) Filed: Apr. 17, 2003

(65) Prior Publication Data

US 2003/0235429 A1 Dec. 25, 2003

(30) Foreign Application Priority Data

Apr. 17, 2002 (JP) ........................................ 2002/114990

(51) Int. Cl.[7] .............................................. G03G 21/16
(52) U.S. Cl. ...................................................... 399/111
(58) Field of Search ................................ 399/107, 110, 399/111, 167

(56) References Cited

U.S. PATENT DOCUMENTS

| 5,331,373 A | 7/1994 | Nomura et al. | |
|---|---|---|---|
| 5,452,056 A | 9/1995 | Nomura et al. | |
| 5,528,341 A | 6/1996 | Shishido et al. | |
| 5,585,889 A | 12/1996 | Shishido et al. | |
| 5,689,772 A | 11/1997 | Fujiwara et al. | 399/106 |
| 5,768,660 A | 6/1998 | Kurihara et al. | 399/111 |
| 5,870,654 A | 2/1999 | Sato et al. | 399/109 |
| 5,911,096 A | 6/1999 | Batori et al. | 399/111 |
| 5,920,753 A | 7/1999 | Sasaki et al. | 399/111 |
| 5,930,562 A | 7/1999 | Noda et al. | 399/114 |
| 5,937,237 A | 8/1999 | Nonaka et al. | 399/106 |
| 5,940,658 A | 8/1999 | Yokoi et al. | 399/119 |
| 5,943,529 A | 8/1999 | Miyabe et al. | 399/111 |
| 5,966,566 A | 10/1999 | Odagawa et al. | 399/109 |
| 5,974,288 A | 10/1999 | Sato | 399/119 |
| 6,075,957 A | 6/2000 | Batori et al. | 399/114 |

(Continued)

FOREIGN PATENT DOCUMENTS

| JP | 2-42454 | 2/1990 |
|---|---|---|
| JP | 11-102105 | 4/1999 |

OTHER PUBLICATIONS

Patent Abstracts of Japan, vol. 14, No. 201 (P–1041), Apr. 24, 1990 (JP–2–42454).

*Primary Examiner*—Sandra L. Brase
(74) *Attorney, Agent, or Firm*—Fitzpatrick, Cella, Harper & Scinto

(57) ABSTRACT

A process cartridge is detachably mountable to a main assembly of an electrophotographic. The cartridge includes a photosensitive drum; a process device; and a first contact portion provided on a bottom surface of a cartridge frame provided at one longitudinal. The first contact portion is guided by a first assembly side guide when the cartridge is mounted. The cartridge also includes a cartridge coupling disposed above the first portion, the coupling being engageable with an assembly side coupling to receive a rotational force from the assembly; and a second contact portion disposed behind the first portion with respect to the mounting direction. The second portion limits rotation of the cartridge. The cartridge also includes; a positioning portion projected outwardly and provided at the other longitudinal end of the drum, the positioning portion being guided by a second assembly side guide, and being positioned to a second assembly side receiving portion.

21 Claims, 32 Drawing Sheets

U.S. PATENT DOCUMENTS

| | | | |
|---|---|---|---|
| 6,088,555 A | * 7/2000 | Mizuno | 399/111 X |
| 6,101,348 A | 8/2000 | Nonaka et al. | 399/103 |
| 6,104,894 A | 8/2000 | Sato et al. | 399/106 |
| 6,131,007 A | 10/2000 | Yamaguchi et al. | 399/256 |
| 6,137,971 A | 10/2000 | Sasaki et al. | 399/106 |
| 6,137,973 A | 10/2000 | Nishiuwatoko et al. | 399/111 |
| 6,141,508 A | 10/2000 | Sasaki et al. | 399/27 |
| 6,144,398 A | * 11/2000 | Yokoyama et al. | 399/111 X |
| 6,169,866 B1 | * 1/2001 | Watanabe et al. | 399/111 |
| 6,169,867 B1 | 1/2001 | Kurihara | 399/123 |
| 6,185,390 B1 | 2/2001 | Higeta et al. | 399/90 |
| 6,188,856 B1 | 2/2001 | Sato | 399/119 |
| 6,226,476 B1 | * 5/2001 | Miyabe et al. | 399/111 |
| 6,275,668 B1 | 8/2001 | Batori | 399/90 |
| 6,334,035 B1 | 12/2001 | Abe et al. | 399/106 |
| 6,363,226 B1 | 3/2002 | Batori | 399/8 |
| 6,381,420 B1 | 4/2002 | Sato et al. | 399/27 |
| 2002/0064391 A1 | 5/2002 | Sato | 399/103 |
| 2002/0122672 A1 | 9/2002 | Sasago et al. | 399/12 |
| 2002/0131790 A1 | 9/2002 | Sato et al. | 399/111 |
| 2002/0159779 A1 | 10/2002 | Morioka et al. | 399/27 |
| 2003/0002883 A1 | 1/2003 | Sato et al. | 399/102 |

* cited by examiner (a)

(b)

PROCESS CARTRIDGE, MOUNTABLE TO AN IMAGE FORMING APPARATUS, HAVING FIRST CONTACT PORTION TO BE GUIDED BY A GUIDE WHEN MOUNTED AND SECOND CONTACT PORTION TO LIMIT CARTRIDGE ROTATION OR MOVEMENT WHEN MOUNTED, AND IMAGE FORMING APPARATUS MOUNTING SUCH A PROCESS CARTRIDGE

FIELD OF THE INVENTION AND RELATED ART

The present invention relates to a process cartridge removably mountable in an electrophotographic image forming apparatus, and an electrophotographic image forming apparatus.

Here, an electrophotographic image forming apparatus is an apparatus which forms an image on a recording medium with the use of an electrophotographic-image-forming method. Examples of an electrophotographic image forming apparatus include an electrophotographic copying machine, an electrophotographic printer (for example, a laser printer, an LED printer, etc.), a facsimile machine, a wordprocessor, a combination of two or more of the preceding apparatuses (a multifunction printer, etc.), etc.

A process cartridge is: a cartridge in which a charging means, a developing means or a cleaning means, and an electrophotographic photoconductive member, are integrally disposed, and which is removably mountable in the main assembly of an image forming apparatus; a cartridge in which a minimum of one among a charging means, a developing means, and cleaning means, and an electrophotographic photoconductive member, are integrally disposed, and which is removably mountable in the main assembly of an image forming apparatus; or a cartridge in which a minimum of a developing apparatus and an electrophotographic photoconductive member are integrally disposed, and which is removably mountable in the main assembly of an image forming apparatus.

A process-cartridge system, which has an electrophotographic photoconductive member, and a single or a plurality of processing means which act on the electrophotographic photoconductive member, integrally disposed in a cartridge removably mountable in the main assembly of an image forming apparatus, has long been employed by an electrophotographic image forming apparatus which uses an electrophotographic-image-forming process. According to a process-cartridge system, an apparatus can be maintained by a user him/herself; it is unnecessary to hire a service person. Thus, the employment of a cartridge system drastically improves the operational efficiency of the apparatus. Therefore, a cartridge system has been widely used in the field of an image forming apparatus.

In order to obtain an image of good quality with the use of an electrophotographic image forming apparatus employing a process-cartridge system, it is essential that the process cartridge is properly mounted in a predetermined position within the main assembly of the electrophotographic image forming apparatus, and also that the various electrical contacts, driving-force transmitting portions, etc., on the cartridge side are correctly connected to their counterparts on the main-assembly side of the image forming apparatus; it is essential that the two sides are correctly interfaced.

FIG. 31 shows a process cartridge CR, and FIG. 32 shows a process-cartridge mounting guide GL of the main assembly PR of an image forming apparatus. FIG. 33 shows an image forming apparatus employing the process cartridge CR.

Referring to FIGS. 31–33, in order to guide the process cartridge CR and accurately position the process cartridge CR in the image-forming-apparatus main assembly PR when mounting the process cartridge CR into the image-forming-apparatus main assembly PR or removing it therefrom, the process cartridge CR is provided with a positioning boss CB, the axial line of which coincides with the axial line of the photoconductive drum, as an electrophotographic photoconductive member, in the process cartridge CR, whereas the image-forming-apparatus main assembly is provided with a process-cartridge mounting guide GL, which guides the process cartridge CR by the positioning boss CB thereof. As a user inserts the process cartridge CR to a predetermined point in the image-forming-apparatus main assembly PR, along the process-cartridge mounting guide GL, the process cartridge CR comes into contact with the stopper portion P of the image-forming-apparatus main assembly PR, being thereby prevented from further rotating about the axial line of the positioning boss CB. Apparatuses having the above-described structure have been put to practical use.

The present invention is a result of further technical developments of the above-described prior art.

SUMMARY OF THE INVENTION

A primary object of the present invention is to provide a combination of a process cartridge and an electrophotographic image forming apparatus employing a process-cartridge system, in which the cartridge is more reliably mounted into, or dismounted from, the main assembly of the image forming apparatus.

Another object of the present invention is to provide a combination of a process cartridge and an electrophotographic image forming apparatus employing a process-cartridge system, in which the process cartridge is more accurately positioned relative to the main assembly of the image forming apparatus when the process cartridge is mounted into the main assembly.

Another object of the present invention is to provide a combination of a process cartridge and an electrophotographic image forming apparatus employing a process-cartridge system, in which the process cartridge remains more stable when the process cartridge is mounted into the main assembly.

Another object of the present invention is to provide:

a process cartridge removably mountable in the main assembly of an electrophotographic image forming apparatus, comprising:

an electrophotographic photoconductive drum;

a single or a plurality of processing means which act on the photoconductive drum;

a first contact portion which: is a part of one of the end portions, in terms of the lengthwise direction of the photoconductive drum, of the bottom surface of a cartridge-supporting frame for supporting the photoconductive drum; is guided by a first cartridge-guiding portion of the apparatus main assembly of the image forming apparatus, when the process cartridge is mounted into the proper cartridge position in the apparatus main assembly; is located on the front side in terms of the direction in which the process cartridge is inserted into the proper cartridge position in the main assembly; and is caught and supported by a first catching and supporting portion of the apparatus main assembly, when the process cartridge is mounted into the proper cartridge position in the apparatus main assembly;

a coupler, which: is located above the first contact portion; coupler with the coupler of the apparatus main assembly to receive a rotational driving force; and accurately positions the photoconductive drum;

a second contact portion, which: is a part of one of the end portions, in terms of the lengthwise direction of the photoconductive drum, of the bottom surface of the cartridge-supporting frame for supporting the photoconductive drum; is located on the rear side with respect to the first contact portion, in terms of the cartridge-mounting direction; and prevents the process cartridge from rotating in the rotational direction of the photoconductive drum more than a predetermined angle, when the process cartridge receives the rotational driving force from the apparatus main assembly after the proper mounting of the process cartridge into the apparatus main assembly; and a positioning portion, which: is on the outward side of one of the lengthwise ends, in terms of the lengthwise direction of the photoconductive drum, of the cartridge-supporting frame for supporting the photoconductive drum; is guided by a second cartridge-guiding portion of the apparatus main assembly, when the process cartridge is mounted into the proper position in the apparatus main assembly; and is accurately positioned by a second catching and supporting portion of the apparatus main assembly, when the process cartridge is mounted into the proper cartridge position in the apparatus main assembly, and, an electrophotographic image forming apparatus in which the above described process cartridge is removably mountable.

Another object of the prevent invention is to provide:

a process cartridge removably mountable in the main assembly of an electrophotographic image forming apparatus, comprising:

an electrophotographic photoconductive drum;

a single or a plurality of processing means which act on the photoconductive drum;

a first contact portion, which: is a part of one of the end portions, in terms of the lengthwise direction of the photoconductive drum, of the bottom surface of a cartridge-supporting frame for supporting the photoconductive drum; is guided by a first cartridge-guiding portion of the apparatus main assembly of an image forming apparatus, when the process cartridge is mounted into the proper cartridge position in the apparatus main assembly; is on the front side in terms of the direction in which the process cartridge is inserted into the proper cartridge position in the main assembly; and is caught and supported by a first catching and supporting portion of the apparatus main assembly, when the process cartridge is mounted into the proper cartridge position in the apparatus main assembly; and a second contact portion which is on the rear side with respect to the first contact portion in terms of the cartridge-mounting direction; is a part of the cartridge-supporting frame; and comes into contact with the counterpart of the apparatus main assembly to prevent the process cartridge from being moved by the pressure generated by transferring means of the apparatus main assembly, as the transferring means and photoconductive drum are pressed against each other, after the proper mounting of the process cartridge into the apparatus main assembly, and, an electrophotographic image forming apparatus in which the above described process cartridge is removably mountable.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Hereinafter, a combination of a process cartridge and an electrophotographic image forming apparatus, in accordance with the present invention, will be described in more detail with reference to the appended drawings.

In the following description of the present invention, the lengthwise direction of a process cartridge is the direction intersecting (roughly perpendicular) the direction in which a process cartridge is mounted into, or removed from, the main assembly of an image forming apparatus. It is parallel to the surface of a recording medium, and intersects (roughly perpendicular) the direction in which the recording medium is conveyed. The right or left direction is the right or left direction of the recording medium as the recording medium is seen from the rear side in terms of the recording-medium conveyance direction. The top surface of a process cartridge is the surface of the process cartridge which will be on the top side after the proper mounting of the process cartridge in the main assembly of an image forming apparatus, and the bottom surface of the process cartridge is the surface of the process cartridge which will be on the bottom side after the proper mounting of the process cartridge in the apparatus main assembly.

Figure 1:
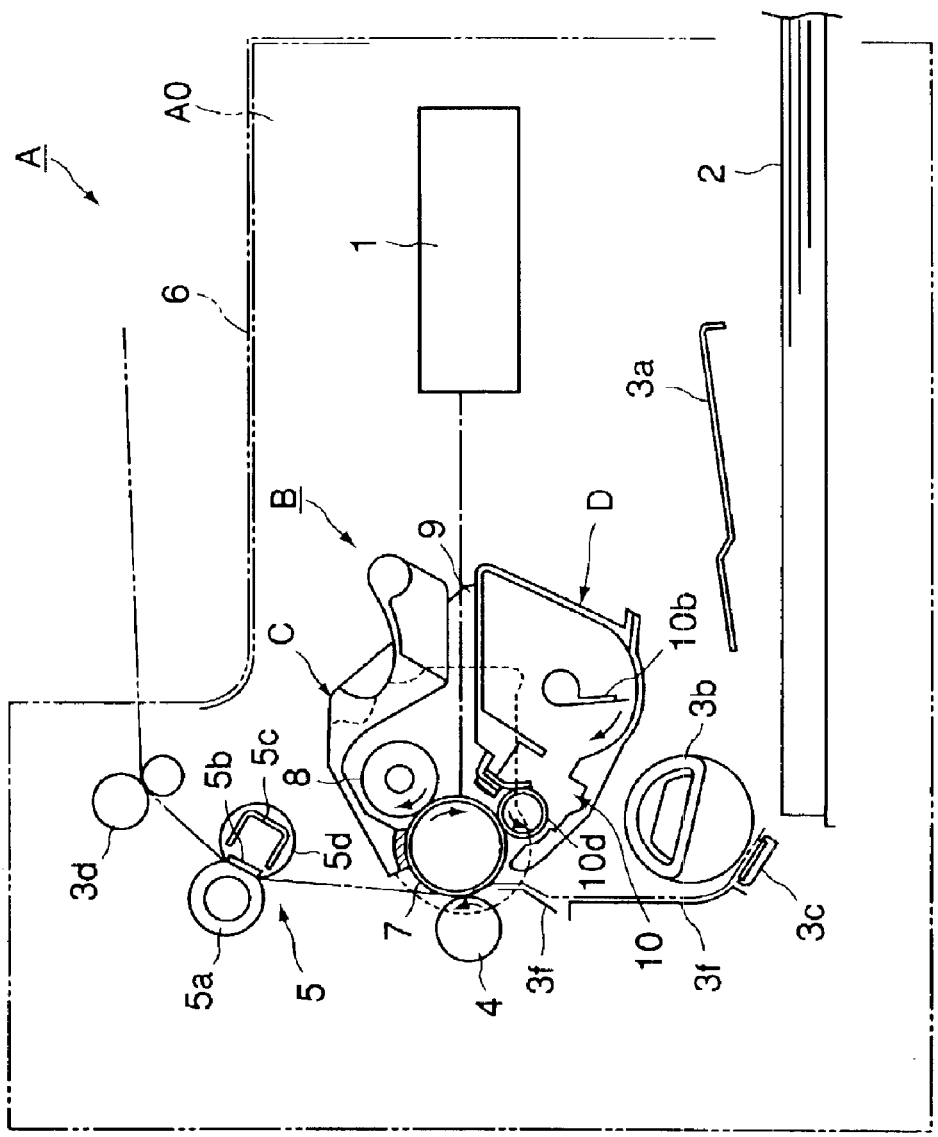
FIG. 1 is a schematic sectional view of the image forming apparatus in one of the preferred embodiments of the present invention, in which a process cartridge in accordance with the present invention has been properly mounted, describing the general structure thereof.
Figure 2:
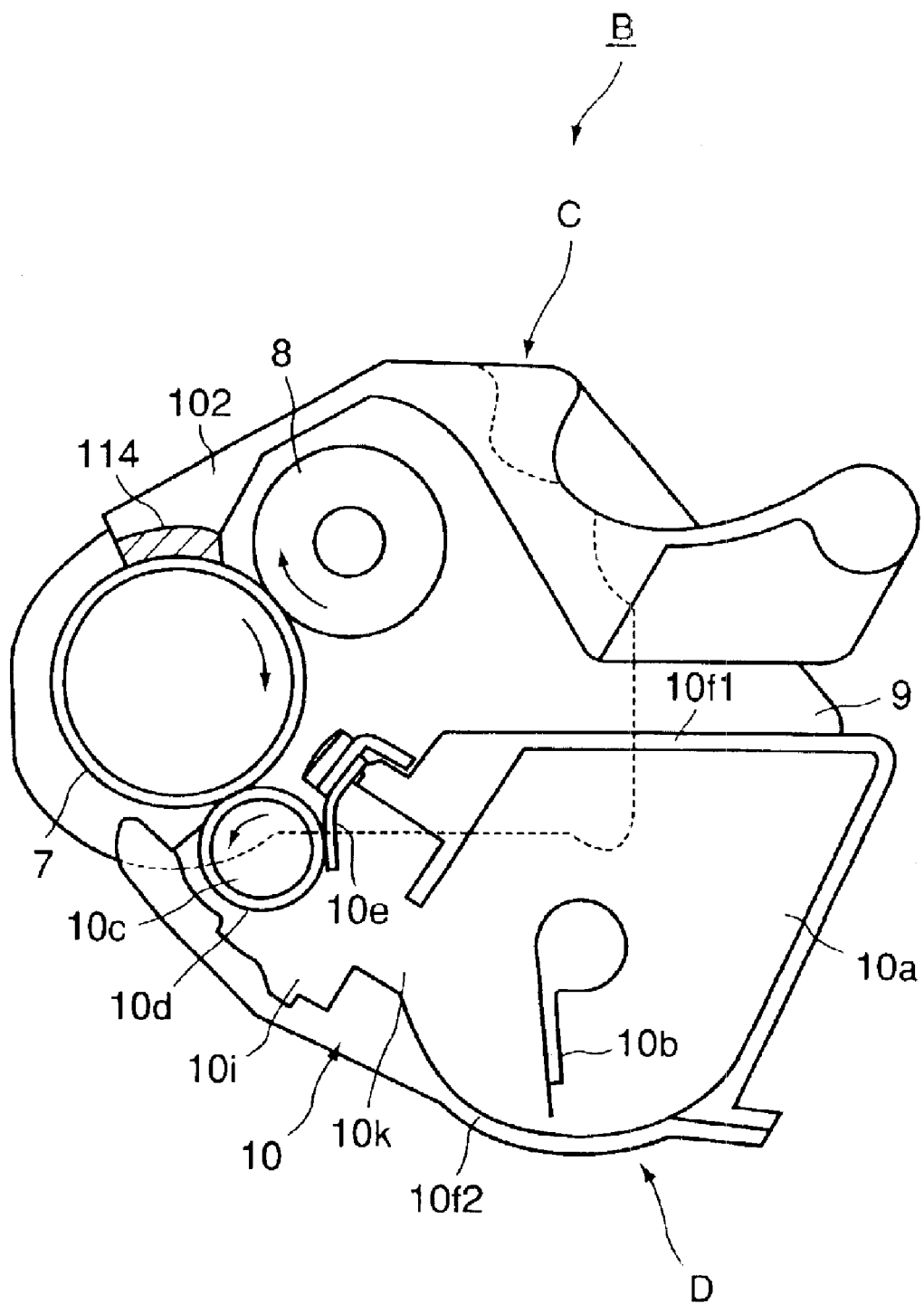
FIG. 2 is a schematic sectional view of the process cartridge in the preferred embodiment of the present invention, illustrating the structure thereof.
Figure 3:
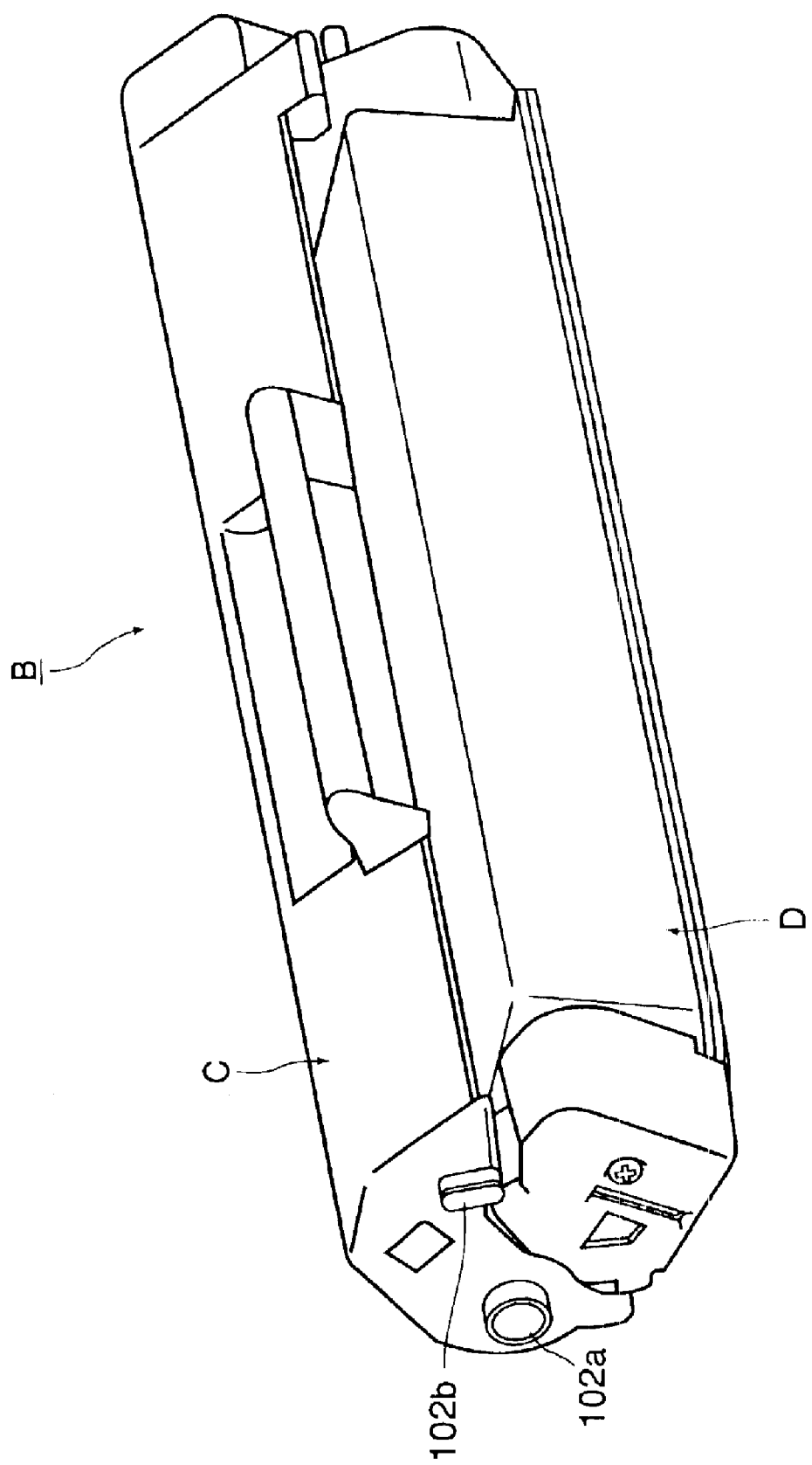
FIG. 3 is a perspective view of the process cartridge in accordance with the present invention shown in FIG. 2.

FIG. 1 shows one of the preferred embodiments of an electrophotographic image forming apparatus in accordance with the present invention. In this embodiment, a process cartridge B, shown in FIG. 2, is removably mountable in this electrophotographic image forming apparatus. FIG. 1 is a schematic drawing for illustrating the structure of this electrophotographic image forming apparatus, which is properly holding the process cartridge B shown in FIG. 2. FIG. 2 is a schematic drawing for illustrating the structure of the process cartridge B.

As for the order of description, the general structure of the process cartridge B and the general structure of the electrophotographic image forming apparatus employing the process cartridge B will be first described. Then, the structure of the mechanism of the image-forming-apparatus main assembly for guiding the process cartridge B when the process cartridge B is mounted into, or removed from, the main assembly of the electrophotographic image forming apparatus will be described.

(General Structure)

Referring to FIG. 1, the electrophotographic image forming apparatus A (which hereinafter will be referred to simply as the "image forming apparatus") in this embodiment is a laser-beam printer, and has an electrophotographic photoconductive member 7 in the form of a drum (which hereinafter will be referred to simply as the "photoconductive drum"), as an image bearing member, which comprises an aluminum cylinder, and a photoconductive layer, that is, a layer of organic photoconductive substance, coated on the entirety of the peripheral surface of the aluminum cylinder.

A beam of light carrying image-formation information is projected onto the photoconductive drum 7 from an optical system 1, forming a latent image on the photoconductive drum 7. This latent image is developed into a toner image with the use of developer (which hereinafter may be referred to as "toner").

In synchronism with the formation of the toner image, a single or a plurality of sheets of a recording medium 2 in the sheet feeder cassette 3a are fed one by one into the apparatus main assembly by the combination of a pickup roller 3b, and a pressing member 3c kept pressed against the pickup roller 3b, and are conveyed further inward by a conveying means 3f.

The toner image formed on the photoconductive drum 7 in the process cartridge B is transferred onto the recording medium 2 by applying voltage to a transfer roller 4 as a transferring means. Then, the recording medium 2 is conveyed to a fixing means 5 by the conveying means 3f.

The fixing means 5 comprises: a driving roller 5a, a heater 5b, a supporting member 5c, and a rotational fixing member 5d. The rotational fixing member 5d is a cylinder formed of a sheet of a certain substance, and is supported by the supporting member 5c. The heater 5b is in the hollow of the rotational fixing member 5d. The fixing means 5 fixes the unfixed toner image on the recording medium 2 to the recording medium 2, by the application of heat and pressure to the recording medium 2 while the recording medium 2 is passed through the fixing means 5. After the fixation, the recording medium 2 is further conveyed and discharged into the delivery area 6, by a pair of discharge rollers 3d.

(Process Cartridge)

On the other hand, the process cartridge B comprises an electrophotographic photoconductive member 7, and a minimum of one processing means. As for the processing means, there are, for example, a charging means 8 for charging the electrophotographic photoconductive member 7, and a developing means 10 for developing a latent image formed on the electrophotographic member.

Referring to FIGS. 1 and 2, the process cartridge B in this embodiment comprises the photoconductive drum 7, as an electrophotographic photoconductive drum, having a photoconductive layer, a charge roller 8 as a charging means, a developing means 10, and an exposure opening 9. In operation, while the photoconductive drum 7 is rotated, the peripheral surface of the photoconductive drum 7 is uniformly charged by the application of voltage to the charge roller 8, and the uniformly charged portion of the peripheral surface of the photoconductive drum 7 is exposed to an optical image projected from the optical system 1, forming a latent image. Then, the latent image is developed by the developing means 10.

The developing means 10 in this embodiment comprises a toner-storage developing means frame 10f1, a frame lid 10f2, a rotational toner-conveyance roller 10b as a toner-conveying means, a development roller 10d (in which a magnet 10c is stationarily disposed) as a rotational developing member, and a development blade 10e. The toner-storage developing-means frame 10f1 and the frame lid 10f2 are joined, creating a toner chamber (toner storage) 10a in which toner (magnetic single-component developer) is stored, and a development chamber 10i. In operation, the toner in the toner chamber 10a is sent out into the development chamber 10i through the opening (toner passage) 10k of the toner-storage developing-means frame 10f1, by the toner-conveyance roller 10b. In the development chamber 10i, the development roller 10d is rotated, and a layer of triboelectrically charged toner is formed on the peripheral surface of the rotating development roller 10d. Then, the toner is transferred onto the peripheral surface of the photoconductive drum 7 from the toner layer on the development roller 10d, in the pattern of the latent image on the photoconductive drum 7, developing the latent image into a visual image, that is, a toner image.

Next, the toner image is transferred onto the recording medium 2 by the application of a voltage, opposite in polarity to the toner image, to a transfer roller 4. The transfer residual toner, that is, the toner remaining on the photoconductive drum 7 after the toner-image transfer, is recovered during the following rotational cycle of the photoconductive drum 7. More specifically, during the following rotational cycle of the photoconductive drum 7, the peripheral surface of the photoconductive drum 7 is charged by the charge roller 8 with the presence of the transfer residual toner on the peripheral surface of the photoconductive drum 7, and another latent image is formed on the peripheral surface of the photoconductive drum 7 by exposure, and then, the residual toner from the preceding rotational cycle of the photoconductive drum 7 is recovered by the fog-prevention bias (difference Vback between the potential level of the DC voltage applied to the developing apparatus and the surface-potential level of the photoconductive member) during the development of the latent image. In this embodiment, a cleaning means, such as a cleaning blade, for removing the transfer residual toner on the photoconductive drum 7, is not provided.

The process cartridge B, which will be described in more detail later, is removably mounted into the cartridge-mounting portion of the main portion, that is, the main assembly A0, of the image forming apparatus A, while being guided by the pair of guiding portions of the process cartridge B, which are located at the lengthwise ends of the process cartridge B, one for one.

The process cartridge B comprises a drum-holding frame 102, which is one of the main sections of the cartridge frame, and the toner-storage developing-means frame 10f1, which constitutes another of the main sections of the cartridge frame. The drum-holding frame 102 and the toner-storage developing-means frame 10f1 are joined to form a drum frame unit C and a development unit D.

(Drum Frame Unit C)

Referring to FIGS. 3–7, the drum frame unit C, and the various members, for example, the photoconductive drum 7, the charge roller 8, etc., making up the drum frame unit C, will be described.

Photoconductive Drum 7

Figure 5:
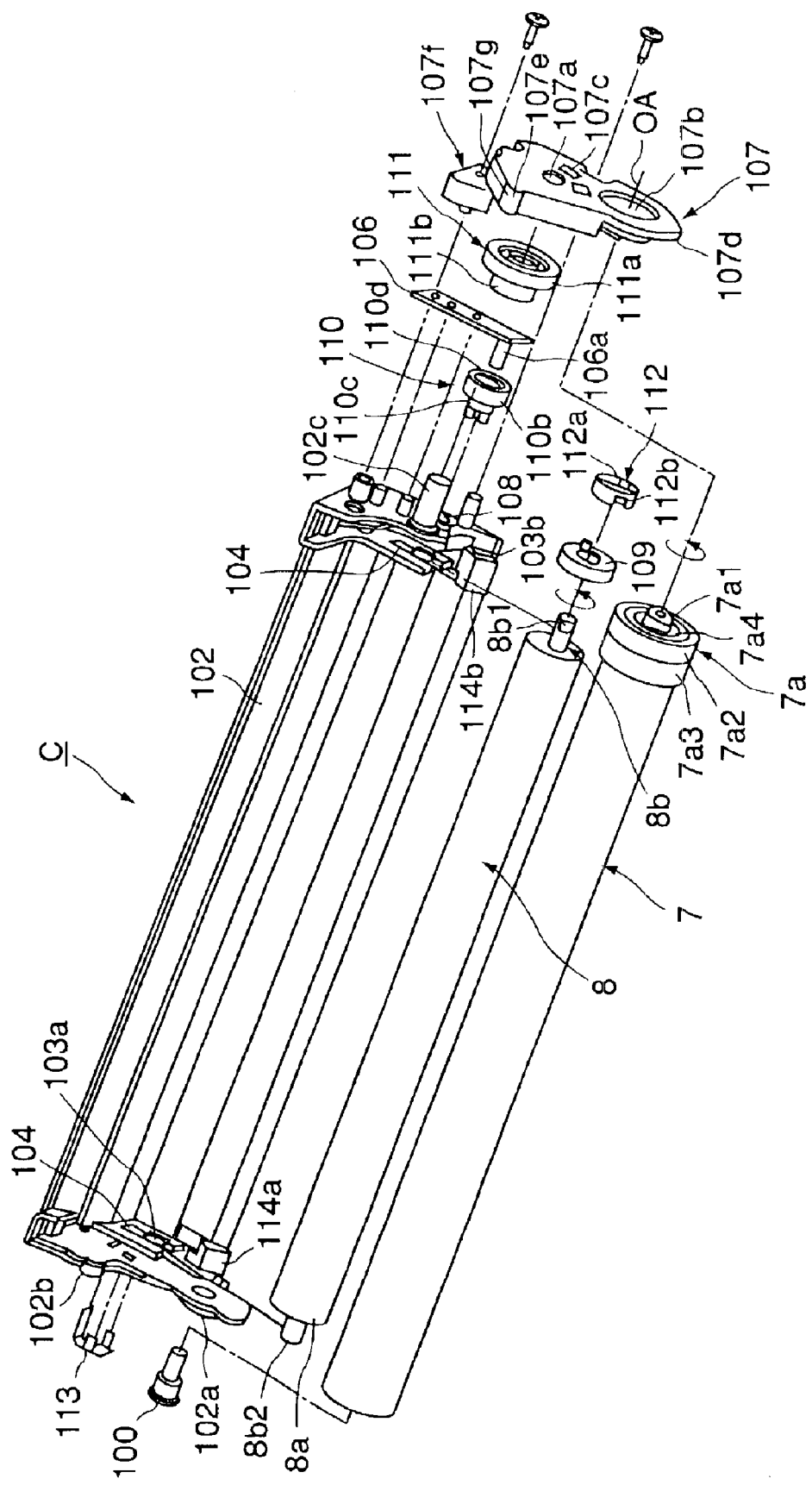
FIG. 5 is an exploded perspective view of the drum-frame unit of the process cartridge in accordance with the present invention.
Figure 6:
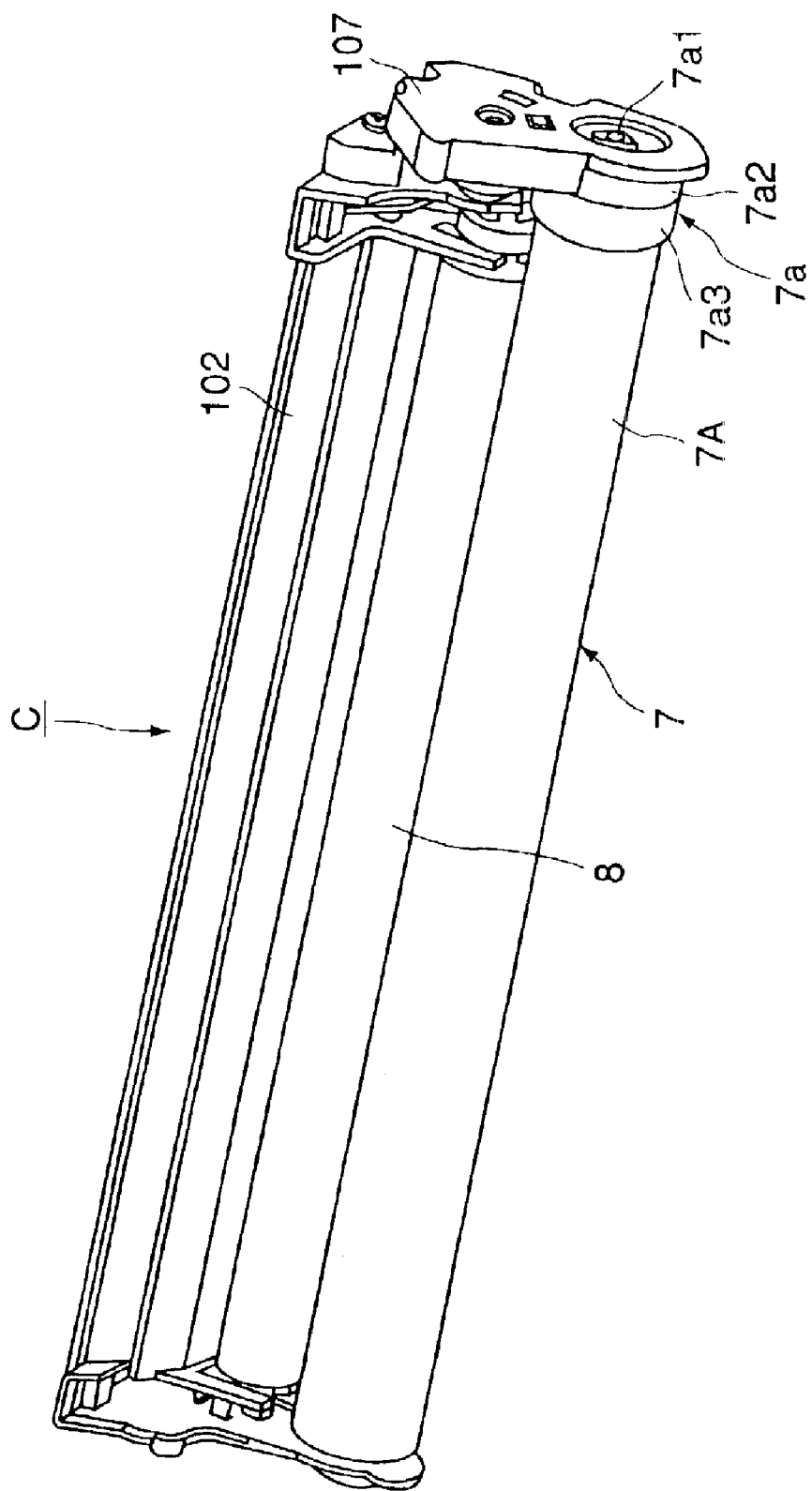
FIG. 6 is a perspective view of the drum-frame unit of the process cartridge in accordance with the present invention.

Referring to FIGS. 5 and 6, the photoconductive drum 7 is provided with a drum gear 7a, which is solidly attached to one of the lengthwise ends of the photoconductive drum 7. The drum gear 7a comprises a triangular coupling portion 7a1, a first helical gear portion 7a2, and a second helical gear portion 7a3. The triangular coupling portion 7a1 is a driving-force receiving portion by which the driving force from the image-forming-apparatus main assembly A0 is received, and is in the form of a twisted triangular pillar. The first helical gear portion 7a2 is a driving-force transmitting portion by which the driving force is transmitted to the charge roller 8. The second helical gear portion 7a3 is a driving-force transmitting portion by which the driving force is transmitted to the development unit D. Although not shown, to the other lengthwise end of the photoconductive drum 7, a flange is fixed, and to the flange, an electrode for grounding the photoconductive drum 7 is integrally attached.

The photoconductive drum 7, the charge roller 8, etc., are internally held by the drum-supporting frame 102. More specifically, one end of the photoconductive drum 7, from which the driving force is transmitted to the photoconductive drum 7, is rotatably supported by the drum-holding frame 102, with the interposition of a side holder 107 integrally comprising a drum bearing 107b, and the other end of the photoconductive drum 7 is rotatably supported by the drum-holding frame 102, with the interposition of the drum-supporting shaft 100. The diameter of the photoconductive drum 7 is in a range from 20 mm to 40 mm.

The second helical gear portion 7a3 of the drum gear 7a is located close to one of a pair of spacer rings 10m1 and 10m2 which determine the distance between the axes of the development roller 10d and the photoconductive drum 7. Therefore, the positional relationship, in terms of a pitch circle, between the second helical gear portion 7a3 and the development-roller gear 10n is precisely maintained.

Charge Roller 8

The charge roller 8 comprises a shaft 8b, and a contact portion 8a. The contact portion 8a is placed in contact with the photoconductive drum 7, and is an elastic member formed on the peripheral surface of the shaft 8b in a manner to wrap the shaft 8b. The measurement of the shaft 8b in its axial direction is greater than the measurement of the contact portion 8a in its axial direction, extending beyond both ends of the contact member 8a. The two portions extending from two ends of the contact portion 8a, one for one, will be referred to as shaft portions 8b1 and 8b2. The shaft 8b and the contact portion 8a constitute integral parts of the charge roller 8. The diameter of the charge roller 8 is in a range of 8–20 mm.

Between the peripheral surface of the photoconductive drum 7 and the peripheral surface of the contact portion 8a of the charge roller 8, a layer of electrically conductive microscopic particles is present. The electrically conductive microscopic particles used in this embodiment are microscopic zinc oxide particles (having a resistance of 1,500Ω·cm, and a permeability of 35%). They are formed by air-classifying the particles (secondary particles) created by applying pressure to particles (primary particles) of zinc oxide, the diameters of which are in a range of 0.1–0.3 μm. They are 1.5 μm in volume-average particle diameter. In terms of particle-size distribution, the particles no more than 0.5 μm in size constitute 35% of the volume, and particles no less than 5 μm in size constitute zero to several percentages of the volume.

Charge Roller Bearings 103a and 103b

The shaft portions 8b1 and 8b2 of the charge roller 8 are fitted with charge-roller bearings 103b and 103a, respectively, which are roughly C-shaped in cross section, and which are in contact with the shaft portions 8b1 and 8b2, respectively, by their internal surface, with respect to their C-shaped cross sections.

Further, the charge roller bearings 103a and 103b each have a locking portion (unshown) which engages with a part of the drum-supporting frame 102 in such a manner that enables the assembly comprising the charge roller 8 and charge-roller bearings 103a and 103b to move relative to the photoconductive drum 7.

Compression Coil Spring 104

Between the drum-supporting frame 102 and the pair of charge-roller bearings 103a and 103b, a pair of compression coil springs 104, as elastic members, are disposed, one for one. One end of the lengthwise ends of each compression coil spring 104 is fitted around the spring holder portion of the corresponding charge roller bearing 103a (103b), and the other end is fitted around the corresponding spring holder portion of the drum supporting frame 102. The charge roller 8 is kept pressed on the peripheral surface of the photoconductive drum 7 by these compression coil springs 104.

More specifically, in order to keep the theoretical amount of the penetration of the charge roller 8 into the photoconductive drum 7 at 0.2 mm, a pair of compression springs, each of which exerts an operational load of 340 gf, are disposed on the left and right sides, one for one. The spring constant of each compression coil spring 104 is equivalent to a compression amount of approximately 3 mm.

In this embodiment, the theoretical amount of the penetration of the charge roller 8 into the photoconductive drum 7 is controlled only by controlling the amount of the pressure applied by the pair of compression coil springs 104.

(Structure of Charge Roller Driving Mechanism)

Referring to FIGS. 5–12, the structure of the mechanism for driving the charge roller 8 will be described. FIGS. 7–12 describe the gear train of the process cartridge.

Drum Gear 7a

Figure 11:
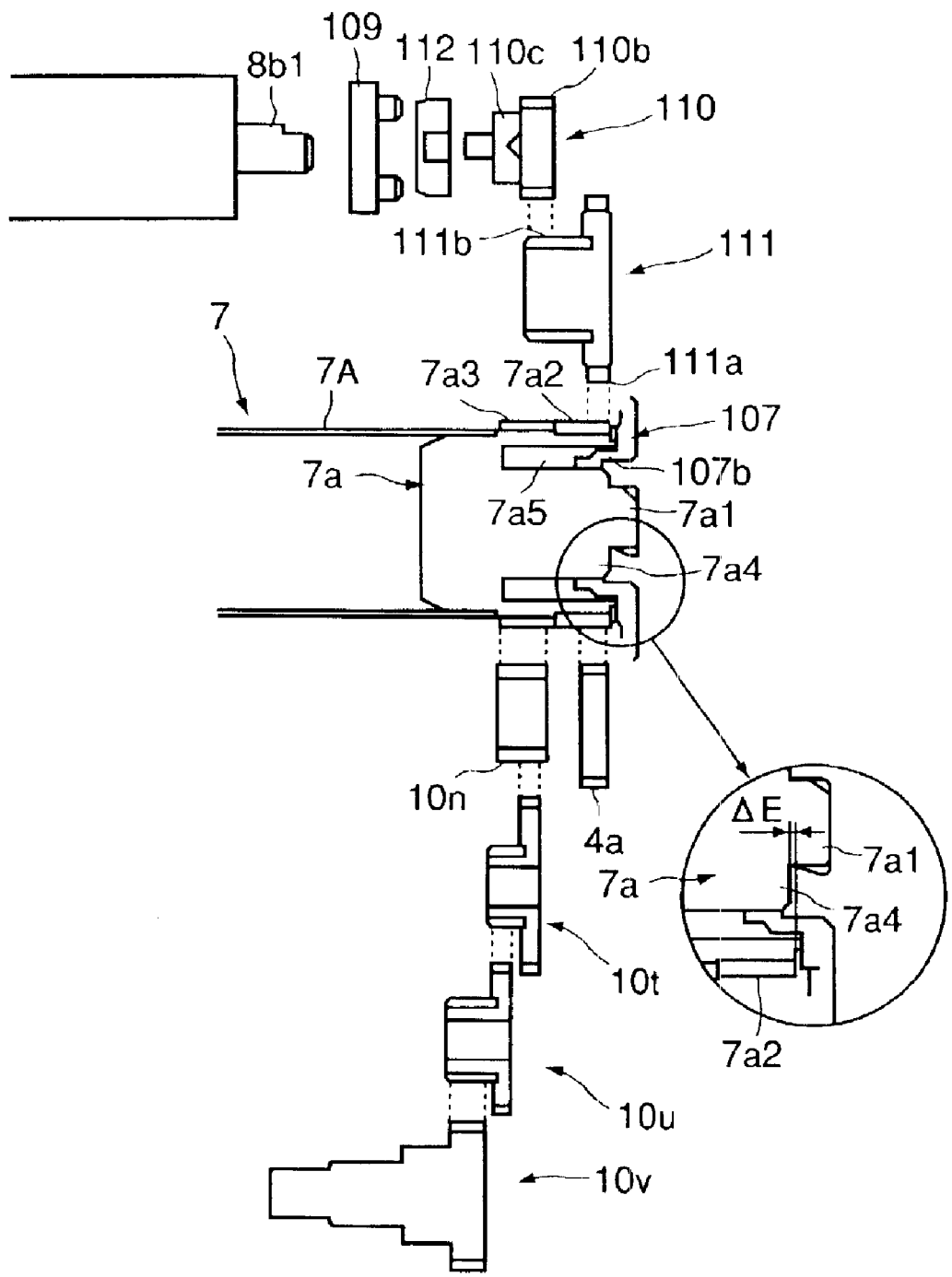
FIG. 11 is a schematic sectional view of the gear train of the process-cartridge driving mechanism shown in FIG. 10, illustrating the structure thereof.

Referring to FIG. 11, the photoconductive drum 7 in this embodiment comprises the drum cylinder 7A and the photoconductive layer coated on the entirety of the peripheral surface of the drum cylinder 7A. To one end of the drum cylinder 7A, a drum gear 7a is solidly attached. The drum gear 7a transmits the rotational driving force to the charge roller 8, and also to the transfer roller 4 and the development roller 10d.

The drum gear 7a is solidly attached to one end of the drum cylinder 7A, as described above, and its axial line coincides with that of the drum cylinder 7A. The drum gear 7a comprises the helical gear portions 7a2 and 7a3, and a shaft portion 7a4. The helical gear portions 7a2 and 7a3 are the gear-proper portions of the drum gear 7a, and are on the outward side of the drum cylinder 7A in terms of the axial direction of the drum cylinder 7A. The shaft portion 7a4 constitutes the center portion of the drum gear 7a, and overlaps the helical gear portions 7a2 and 7a3, in terms of the radial direction of the drum gear 7a. In other words, the helical gear portions 7a2 and 7a3 are cylindrical, and the shaft portion 7a4 is extended in the holes of the cylindrical, helical gear portions 7a2 and 7a3, with its axial line coinciding with those of the cylindrical, helical gear portions 7a2 and 7a3. Thus, there is a cylindrical gap 7a5 between the peripheral surface of the shaft portion 7a4 and the internal surfaces of the cylindrical, helical gear portions 7a2 and 7a3. This cylindrical space 7a5 constitutes the space into which the bearing portion 107b of the side holder 107 fits as the photoconductive drum 7 is attached to the cartridge frame (drum-holding frame 102), so that the shaft portion 7a4 is rotatably supported by the bearing portion 107b.

Figure 24:
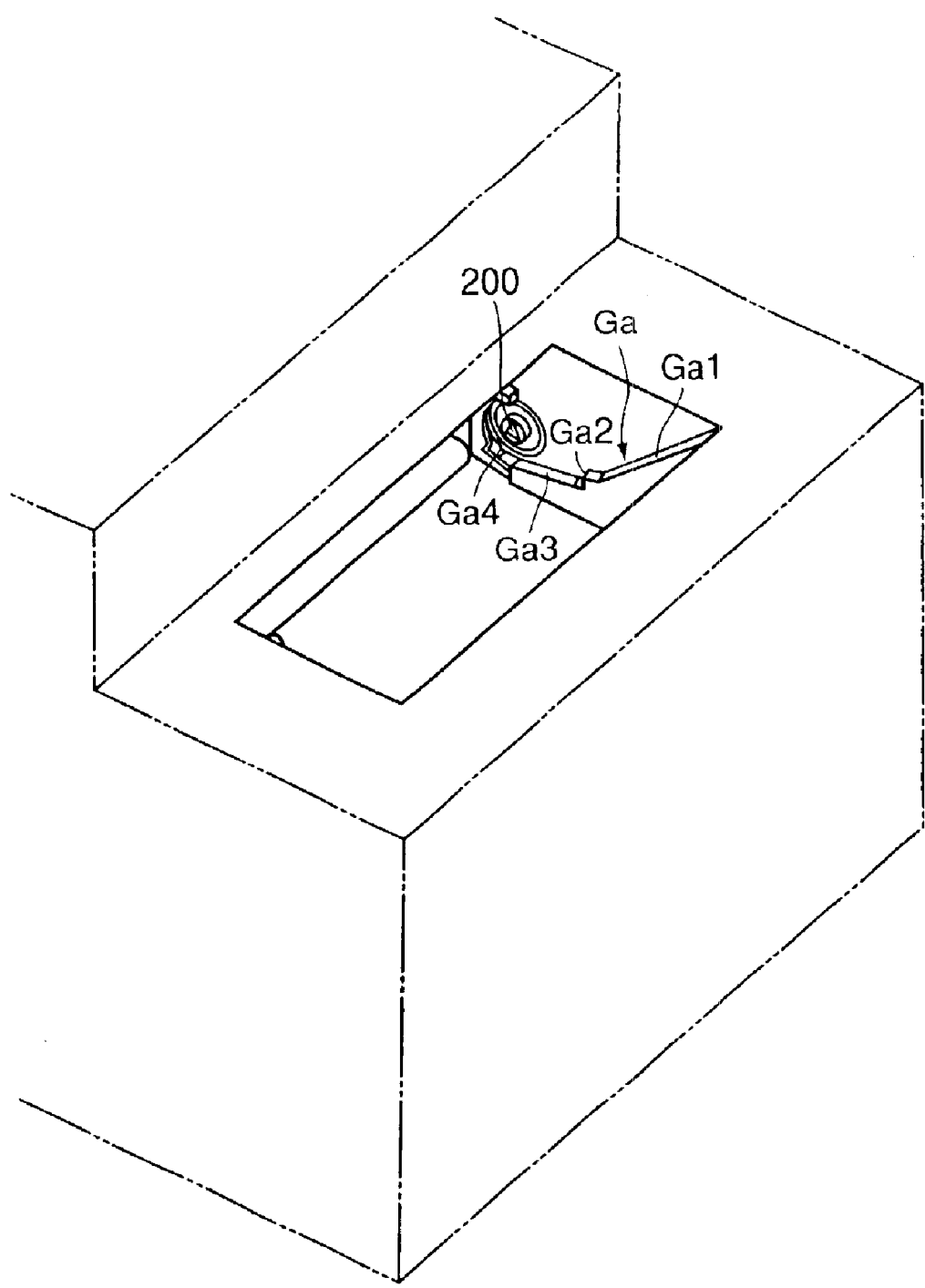
FIG. 24 is a perspective view of one of the cartridge-guiding portions of the image forming apparatus in the preferred embodiment of the present invention.

The drum gear 7a also comprises the triangular coupling portion 7a1, that is, a projection constituting the coupling means on the cartridge side, which projects from the outward end of the shaft portion 7a4. As the process cartridge B is mounted into the apparatus main assembly A0, this projection 7a1 engages the coupling means of the apparatus main assembly, that is, a driving-force transmitting member 200 (FIG. 24). More specifically, the driving-force transmitting member 200 has a roughly triangular recess, and the projection 7a1 fits into this recess to receive the rotational driving force from the apparatus main assembly A0. The projection 7a1 is twisted around its rotational axis, and its cross section, perpendicular to its rotational axis, is polygonal. The recess of the driving-force transmitting member 200 is twisted around the rotational axis of the driving-force transmitting member 200, and its cross section perpendicular to the rotational axis of the driving-force transmitting member 200, is polygonal.

The drum gear 7a in this embodiment is structured so that the end surface of the shaft portion 7a4 is on the inward side by an amount of Δ E relative to the outward end surface of the helical gear 7a, more specifically, the end surface of the helical gear portion 7a2. Thus, the projection 7a1 partially overlaps the helical gear portion 7a2 in terms of the radial direction of the helical gear 7a. With the provision of this structural arrangement, the drum gear 7a in this embodiment is wider in terms of its axial direction, being therefore superior, in terms of physical strength as well as meshing ratio, to a drum gear in accordance with the prior arts. Thus, it is possible to produce an excellent image.

Also with the provision of the above-described structural arrangement, the shaft portion 7a4 is rotationally supported by the bearing portion 107b of the side holder 107, which is in the cylindrical space 7a5 between the peripheral surface of the shaft portion 7a4 and the inward surface of the cylindrical gear-proper portions of the drum gear 7a. Therefore, the repulsive force resulting from the meshing of the gears is caught directly below the teeth of the gears, assuring that the repulsive force does not work in the direction to bend the photoconductive drum 7. Therefore, it is assured that the photoconductive drum 7 is rotationally driven in the preferable manner.

As described above, the drum gear 7a in this embodiment has the first helical gear portion 7a2, which is on the outward side in terms of the lengthwise direction of the cylinder 7A, and the second helical gear portion 7a3, which is on the inward side. The first and second helical gear portions 7a2 and 7a3 are disposed next to each other, with their rotational axes coinciding. In terms of the diameter at the tooth tip (that is, diameter at the root of the gorge), the first helical gear portion 7a2 is smaller than the second helical gear portion 7a3. With the provision of this structural arrangement, the optimal number of teeth can be selected for the drum gear 7a, in accordance with the optimal numbers of revolution of the development roller 10d and charge roller 8.

In this embodiment, the first and second helical gear portions 7a2 and 7a3 are made different in the direction of their twist. More specifically, as seen from the drum side, the first helical gear portion 7a2 is twisted rightward, whereas the second helical gear portion 7a3 is twisted leftward. Thus, as the photoconductive drum 7 in the process cartridge B in the image forming apparatus main assembly A0 is rotated, the first helical gear portion 7a2 pushes the gear, which is being driven by the helical gear portion 7a2, in the direction so as to be opposite from the location of the drum cylinder 7A, that is, in the inward direction with respect to the process cartridge B, whereas the second helical gear portion 7a3 pushes the gear, which is being driven by the helical gear portion 7a3, in the direction so as to be opposite from the location of the helical gear 7a, that is, in the outward direction with respect to the process cartridge B.

Also in this embodiment, the gear portion 110b of a geared coupler 110, which transmits the rotational driving force to the charge roller 8, is pushed in the direction to be opposite from the location of the gear portion 7a2 in terms of the lengthwise direction of the charge roller 8, that is, in the inward direction with respect to the process cartridge B.

Idler Gear 111

An idler gear 111 is a step gear having two gear portions 111a and 111b different in diameter, and is rotationally supported by the shaft 102c (FIG. 5), which is a part of the drum supporting frame 102. The end portion of the shaft 102c is supported by the side holder 107, being prevented from being broken off by the force resulting from the driving of the idler gear 111 by the gear meshing with the idler gear 111.

The two gear portions 111b and 111a of the idler gear 111 mesh with the gear portion 110b of the geared coupler 110, and the first helical gear portion 7a2 of the drum gear 7a, respectively, and transmit the rotational driving force from the drum gear 7a to the gear portion 110b of the geared coupler 110.

Geared Coupler 110

The geared coupler 110 has the aforementioned gear portion 110b, and a coupler proper portion 110a integral with the gear portion 110b. As will be evident from FIG. 9, the coupler proper portion 110a of the geared coupler 110 is shaped like a pair of parallel cylinders connected by a roughly rectangular plate placed between their peripheral surfaces. The pair of the cylindrical portions of the coupler proper portion 110a are symmetrical with respect to the rotational axis of the coupler proper portion 110a. The gear portion 110b of the geared coupler 110 meshes with the aforementioned idler gear 111 and transmits the rotational driving force.

As the rotational driving force is transmitted to the charge roller 8 through the geared coupler 110, the geared coupler 110 is subjected to a force generated in the direction perpendicular to the rotational axis of the geared coupler 110 by the idler gear 111 meshing with the gear portion 110b of the geared coupler 110. Thus, in order to minimize the effect of this force, it is desired that the geared coupler 110 is supported at both ends in terms of its axial direction. Therefore, the geared coupler 110 is provided with a shaft portion 110c having a predetermined diameter. The shaft portion 110c is between the coupler proper portion 110a and gear portion 110b, and its rotational axis coincides with that of the geared coupler 110. It is rotationally borne by the wall of a through hole 108 (FIG. 5) of the drum-supporting frame 102. As the process cartridge B is driven, the gear portion 110b is pushed in the inward direction with respect to the process cartridge B, as described above. Therefore, while the process cartridge B is driven, the inward lateral surface of the gear portion 110b of the geared coupler 110 remains in contact with the lip portion of the through hole 108, assuring that the charger roller 8 remains stable while it is rotationally driven.

Referring to FIG. 5, the geared coupler 110 is also provided with a hole 110d with a predetermined diameter, which is located on the side opposite to the shaft portion 110c in terms of the axial direction of the geared coupler 110. The geared coupler 110 is rotationally supported by the shaft portion 106a of a supporting member 106, which is attached to the drum-supporting frame 102, along with the side holder 107.

The geared coupler 110 also couples with the first coupling portion 112a of an intermediary coupler 112, and transmits the rotational driving force.

Intermediary Coupler 112

Figure 8:
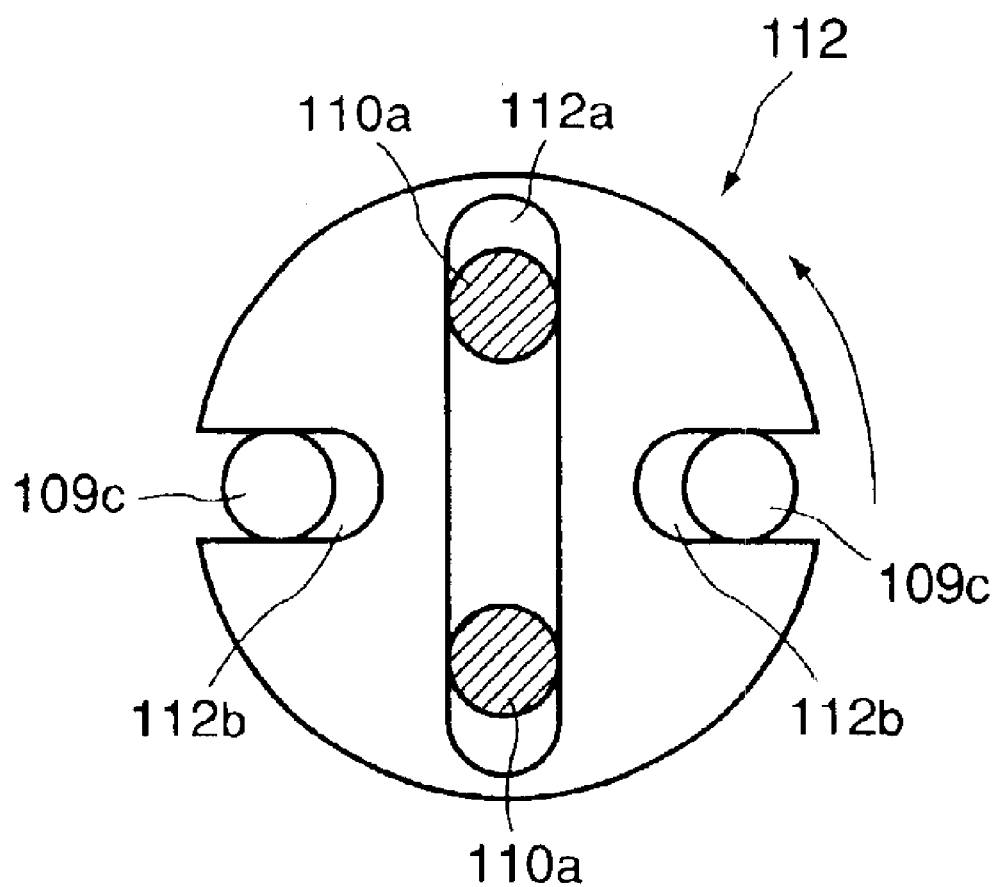
FIG. 8 is a plan view of the charge-roller driving means, describing the structure thereof

FIG. 8 is a sectional view of the coupled combination of the geared coupler 110, the intermediary coupler 112, and a coupler 109, illustrating how they are coupled. The drawing shows only the coupler proper portion 110a of the geared coupler 110, and only the coupler proper portion 109c of the coupler 109.

In FIG. 8, the coupler proper portion 110a is hatched in order to differentiate the coupler proper portion 110a from the coupler proper portion 109c.

Figure 9:
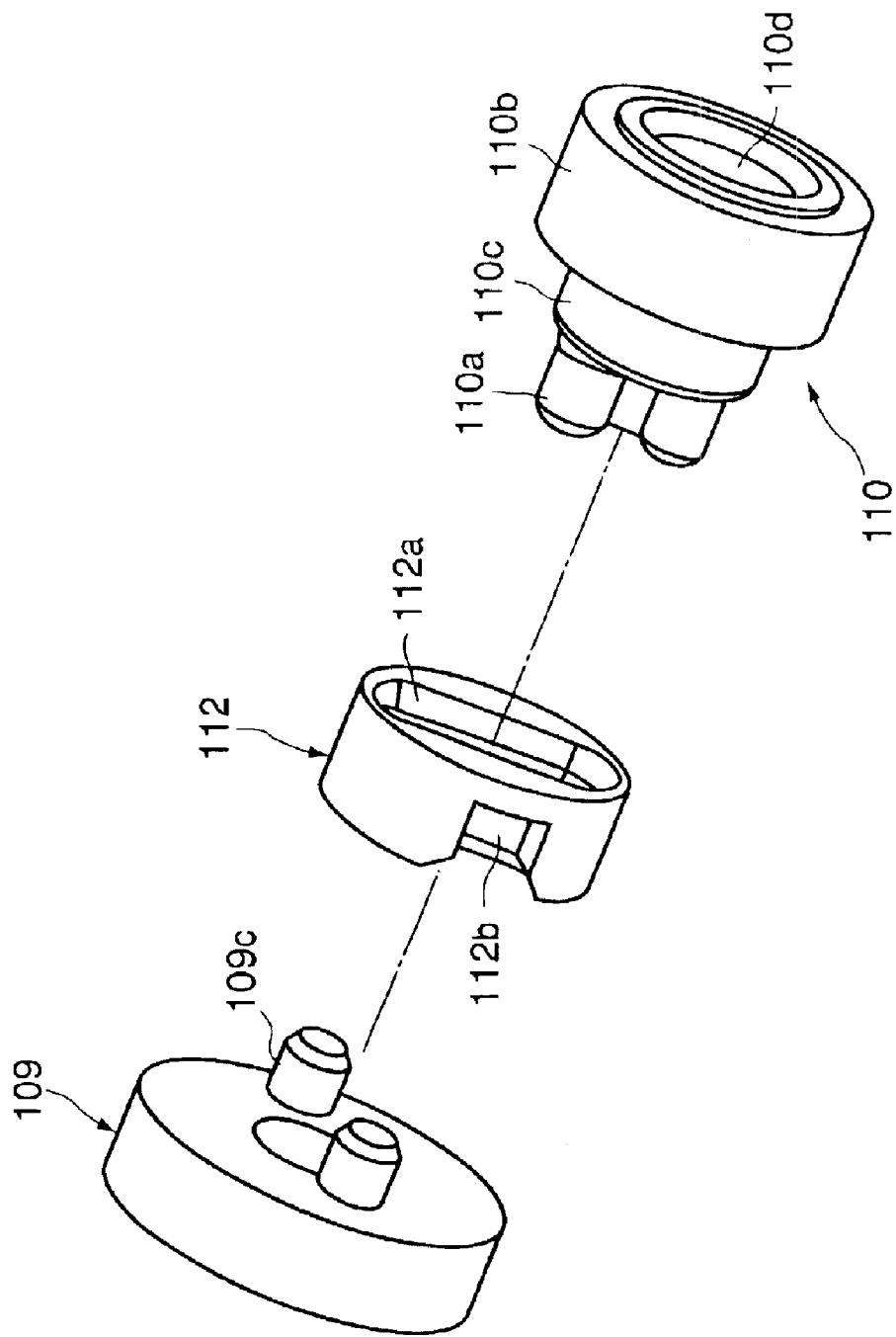
FIG. 9 is an exploded perspective view of the charge-roller driving means, illustrating the structure thereof.

Referring to FIG. 9, the intermediary coupler 112 is sandwiched between the coupler 109 and geared coupler 110. The intermediary coupler 112 has a second coupling portion 112b, which is on the coupler 109 side of the intermediary coupler 112, and a pair of first coupling portions 112a, which is on the geared coupler 110 side. The second coupling portion 112b is a hole elongated in a direction perpendicular to axial direction of the intermediary coupler 112, and into which the coupler proper portion 109c fits. Each of the pair of first coupling portions 112a is a hole open at the peripheral surface of the coupler 112, as well as one of the lateral surfaces of the coupler 112. Its bottom wall, in terms of the radial direction of the coupler 112, is rounded, and its bottom wall, in terms of the axial direction of the coupler 112, is flat. The pair of first coupling portions 112a are where the pair of coupler proper portions 110a of the geared coupler 110 fit one for one.

The first coupling portions 112b, in the form of an elongated hole, are symmetrical with respect to the rotational axis of the intermediary coupler 112, and the pair of the first coupling portions 112a, in the form of a groove, are symmetrically positioned relative to each other with respect to the axial line of the intermediary coupler 112. The first and second coupling portions 112a and 112b are positioned so that the center line of the first coupling portions 112a parallel to the lengthwise direction of the first coupling portion 112a, and the center line of each of the pair of second coupling portions 112b parallel to the lengthwise direction of the second coupling portions 112b, do not become parallel to each other, that is, the angle between them does not become zero; preferably, they are positioned so that the two lines become perpendicular to each other, as shown in FIG. 8.

Coupler 109

In order to receive the force for rotationally driving the charge roller 8, the charge roller 8 is provided with the coupler 109 as a driving-force receiving member, which is attached to one end of the shaft portion 8b1 of the charge roller 8. More specifically, one end of the shaft portion 8b1 of the charge roller 8 is given a D-shaped cross section, and is put through the D-shaped center hole of the coupler 109.

The coupler 109 has a pair of the coupler proper portions 109c in the form of a cylindrical projection, which are symmetrically positioned relative to each other with respective to the axial line of the coupler 109. These coupler proper portions 109c fit into the pair of second coupling portions 112b of the intermediary coupler 112, one for one, and receive the rotational driving force.

The first coupling portion 112a of the intermediary coupler 112 is in the form of an elongated hole. Therefore, while the intermediary coupler 112 and the geared coupler 110 are in the properly coupled state, that is, while the projection 110a is properly situated in the hole 112a, there is a certain amount of play between the end surface of the coupling portion 112a and the peripheral surface of the corresponding projection 110a, in terms of the lengthwise direction of the coupling portion 112a, allowing the projection 110a to slide in the lengthwise direction of the coupling portion 112a.

Further, the pair of second coupling portions 112b are in the form of a groove with an open end extending in the radial direction of the coupler 112. Therefore, while the intermediary coupler 112 and the coupler 109 are in the properly coupled state, in other words, while each projection 109c is properly situated in the corresponding hole 112b, there is a certain amount of play between the internal surface of the hole 112b and the peripheral surface of the corresponding projection 109c, allowing the projection 109c to slide in the lengthwise direction of the hole 112b.

As described above, the charge roller 8 is rotated in such a direction that in the contact area between the charge roller 8 and photoconductive drum 7, the peripheral surface of the charge roller 8 moves in the direction opposite to the direction in which the peripheral surface of the photoconductive drum 7 moves. Therefore they rub against each other, increasing the frequency at which a given point of the peripheral surface of the charge roller 8 (photoconductive drum 7) comes into contact with the peripheral surface of the photoconductive drum 7 (charge roller 8).

(Structure of Mechanism for Driving Development Roller 10d, Transfer Roller 4, and Toner-Conveyance Roller 10b)

Figure 10:
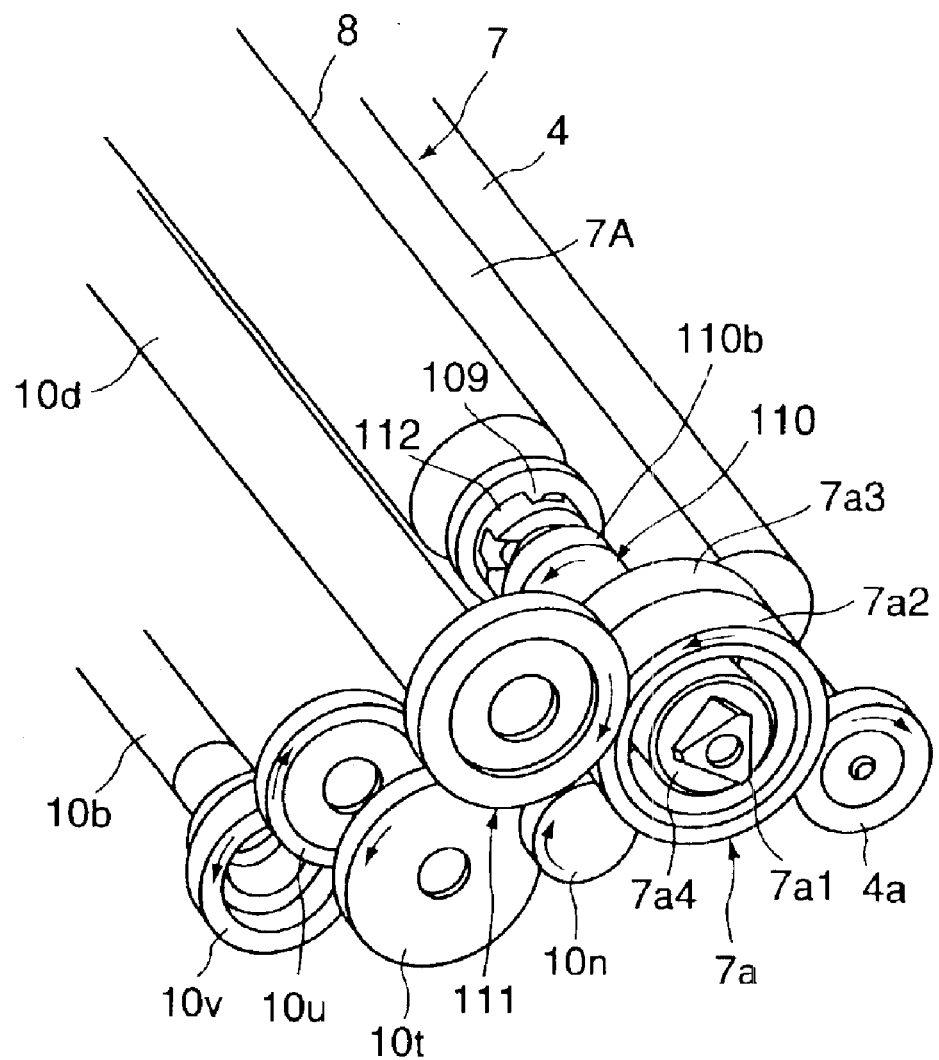
FIG. 10 is a perspective view of the process-cartridge driving mechanism, in the preferred embodiment of the present invention.

As described above, the drum gear 7a drives the charge roller 8 with the interposition of the idler gear 111 and the geared coupler 110. It also drives the development roller 10, the transfer roller 4, and the toner-conveying member (conveyance roller) 10b, as shown in FIG. 10.

As described above, the first helical gear portion 7a2 indirectly meshes, with the interposition of the idler gear 111, with the gear portion 110b of the geared coupler 110 attached to one end of the shaft of the charge roller 8, and transmits the rotational driving force to the charge roller 8. Further, the first helical gear portion 7a2 meshes with a gear 4a attached to one end of the shaft of the transfer roller 4, and transmits the rotational driving force to the transfer roller 4 at the same time as it transmits the rotational driving force to the charge roller 8.

The second helical gear portion 7a3 of the drum gear 7a meshes with the gear 10n attached to one end of the shaft of the development roller 10d, and rotationally drives the development roller 10d. Further, the gear 10n of the development roller 10d indirectly meshes, with the interposition of an idler gear 10t, that is, a step gear, and an idler gear 10u, that is, a step gear, with a gear 10v attached to one end of the conveyance roller 10b, and transmits the rotational driving force to the conveyance roller 10b.

In this embodiment, the drum gear 7a has the first and second helical gear portions 7a2 and 7a3, which are different in the direction in which their teeth are twisted, as described above. The development roller 10d has the development-roller gear 10n attached to one end of the development roller 10d. This development-roller gear 10n meshes with the second helical gear portion 7a3 of the drum gear 7a, and is rotationally driven by the drum gear 7a, as described above.

The transfer roller 4 has the transfer roller gear 4a attached to one end of the transfer roller 4. This transfer roller gear 7a meshes with the first helical gear portion 7a2 of the drum gear 7a, and is rotationally driven by the drum gear 7a.

For an improvement in positional accuracy, the first helical gear portion 7a2 of the drum gear 7a in this embodiment is twisted in a direction to push the development roller 10d in the outward direction, whereas the second helical gear portion 7a3 of the drum gear 7a is twisted in a direction to push the charge roller 8 and transfer roller 4 in the inward direction as described above.

Further, due to the structural constraint of the gear-driving apparatus, the second helical gear portion 7a3 of the drum gear 7a is smaller in width in terms of its axial direction than the first helical gear portion 7a2 of the drum gear 7a.

Also in this embodiment, the second helical gear portion 7a3 of the drum gear 7a is made larger in pitch-circle diameter than the first drum gear 7a2 of the drum gear 7a.

In this embodiment, the diameter of the photoconductive drum 7 is 24 mm, and the diameter of the charge roller 8 is 18 mm. Further, the diameter of the development roller 10d is 12 mm.

Also in this embodiment, the peripheral velocity of the development roller 10d is roughly 118% of that of the photoconductive drum 7, and the peripheral velocity of the charge roller 8 is roughly 80% of that of the photoconductive drum 7.

Also in this embodiment, the charge roller 8 is rotated in such a direction that in the contact area between the photoconductive drum 7 and charge roller 8, the peripheral surface of the charge roller 8 moves in a direction opposite to the direction in which the peripheral surface of the photoconductive drum 7 moves, and the development roller 10d is rotated in such a direction that in the area in which the peripheral surfaces of the photoconductive drum 7 and development roller 10d are closest to each other, the peripheral surfaces of the photoconductive drum 7 and development roller 10d move in the same direction. In other words, the photoconductive drum 7 and charge roller 8 rotate in the clockwise direction, and the development roller 10d rotates in the counterclockwise direction, as shown in FIG. 1. Further, the conveyance roller 10b is rotated in the clockwise direction.

Next, referring to FIGS. 13–15, another example of a gear train in accordance with the present invention will be described.

Figure 12:
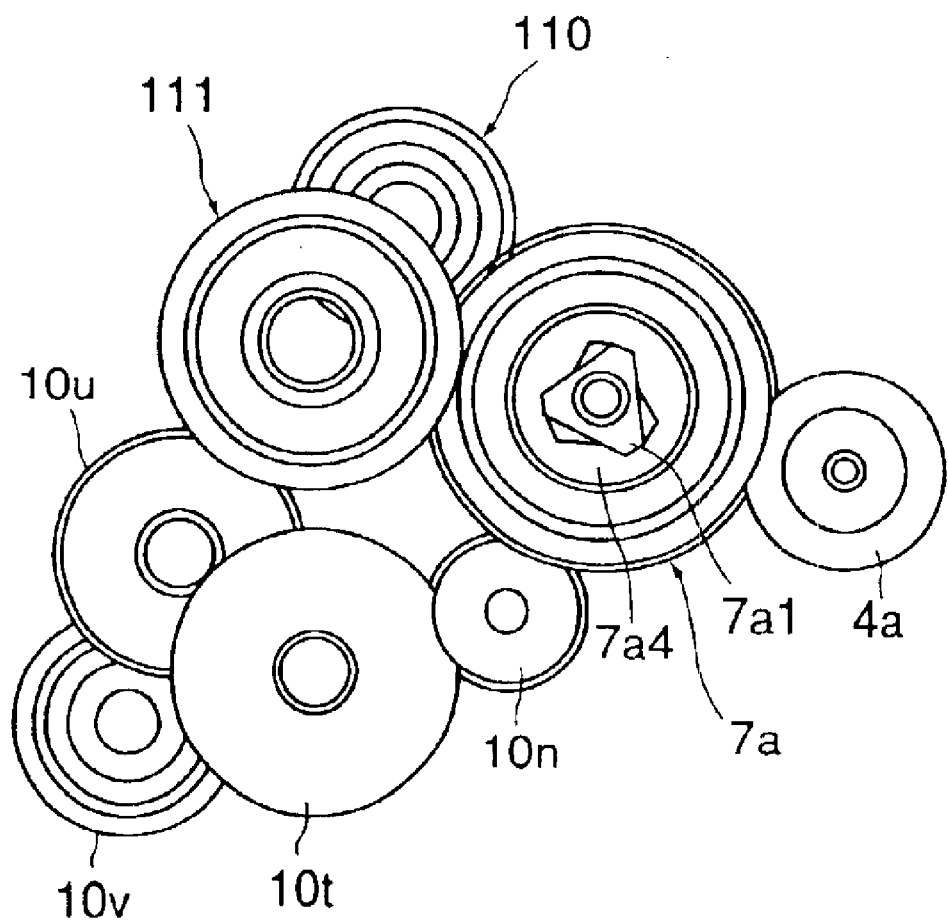
FIG. 12 is a plan view of the gear train of the process-cartridge driving mechanism shown in FIG. 10, describing the structure thereof.

The helical drum gear 7a of the gear train shown in FIGS. 10–12 has the first helical gear portion 7a2, which is on the outward side in terms of the lengthwise direction of the cylinder 7A, and the second helical gear portion 7a3, which is on the inward side. In comparison, the helical gear 7a of the gear train shown in FIGS. 13–15 has only one gear portion (similar to helical gear portion 7a2), which plays both the role played by the first helical gear portion 7a2 of the drum gear 7a of the gear train shown in FIGS. 10–12, and the role played by the second helical gear portion 7a3 of the drum gear 7a shown in FIGS. 10–12.

Figure 13:
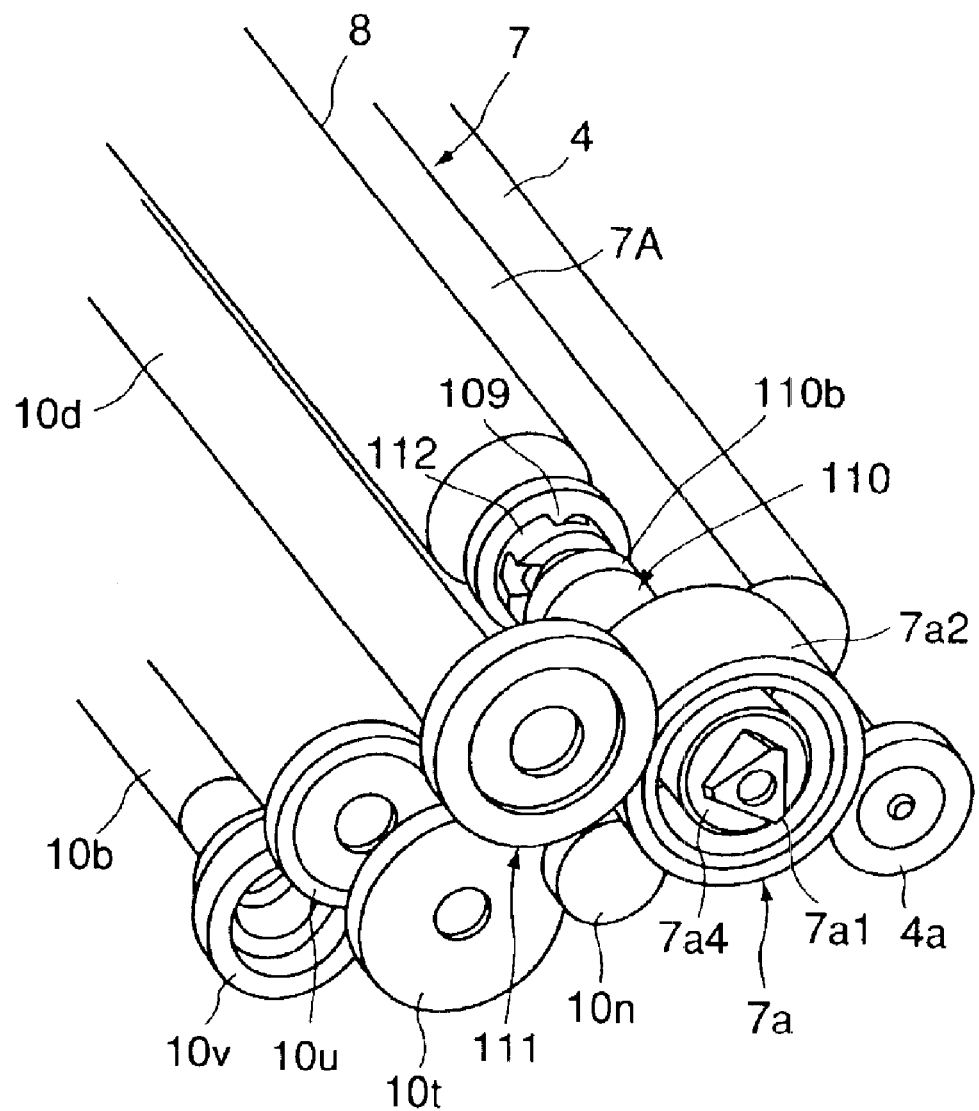
FIG. 13 is a perspective view of the process-cartridge driving mechanism, in another embodiment of the present invention, illustrating the structure thereof.
Figure 14:
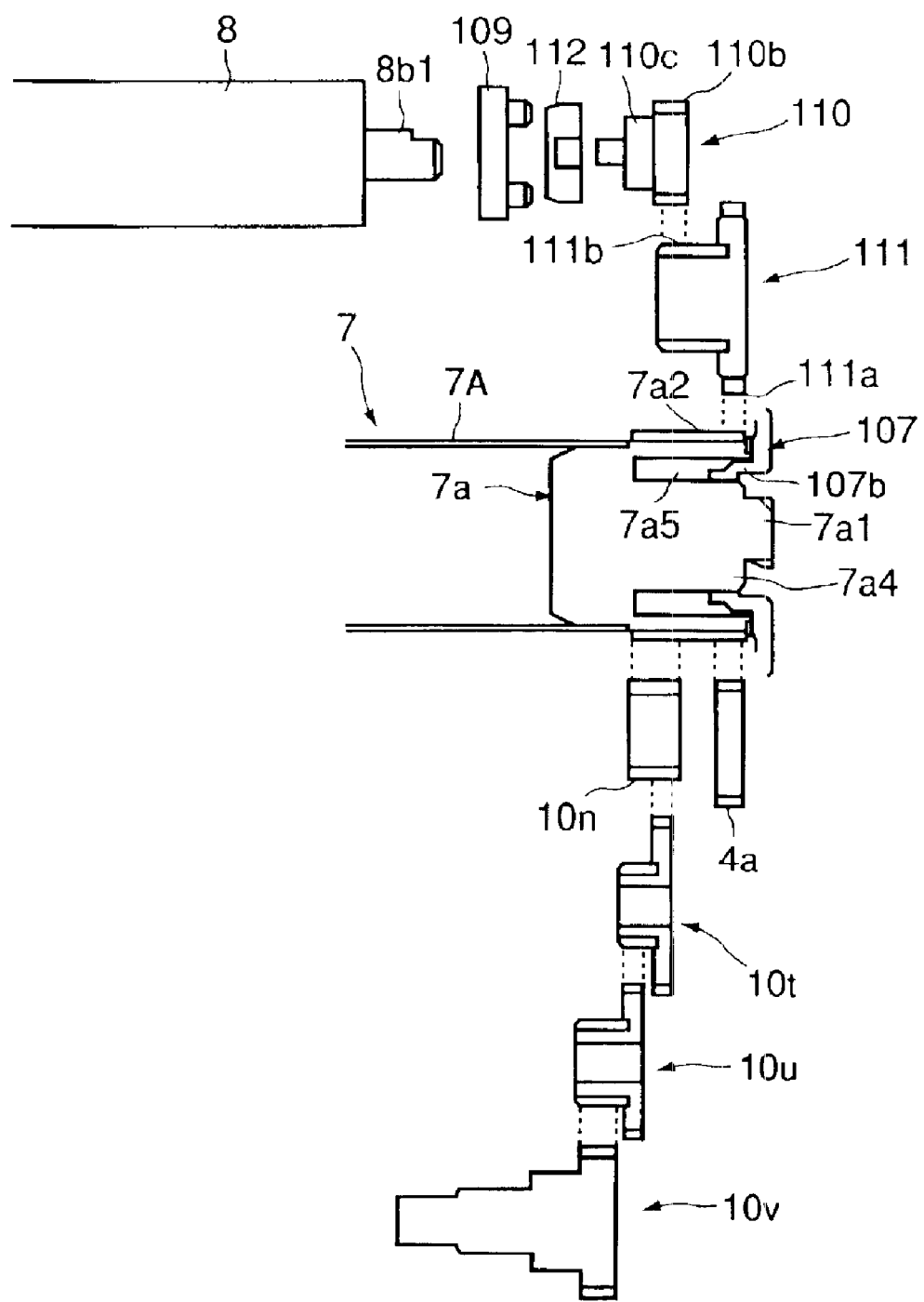
FIG. 14 is a schematic sectional view of the process-cartridge driving mechanism shown in FIG. 13, illustrating the structure thereof.
Figure 15:
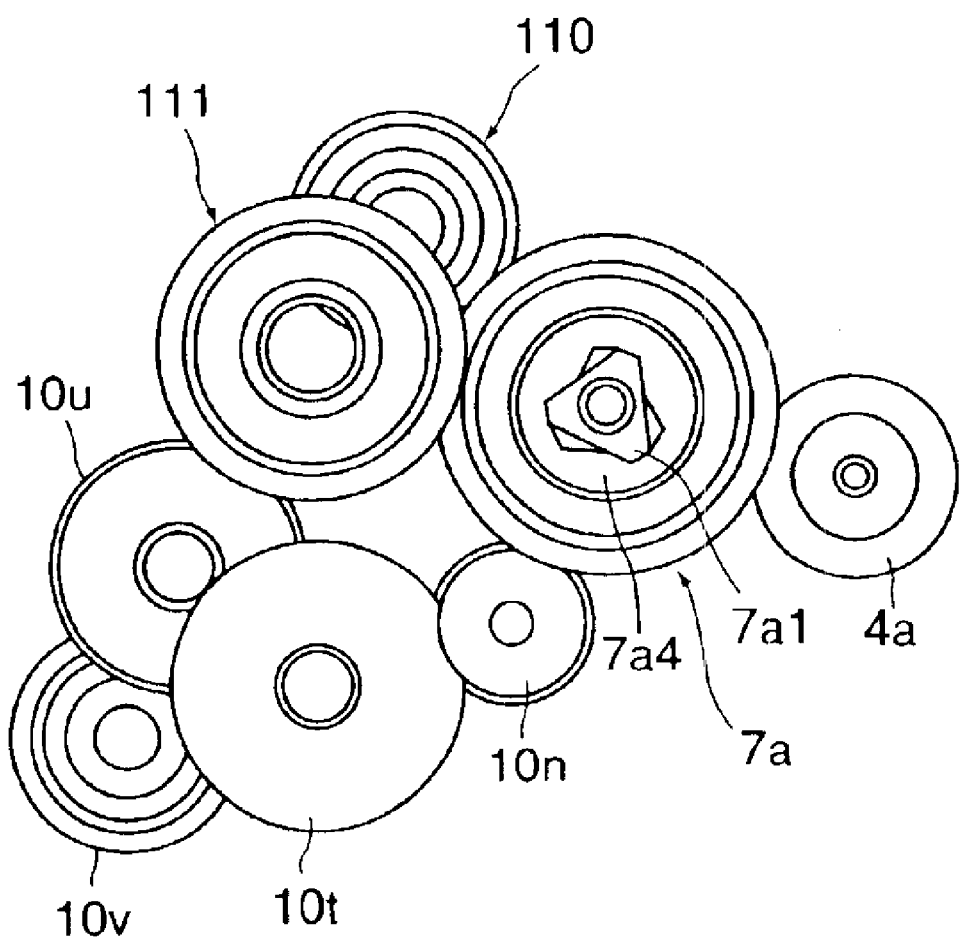
FIG. 15 is a plan view of the process-cartridge driving mechanism shown in FIG. 13, illustrating the structure thereof.

Also in the case of the example of a gear train in accordance with the present invention, shown in FIGS. 13–15, the drum gear 7a meshes with the idler gear 111, the gear 4a, and the gear 10n; the outward side of the drum gear 7a, in terms of its axial direction, meshes with the idler gear 111 and the gear 4a, and the inward side of the drum gear 7a meshes with the gear 10n.

The gear train in shown in FIGS. 10–12, and the gear train shown in FIGS. 13–15 are virtually the same in structure, except for the structure of the drum gear 7a. Therefore, the components, members, portions, etc., of the former, which are the same as the counterparts in the latter, are given the identical reference numerals, and they will not be described here.

Next, the structure of the gear train, shown in FIGS. 13–15, for driving the charge roller 8, the transfer roller 4, the development roller 10d, etc., will be described in comparison to the gear train shown in FIGS. 10–12.

(Structure of Side Holder)

Figure 7:
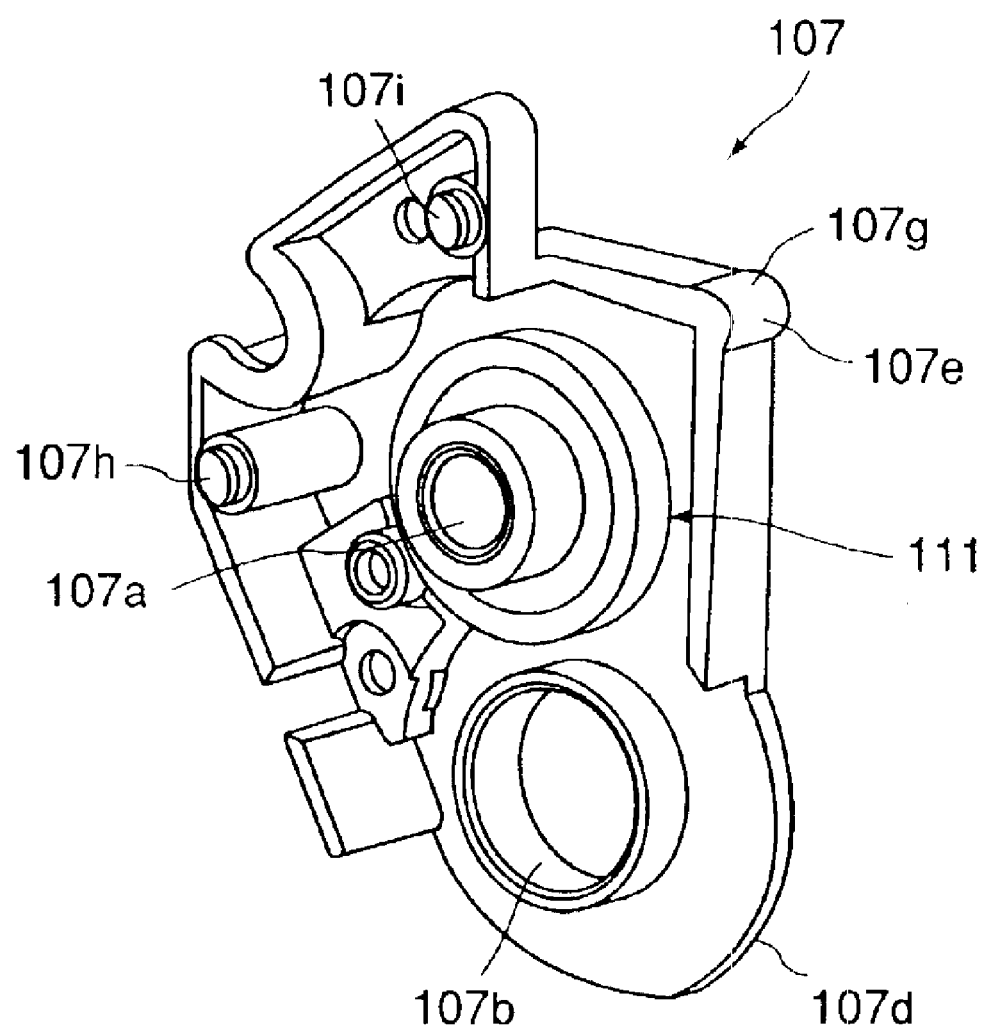
FIG. 7 is a perspective view of the side holder of the drum-frame unit.

Referring to FIGS. 5–7, the structure of the side holder 107 will be described.

As described before, the side holder 107 has: a hole 107a for the reinforcement of the shaft 102 for supporting the idler gear 111; a bearing portion 107b for rotationally bearing the photoconductive drum 7; and a couple of joggles 107h and 107i for precisely positioning the side holder 107 relative to the drum holding frame 102.

Further, the side holder 107 has a through hole 107c (FIG. 5), through which an assembly tool for aligning the teeth of the drum gear 7a and the teeth of the idler gear 111 is inserted into the internal space of the side holder 107, in order to mesh the drum gear 7a and idler gear 111 during process-cartridge assembly.

(Assembly of Process Cartridge)

Method for Assembling Drum-Supporting-Frame Unit C

Referring again to FIG. 5, the assembling of the drum-supporting-frame unit C will be described.

First, an electrical contact member 113 for supplying the charge roller 8 with a bias, and a couple of drum-end cleaning members 114 (114a and 114b), are attached to the drum-supporting frame 102. The cleaning members 114 will be described later in detail.

As described before, the shaft portions 8b1 and 8b2 of the charge roller 8 are rotationally borne by the bearings 103a and 103b engaged with the lengthwise end portions of the drum-supporting frame 102. More specifically, the shaft portion 8b2, that is, the shaft portion on the electrical-contact-member side, is fitted with the bearing 103a formed of electrically conductive plastic, and the bearing 103a is attached to a predetermined portion of the drum-supporting frame 102, with the interposition of a spring 104 for keeping the charge roller 8 pressed upon the photoconductive drum 7. The shaft portion 8b1, that is, the shaft portion on the side with no electrical contact member, is fitted with the bearing 103b formed of plastic, and the bearing 103b is attached to another predetermined portion of the drum-supporting frame 102, with the interposition of the spring 104 for keeping the charge roller 8 pressed upon the photoconductive drum 7.

Next, one end of the shaft 8b1 of the charge roller 8 is fitted with the aforementioned coupler 109 and the intermediary coupler 112 in this order. Then, the end of the charge roller 8 with the electrical contact member 113 is fitted with the bearing 103a, and the end of the charge roller 8 with no electrical contact member is fitted with the bearing 103b. The charge roller 8 is coated in advance with the aforementioned electrically conductive microscopic particles.

The geared coupler 110 is fitted into the hole 108 of the drum supporting frame 102, with the coupling portion of the geared coupler 110 aligned with the elongated hole of the intermediary coupler 112.

The idler gear 111 is fitted around the supporting shaft 102c of the drum-supporting frame 102, while being meshed with the gear portion 110b of the geared coupler 110.

The supporting member 106 is attached to the drum supporting frame 102, while inserting the shaft portion 106a of the supporting member 106 into the hole 110d of the geared coupler 110, being therefore precisely positioned relative to the drum-supporting frame 102.

The photoconductive drum 7 is precisely positioned relative to the drum-supporting frame 102 with the use of a tool. Then, from the side opposite to the side with the drum gear, the drum-supporting shaft 100 is put through the hole 102a of the drum-supporting frame 102, and the flange of the photoconductive drum 7, solidly fixing the drum-supporting shaft 100 to the drum-supporting frame 102, and rotationally supporting the photoconductive drum 7. On the drum-gear side, the side holder 107 is attached to the drum-supporting frame 102, precisely positioning the side holder 107 relative to the drum-supporting frame 102, while fitting the projection 7a1 of the drum gear 7a into the hole 107b of the side holder, and the bearing portion 107b into the cylindrical space 7a5 of the drum gear 7a. During this process, a tool for rotating the idler gear 111 is inserted through the through hole 107c of the side holder 107, and the side holder 107 is solidly fixed to the drum-supporting frame 102 with the use of small screws, while rotating the idler gear 111 by the inserted tool so that the first helical gear portion 7a2 smoothly meshes with the idler gear 111.

The above-described processes completes the assembly of the drum-frame unit C.

(Method for Assembling Developing Means 10 and Development Unit D)

Next, referring to FIG. 2, and FIGS. 16–20, the development unit D and developing means 10 of the process cartridge B will be described in detail.

Figure 17:
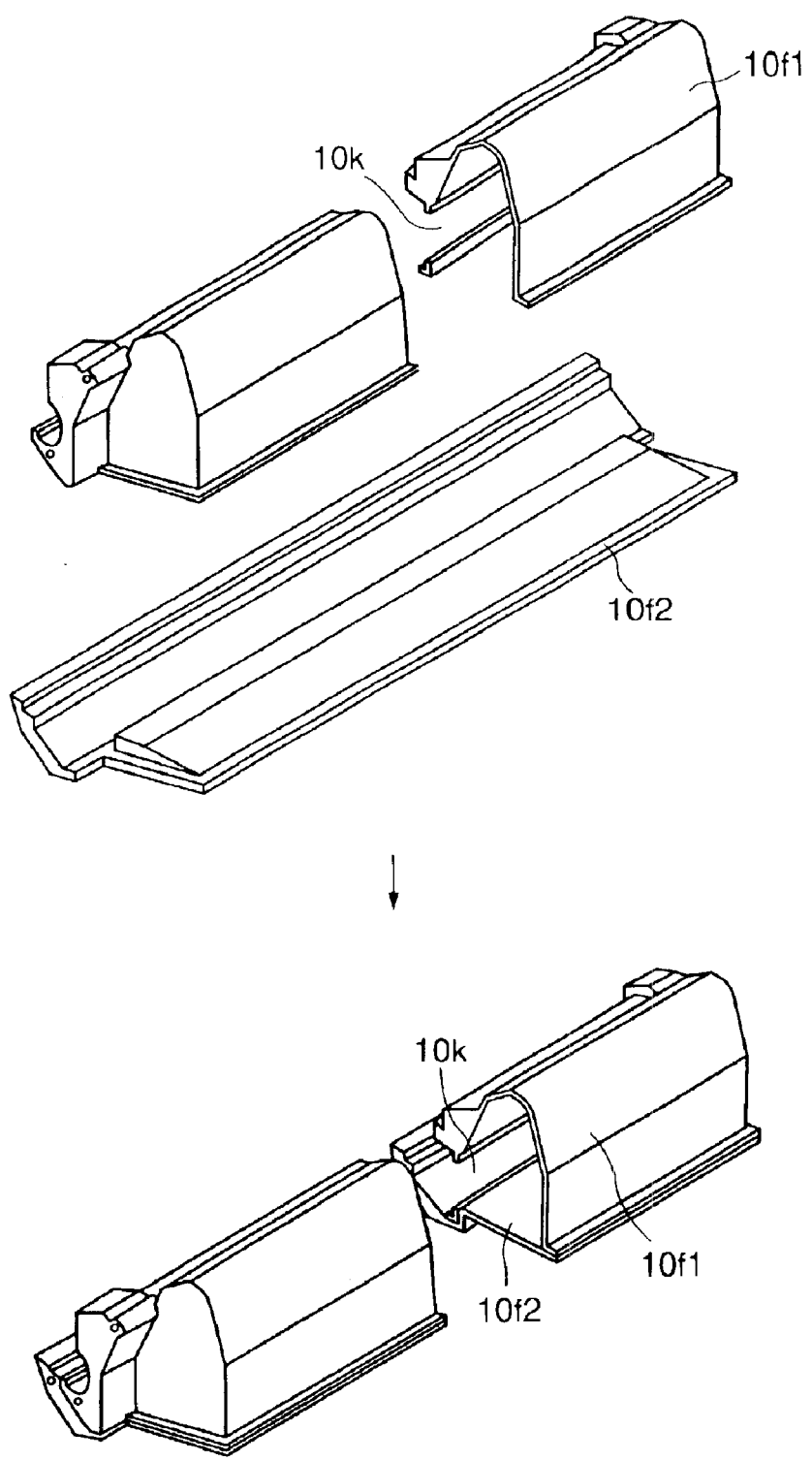
FIG. 17 is a perspective view of the toner-storage developing-means frame, and the frame lid, of the cartridge in the preferred embodiment of the present invention, illustrating how they are joined.

Referring to FIGS. 2 and 17, the developing means 10 comprises the toner-storage development-means frame 10f1 and the frame lid 10f2, which are joined to create the toner chamber (toner-storage portion) 10a and the development chamber 10i.

The toner-storage developing-means frame 10f1 is provided with the opening 10k through which the toner in the toner chamber 10a passes when it is supplied to the development roller 10d.

Figure 16:
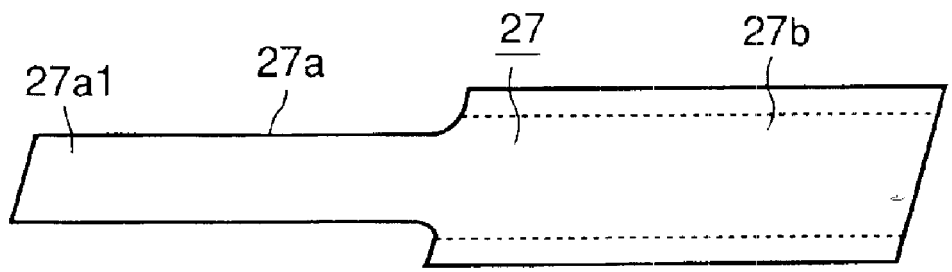
FIG. 16(a) is a perspective view of the toner-sealing member in the preferred embodiment of the present invention.
FIG. 16(b) is a sectional view of the same toner-sealing member.
Figure 16:
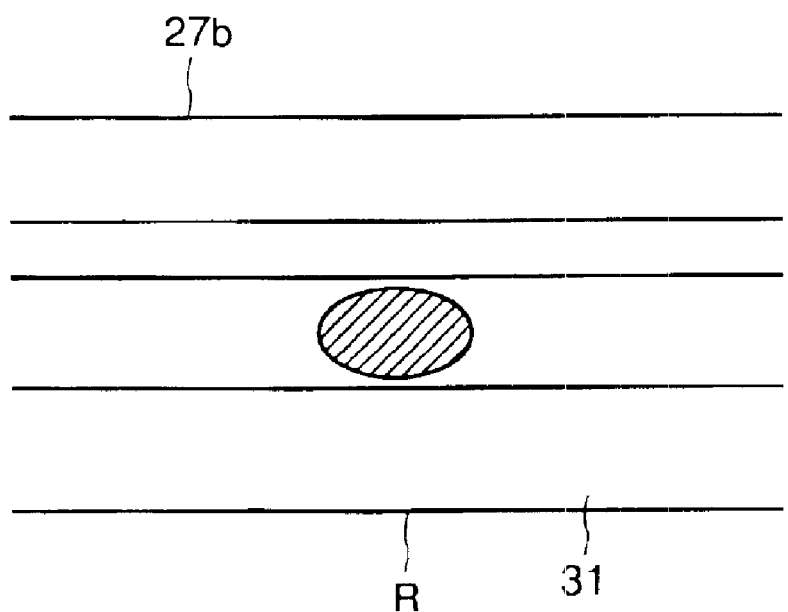

Referring to FIG. 16, when the process cartridge B is brand-new, the toner-passage opening 10k of toner-storage developing-means frame 10f1 of the process cartridge B is blocked with a multilayer toner-sealing member 27 having a cover-film portion 27b thermally welded to the seal-attachment portion of the toner-storage developing-means frame 10f1, with the use of laser light. The cover-film portion 27b is provided with a thermally weldable layer 31 for fixing the toner-sealing member 27. The details of the structure of the toner-sealing member 27 are well known to the people in this business, and are disclosed in, for example, Japanese Laid-open Patent Application 11-102105, etc. Thus, for the details, this patent application or the like should be referred to.

Figure 18:
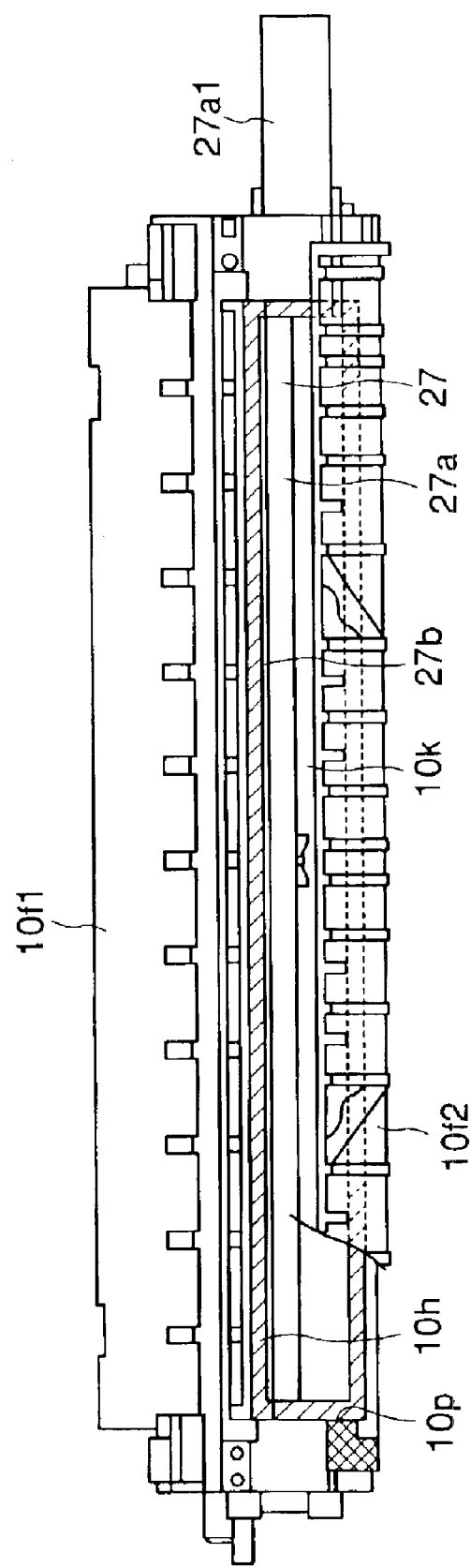
FIG. 18 is a drawing for describing how the toner-sealing member is joined with the toner-storage developing-means frame.

Referring to FIG. 18, the toner-sealing member 27 is pasted to the seal-attachment portion 10h, which extends along the four edges of the aforementioned toner-passage opening 10k. In order to unseal the toner-passage opening 10k, the toner-sealing member 27 is precut by a laser to a depth of half its thickness, as described above (Japanese Laid-open Patent Application 11-102105).

One lengthwise end of the toner-storage developing-means frame 10f1 is provided with a toner inlet (unshown), that is, an opening, through which the toner chamber 10a is filled with toner, and which is sealed with a cap 10j (FIG. 19) after the filling of the toner chamber 10a with toner.

Next, referring to FIGS. 18 and 19, the process for assembling the development unit D will be described.

In order to assemble the developing means 10, first, an end seal 10r for preventing the toner from leaking from the lengthwise ends of the development roller 10d, a sealing member 10s for preventing toner from leaking from the lengthwise ends of the development blade 10e, and a sheet-like member 10z for preventing toner from scattering from the gap under the development roller 10d, are pasted to the toner-storage developing-means frame 10f1 and frame lid 10f2, with the use of double-sided adhesive tape, or the like.

The development blade 10e is solidly fixed to the toner-storage developing-means frame 10f1, by the lengthwise ends of the metallic plate portion 10e1 of the development blade 10e, with the use of small screws.

One (on the left side in FIG. 19) of the two end members (holding members) 10g covers the gear train comprising: the development-roller gear 10n (FIGS. 10 and 11) solidly fixed to one end of the development roller 10d and meshing with the fist helical gear portion 7a2 of the drum gear 7a (FIG. 5) solidly fixed to one end of the photoconductive drum 7; and the two idler gears 10u and 10t for transmitting the driving force from the development-roller gear 10n to the conveyance gear (unshown) of the toner-conveyance member 10b. The other end member 10g (on the right side in FIG. 19) is provided with a hard tab 110g, which will be described later.

The extended tab portion 27a (FIG. 16) of the toner sealing member 27 is folded back at one end 10p (FIG. 18) of the toner-passage opening 10k, all the way to the other end of the toner-passage opening 10k, and is extended outward through the hole 10f11 (FIG. 19) of the toner-storage developing-means frame 10f1.

The tab proper portion 27a1 of the extended tab portion 27a of the toner-sealing member 27 is further extended outward through the hole 10g6 of the end member 10g, and the through hole 10g4 of the hard tab 10g1, so that the surface R (surface coated with sealant layer 31) of the extended tab portion 27a, shown in FIG. 16, thermally fixable to the hard tab 10g1, faces the handle 10g1. The end of the tab proper portion 27a1 is thermally fixed to a predetermined area of the hard tab 10g1 (FIG. 19).

The hard tab 10g1 is an integral part of the end member 10g, and is formed so that it can be easily torn off from the end member 10g. More specifically, the portion by which the hard tab 10g1 is connected to the main structure of the end member 10g is made very thin so that the hard tab 10g1 can be easily separated from the main structure by bending.

The hard tab 10g1 is integrally formed with the end member 10g. Preferably, it is formed of high impact polystyrene (HIPS), acrylonitrile-butadiene polymer (ABS), etc., that is, copolymers containing styrene. The end portion 27a1, or tab proper, of the extended tab portion 27a is thermally welded to the hard tab 10g1.

Figure 20:
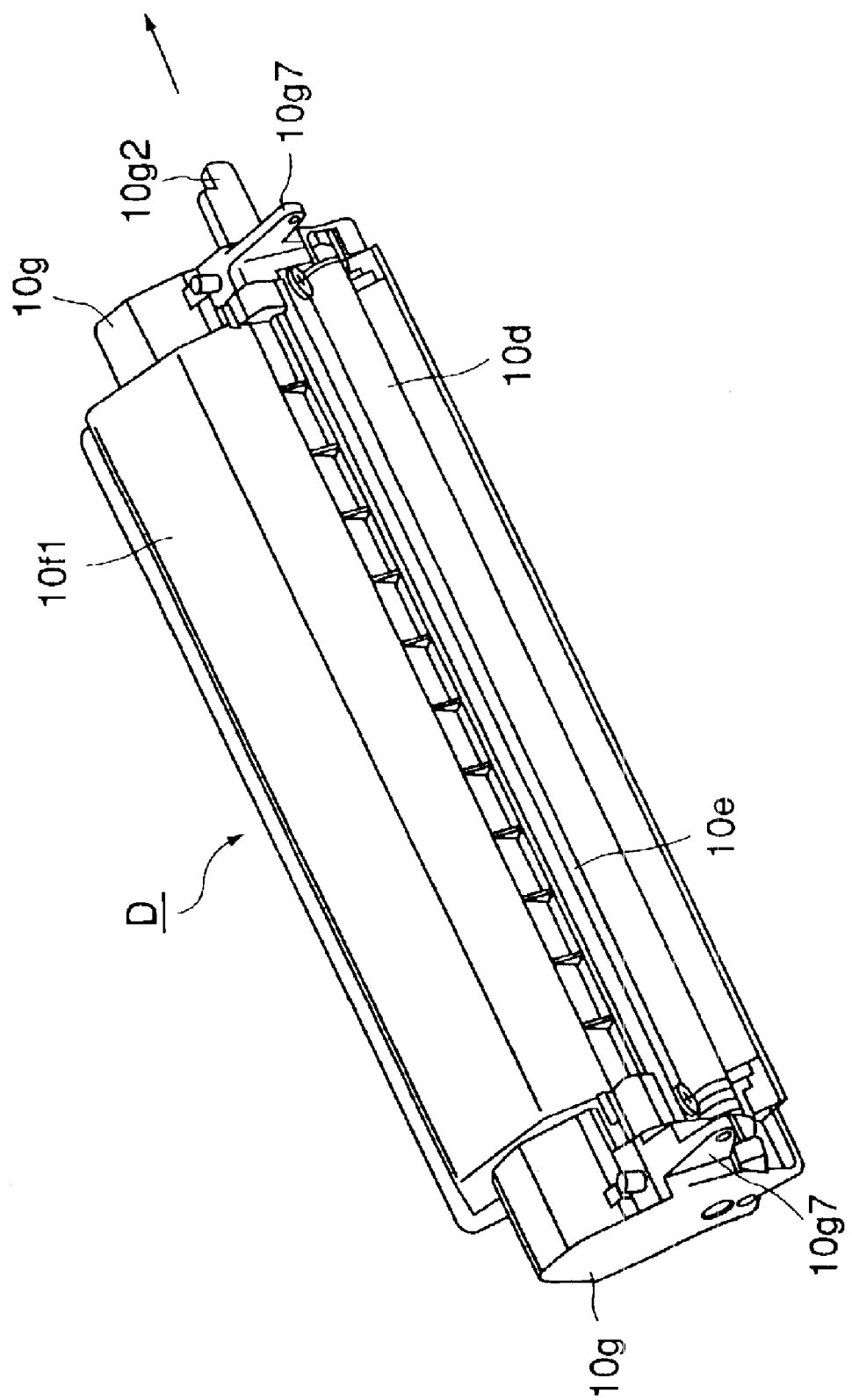
FIG. 20 is a perspective view of the development unit in FIG. 19.

The above-described processes complete the description of the development unit D shown in FIG. 20.

Figure 19:
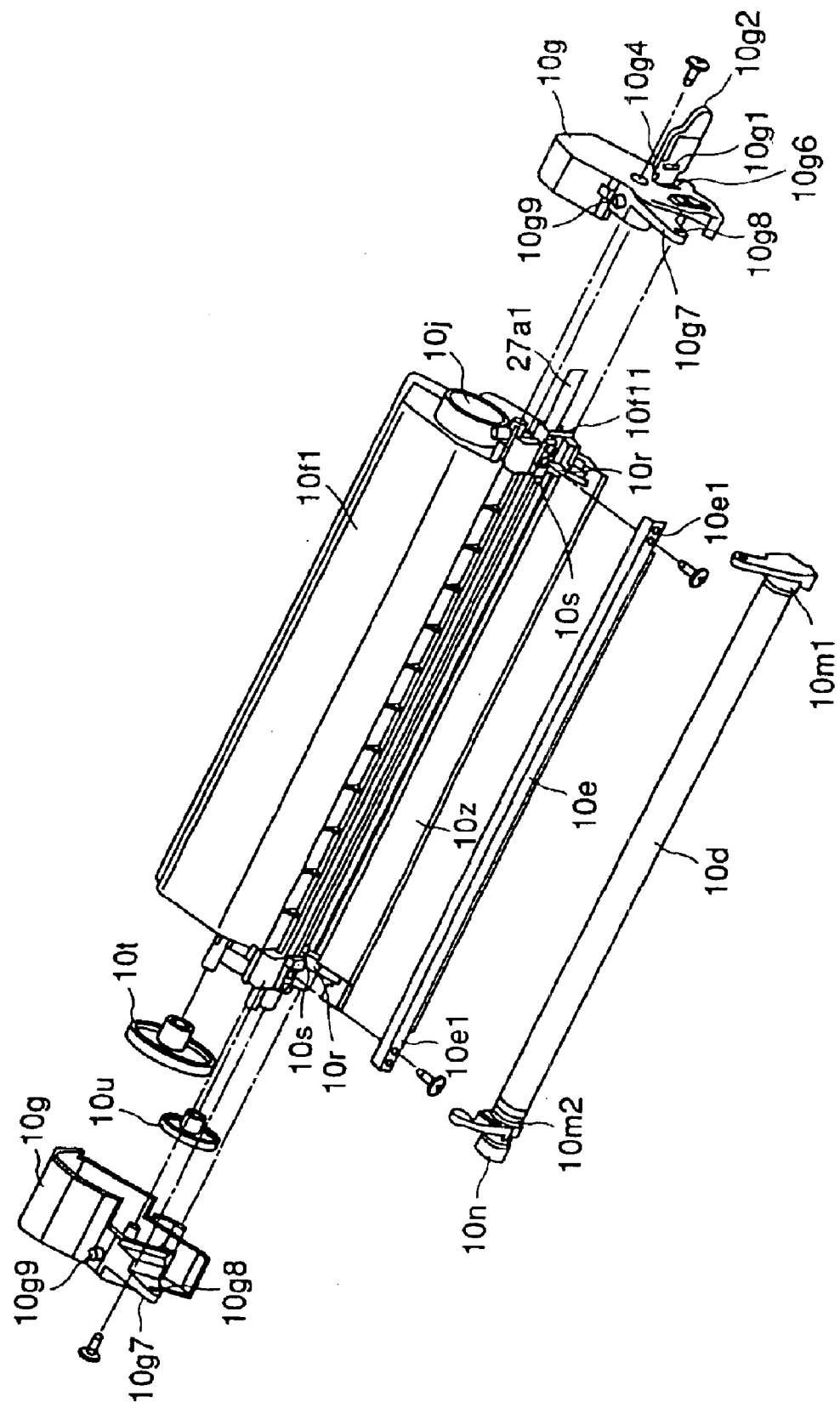
FIG. 19 is an exploded perspective view of the development unit of the process cartridge in accordance with the present invention.

Referring to FIG. 19, the end member 10g is provided with an arm-like portion 10g7, which protrudes toward the drum-supporting frame 102. The arm-like portion 10g7 has a hole 10g8, which is in the end portion of the arm-like portion 10g7, extending in the lengthwise direction of the process cartridge B. The drum-supporting frame 102 and the end member 10g can be joined by putting a pin (unshown) through the hole 10g8 of the arm-like portion 10g7 of the end member 10g, and the unshown hole of the drum-supporting frame 102, so that they can be rotated about the pin. The arm-like portion 10g7 is also provided with a spring-holding portion 10g9, which protrudes from the top surface of the arm-like portion 10g7, and a compression coil spring is placed in the compressed state between the arm-like portion 10g7 and drum-supporting frame 102, with one end of the compression coil spring fitted around the spring-holding portion 10g9. The end portions of the development roller 10d are fitted with gap maintaining members (spacers) (10m1 and 10m2), one for one, and the spacers are pressed on the peripheral surface of the photoconductive drum 7. Therefore, a predetermined distance is kept between the peripheral surfaces of the development roller 10d and photoconductive drum 7.

Figure 21:
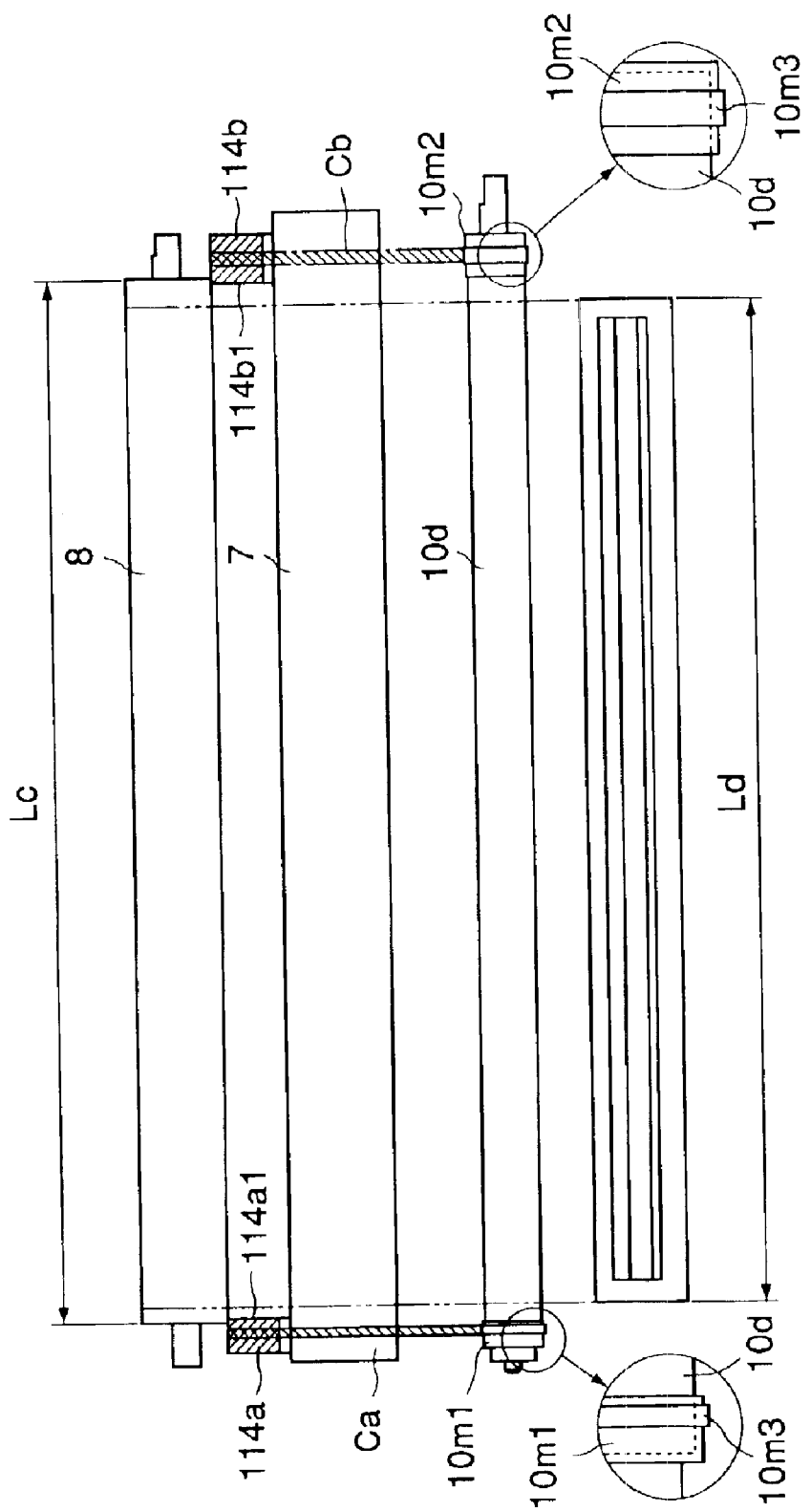
FIG. 21 is a drawing for illustrating how the cleaning members of the process cartridge in accordance with the present invention are attached.

Referring to FIGS. 19 and 21, in this embodiment, the spacers 10m1 and 10m2 are in the form of a cap, and each end of the development roller 10d is fitted with the cap-like spacer 10m1 or 10m2. The center portion of the peripheral surface of the cap-like spacer, in terms of its axial direction, having a predetermined width, is raised in relation to adjacent portions of the peripheral surfaces, and, this portion is pressed on the peripheral surface of the photoconductive drum 7.

The development unit D and the drum frame unit C are joined, as described above, to complete the process cartridge B.

(Structure of Cleaning Member 114)

While a toner image is transferred from the photoconductive drum 7 onto the recording medium 2, and/or while the recording medium 2 bearing the unfixed transferred image is conveyed to the fixing means 5 and enters the fixing means 5, toner particles sometimes float in the image-forming-apparatus main assembly, although by only a very small amount.

Some of the floating toner particles adhere to the photoconductive drum 7, even across the portion corresponding in position to the cap-like spacers 10m1 and 10m2. As the toner particles adhere to the portion of the photoconductive drum 7 corresponding to the cap-like spacers 10m1 and 10m2, they are compressed onto the peripheral surface of the photoconductive drum 7 by the cap-like spacers 10m1 and 10m2, being sometimes semi-permanently adhered in the agglomerated form to the peripheral surface of the photoconductive drum 7, because the cap-like spacers 10m1 and 10m2 are kept pressed upon the peripheral surface of the photoconductive drum 7 by the force from the aforementioned springs. Some of the agglomerations of toner particles remain on the portion of the photoconductive drum 7 corresponding to the cap-like spacers 10m1 and 10m2, and gradually grow, until the service life of the process cartridge expires.

The presence of the above-described agglomerations of toner particles on the portion of the peripheral surface of the photoconductive drum 7 corresponding to the cap-like spacers 10m1 and 10m2 change the distance between the photoconductive drum 7 and the development roller 10d, negatively affecting the development of the latent image on the photoconductive drum 7. Further, as the development roller 10d rides over the agglomerations of toner particles, vibrations occur, presenting a possibility that an image defect will occur due to the pitch, in terms of the direction perpendicular to the direction in which the recording medium 2 is conveyed, being randomly disturbed.

In this embodiment, therefore, in order to remove the toner particles adhering to the end portions of the photoconductive drum 7 which the corresponding cap-like spacers 10m1 and 10m2 contact, one-piece cleaning members 114 (114a and 114b) are attached to the end portions of the drum-supporting frame 102, one for one, with the use of double-sided adhesive tape, in such a manner that the cleaning members 114 contact the peripheral surfaces of the right and left lengthwise ends of the photoconductive drum 7, one for one.

As for the preferable materials for the cleaning member 114, there are:
(1) a laminar combination of an elastic layer, for example, a layer of foamed polyurethane or felt, and a layer of nonwoven fabric fixed to thereto;
(2) a laminar combination of an elastic layer, for example, a layer of foamed polyurethane or felt, and a layer of felt, as toner removing layer, fixed thereto;
(3) a laminar combination of an elastic layer, for example, a layer of foamed polyurethane or felt, and a layer of pile fixed thereto;
(4) a combination of foamed urethane, and high density polyurethane fixed thereto;
(5) felt;
(6) foamed polyurethane; or
(7) nonwoven fabric. When the laminar materials such as the above (1), (2), or (3), are used as the material for the cleaning member 114, the cleaning member 114 is disposed so that the nonwoven fabric, felt layer as the toner-removing layer, or pile, is placed in contact with the photoconductive drum 7.

These cleaning members 114 are capable of reliably taking into the nonwoven-fabric portion or the like, the stray toner particles having adhered to the peripheral surface of the photoconductive drum 7, without causing the stray toner particles to fall within the apparatus main assembly; in other words, they can remove the stray toner particles on the photoconductive drum 7 in a preferable manner, reducing frictional resistance as much as possible, preventing, thereby, the increase in the driving force (rotational driving force) necessary to rotate the photoconductive drum 7.

Next, referring to FIG. 21, the positional relationships between the above-described cleaning member 114 attached to the drum supporting frame 102, and the photoconductive drum 7, and between the cleaning member 114 and charge roller 8, will be described.

The adhesion of the stray toner particles, such as the above-described floating toner particles, to the portions of the photoconductive drum 7, outside the changing range of the charge roller 8, that is, the portions of the photoconductive drum 7 extending outward beyond the ends of the charge roller 8, may result in the contamination of the image edges and/or recording-medium edges by the stray toner particles.

Referring to FIG. 21, in this embodiment, each end of the development roller 10$d$ is capped with the cap-like spacers 10$m$1 and 10$m$2, the raised center portion 10$m$3 of which is kept pressed on the peripheral surface of the photoconductive drum 7. The cleaning members 114 (114$a$ and 114$b$) are disposed in alignment with the cap-like spacers 10$m$1 and 10$m$2), respectively, in terms of the direction perpendicular to the axial direction of the photoconductive drum 7 (charge roller 8, development roller 10$d$), with the presence of a gap between the cleaning member 114 and corresponding cap-like spacers 10$m$1 and 10$m$2.

In other words, referring to FIGS. 5 and 21, in terms of the lengthwise direction of the photoconductive drum 7, the range Ca, across which the raised center portion of the cap-like spacer 10$m$1, of the development roller 10$d$, is in contact with the left end portion of the peripheral surface of the photoconductive drum 7, falls within the range of the first cleaning member 114$a$ disposed in contact with the left end portion of the peripheral surface of the photoconductive drum 7. Further, the inward edge 114$a$1 of the first cleaning member 114$a$ is outside the range Ld, in terms of the lengthwise direction of the photoconductive drum 7, across which the development process is carried out by the development roller 10$d$, and inside the range Lc, across which the charge roller 8 is in contact with the photoconductive drum 7.

Also referring to FIGS. 5 and 21, similarly, in terms of the lengthwise direction of the photoconductive drum 7, the range Cb, across which the raised center portion of the cap-like spacer 10$m$2, of the development roller 10$d$, is in contact with the right end portion of the peripheral surface of the photoconductive drum 7, falls within the range of the second cleaning member 114$b$ disposed in contact with the right end portion of the peripheral surface of the photoconductive drum 7. Further, the inward edge 114$b$1 of the second cleaning member 114$b$ is outside the range Ld, in terms of the lengthwise direction of the photoconductive drum 7, across which the development process is carried out by the development roller 10$d$, and inside the range Lc, across which the charge roller 8 is in contact with the photoconductive drum 7.

With the provision of the above-described structural arrangement, the toner particles adhering to the photoconductive drum 7 can be removed by taking them into the first and second cleaning members 114$a$ and 114$b$.

Therefore, the stray toner particles do not agglomerate on the peripheral surface of the photoconductive drum 7, across the areas corresponding to the ranges across which the cap-like spacers 10$m$1 and 10$m$2 remain in contact with the photoconductive drum 7. Therefore, the distance between the photoconductive drum 7 and the development roller 10$d$ is kept constant, making it possible to form an excellent image.

In particular, not only does the usage of a laminar material, for example, a laminar combination of a layer of elastic substance and a layer of nonwoven fabric, as the material for the cleaning members 114 make it possible to prevent the stray toner particles from adhering to the photoconductive drum 7, across the areas corresponding to the ranges across which the cap-like spacers 10$m$1 and 10$m$2 remain in contact with the photoconductive drum 7, without increasing the component count, but also the usage of a laminar material produces a sturdy and resilient cleaning member, improving assembly quality and efficiency. In other words, not only does it make it possible to form an excellent image, but also it makes it possible to minimize the cost of the process cartridge B.

Further, the above-described structural arrangement makes it possible for the first and second cleaning members 114$a$ and 114$b$ to remove the toner particles adhering the peripheral surface of the photoconductive drum 7, across the range in which the photoconductive drum 7 is not charged, that is, outside the range across which the charge roller 8 is in contact with the photoconductive drum 7. Therefore, toner particles are prevented from adhering to the image edges and/or recording medium edges. Therefore, it is possible to form an excellent image.

In this embodiment, the pair of cleaning members 114 (114$a$ and 114$b$) are disposed in contact with the lengthwise ends of the photoconductive drum 7, one for one. However, it may be only one of lengthwise ends of the photoconductive drum 7 that is provided with the cleaning member 114.

(Mounting and Removal of Process Cartridge B, into and from, Image Forming Apparatus Main Assembly)

In order to form an image, the process cartridge B assembled as described above is mounted into the image forming apparatus main assembly A0. Next, referring to FIG. 22–27, it is described how the process cartridge B is mounted.

As described before with reference to FIG. 20, as the hard tab 10g2 is separated from the end member of the development unit D of the process cartridge B, and is pulled in the direction indicated by the arrow mark, the toner-sealing member 27 is pulled out of the process cartridge B, allowing the toner to be supplied into the development chamber 10i; the process cartridge is readied.

Figure 4:
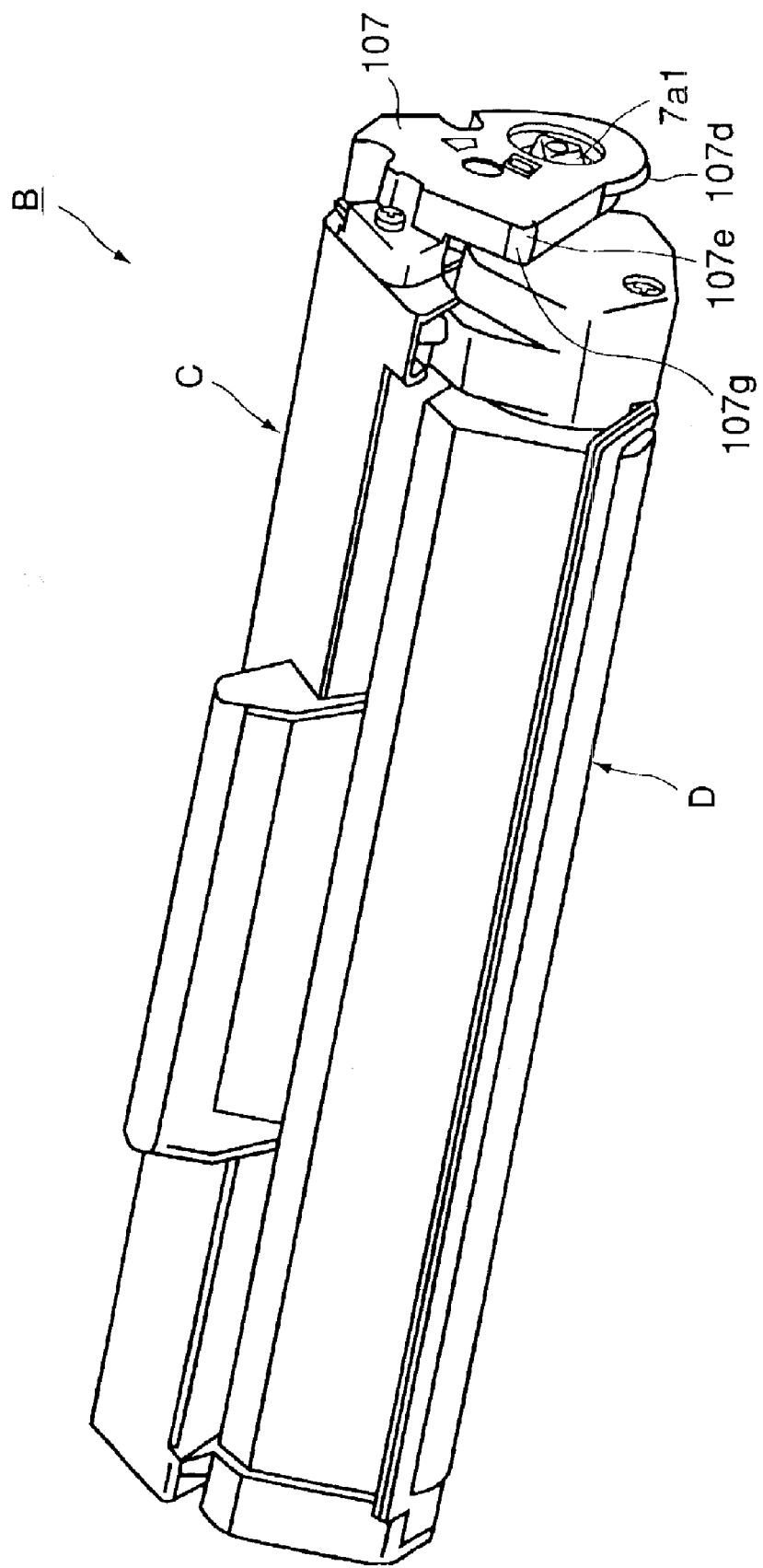
FIG. 4 is another perspective view of the process cartridge in accordance with the present invention shown in FIG. 2.
Figure 26:
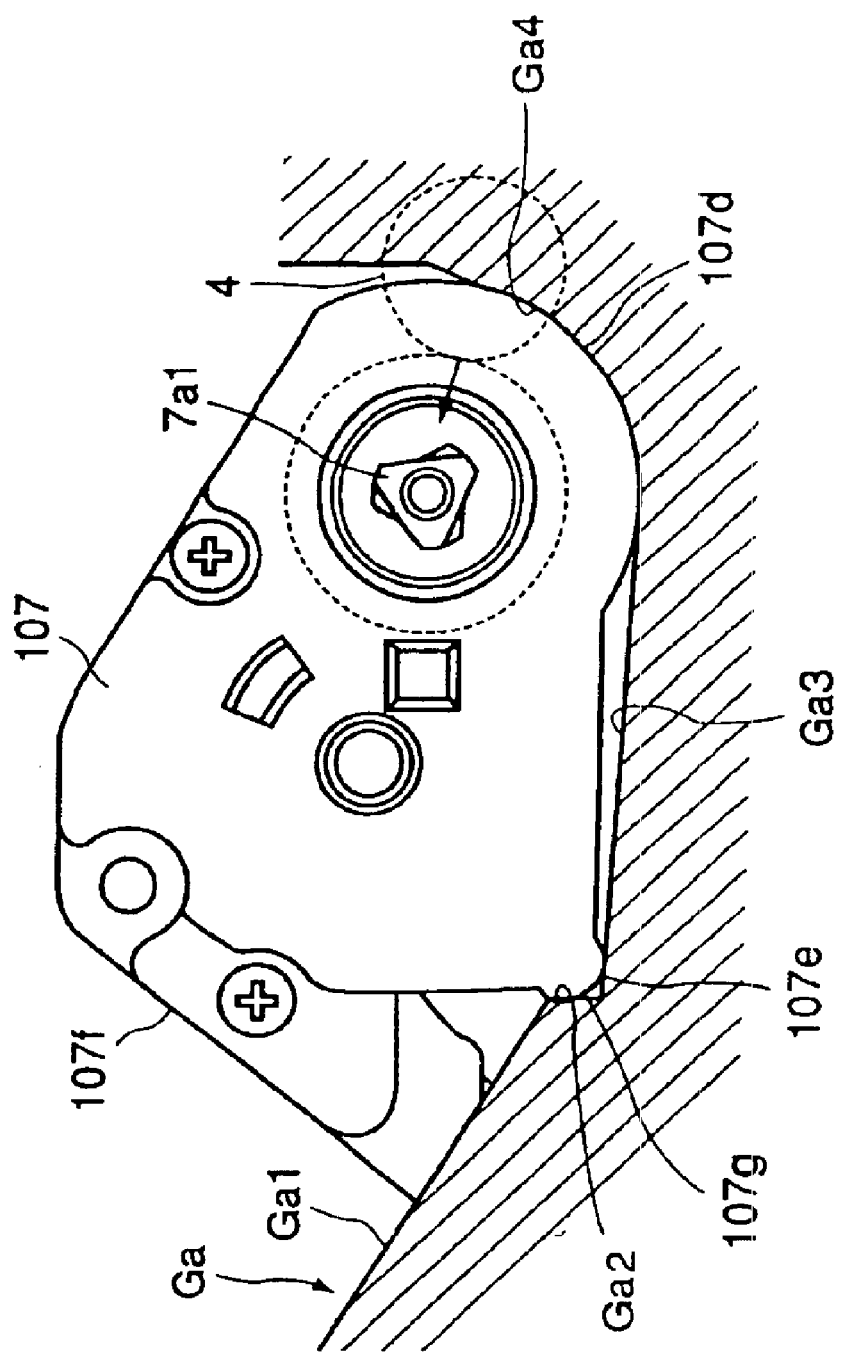
FIG. 26 is a drawing for illustrating how the process cartridge is accurately positioned relative to the image forming apparatus.

As will be understood with reference to FIG. 4 in addition to FIG. 26, the side holder 107 attached to the cartridge frame (drum-supporting frame 102) of the process cartridge B is provided with an arcuate portion (first engagement portion) 107d, as a guide, by which the process cartridge B is guided when it is mounted into the image forming apparatus main assembly A0; and an arcuate portion (second engagement portion) 107e, as a rotation-control portion, which controls the attitude of the process cartridge B when the process cartridge B is mounted into the image forming apparatus main assembly A0. The arcuate portion 107d is at the bottom of the cartridge frame, and the center of its curvature coincides with the axial line of the photoconductive drum 7, whereas the arcuate portion 107e is located at the corner of the side holder 107.

In terms of the drum-shaft direction of the development unit D, the arcuate portion 107d is on the outward side of the drum unit D, but, as seen from the drum-shaft direction, it partially overlaps with the drum unit D. Also, in terms of the drum-shaft direction, the rotation-control portion 107e is on the outward side of the drum unit D, and, as seen from the axial direction of the photoconductive drum 7 of the development unit D, it falls within the projection of the development unit D. Further, in terms of the direction in which the process cartridge B is inserted into the image forming apparatus main assembly A0, the rotation-control portion 107e is on the trailing side of the arcuate portion 107d.

Figure 31:
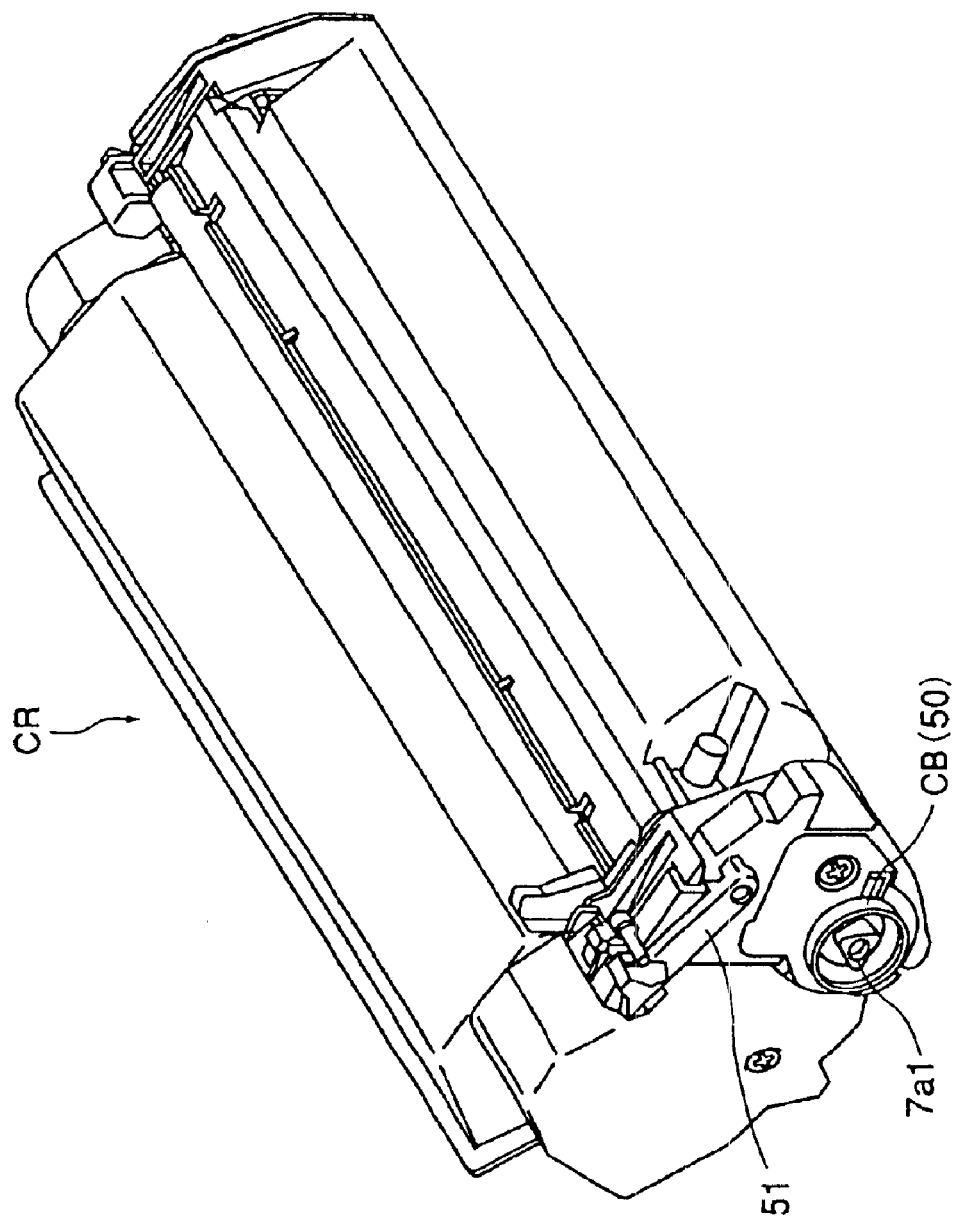
FIG. 31 is a perspective view of a process cartridge in accordance with the prior arts.
Figure 32:
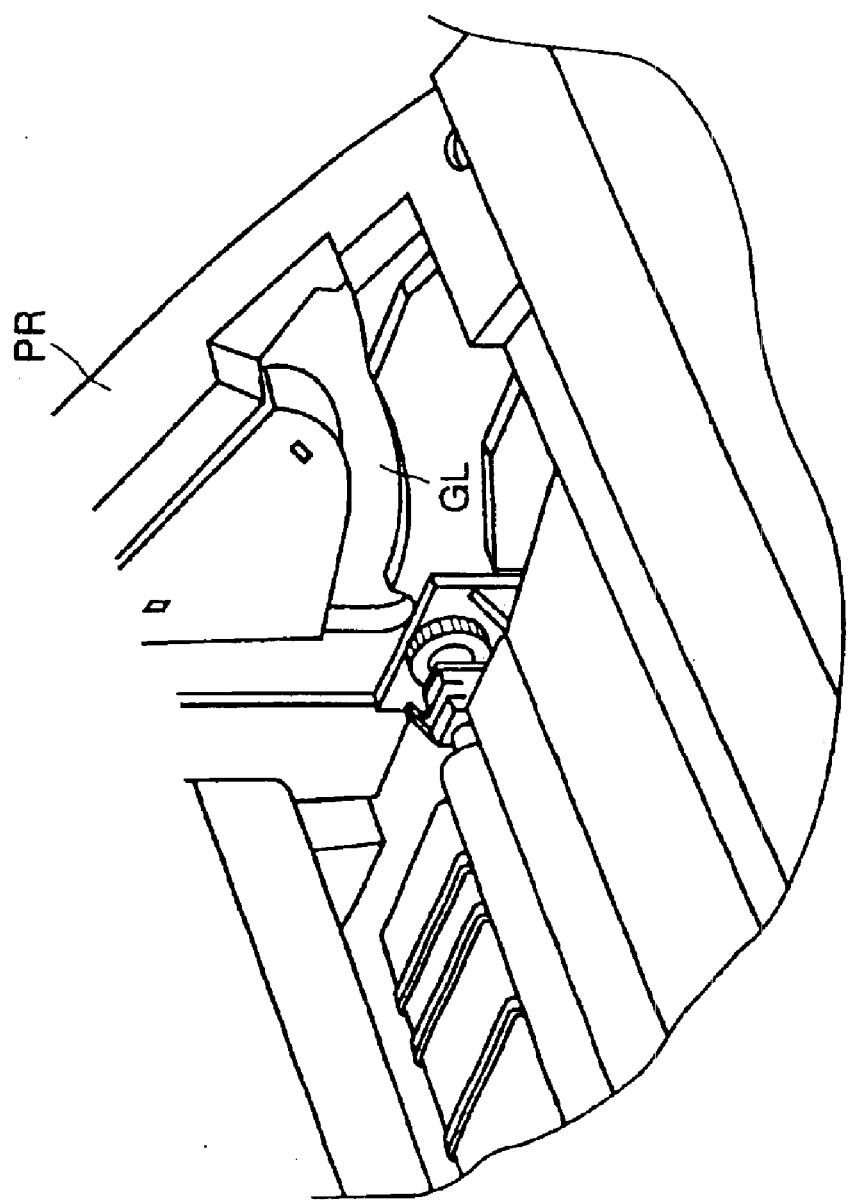
FIG. 32 is a perspective view of one of the cartridge-guiding portions of an image forming apparatus in accordance with the prior arts.
Figure 33:
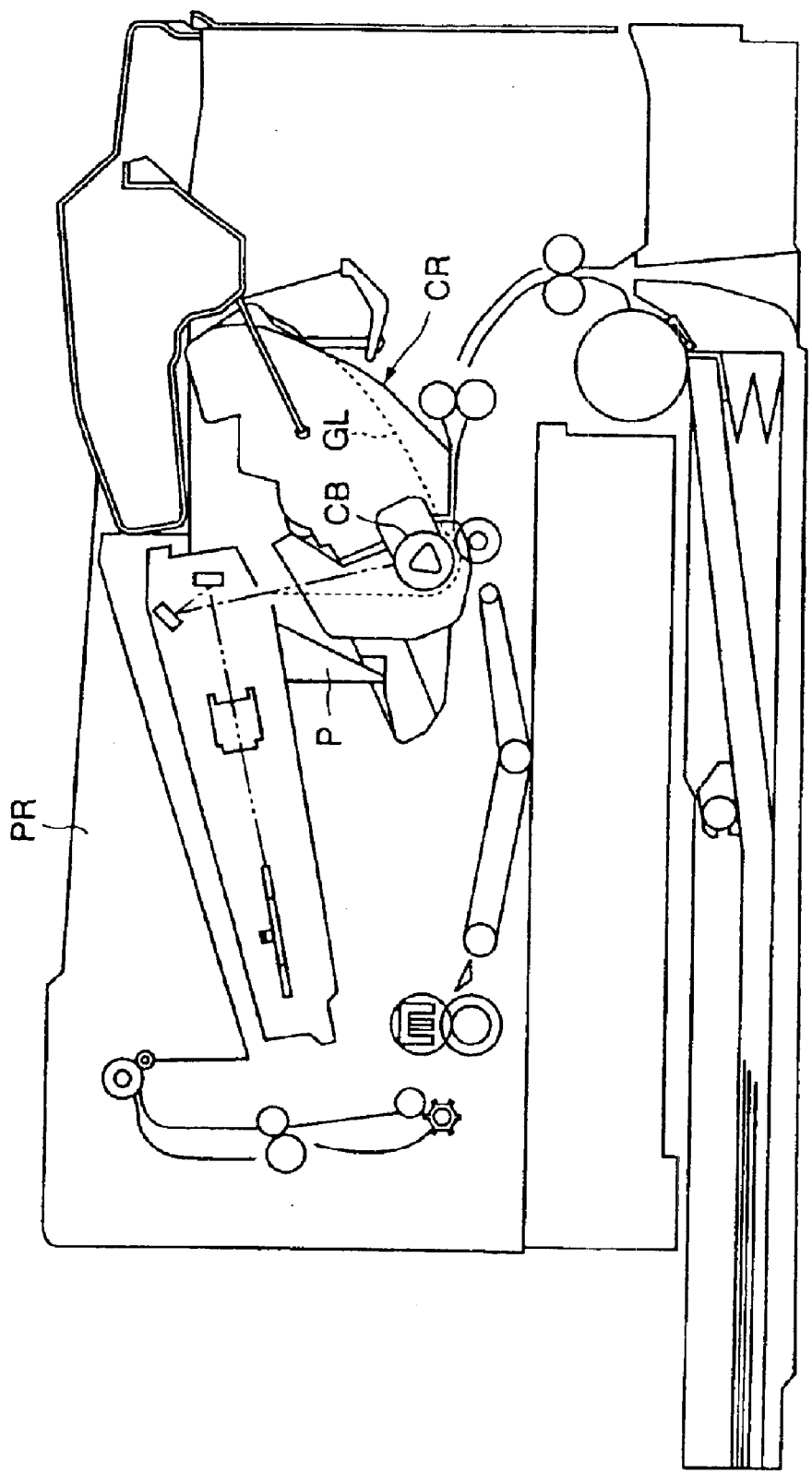
FIG. 33 is a schematic sectional view of an image forming apparatus in accordance with the prior arts, which is properly holding the process cartridge in accordance with the prior arts.

In this embodiment, the triangular coupling portion 7a1, which receives the driving force from the image forming apparatus main assembly A0, is on the inward side of the side holder 107, in terms of the drum-shaft direction. With this positional arrangement, the process cartridge B does not need to be provided with dedicated positioning portions, such as the cover portion 50 of the triangular coupling portion 7a1 and projection 51 of the process cartridge in accordance with the prior arts, shown in FIG. 31, which function as a positioning portion (positioning boss CB) and a guide, respectively. Therefore, it is possible to make the cartridge size smaller compared to a cartridge in accordance with the prior arts.

Figure 22:
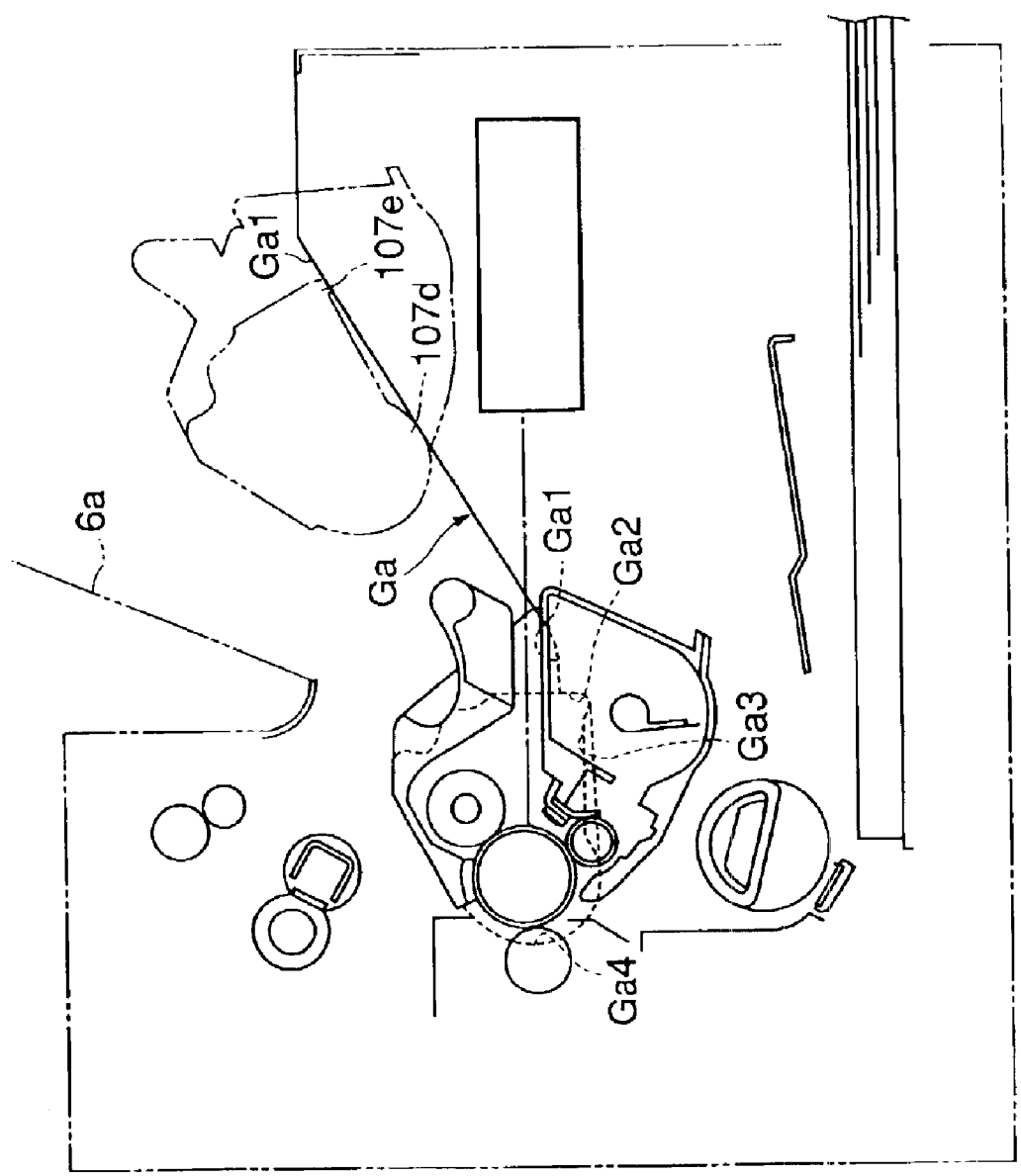
FIG. 22 is a schematic sectional view of an image forming apparatus, illustrating how the process cartridge is mounted into the image forming apparatus.

Referring to FIGS. 22 and 24, the image-forming-apparatus main assembly A0 is provided with a guiding portion Ga as a first guide which guides the process cartridge B into the image-formation position (properly mounted position), by the aforementioned arcuate portion 107d and rotation-control portion 107e of the process cartridge B; the arcuate portion 107d and the rotation-control portion 107e are rested on the guiding portion Ga and are allowed to slide thereon.

On the other hand, the process cartridge B is provided with a projection 102a for covering the drum-supporting shaft 100, and a projection 102b for controlling the process-cartridge position during the mounting or removal of the process cartridge B. The projections 102a and 102b protrude from the end surface of the drum-supporting frame 102 on the side opposite to the end surface with the side holder 107, in terms of the drum-shaft direction, as will be easily understood with reference to FIG. 3 in addition to FIGS. 22 and 24.

Figure 23:
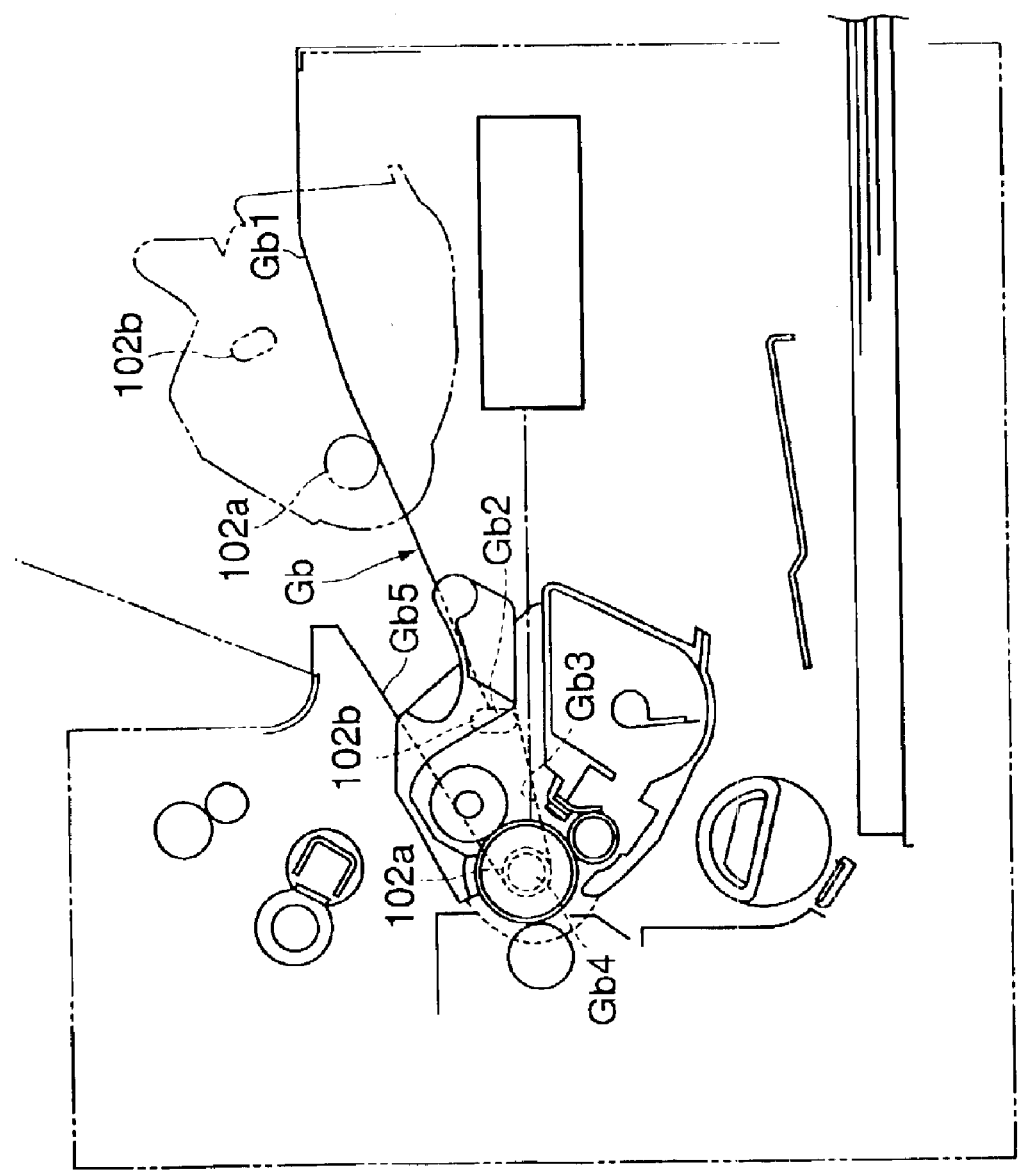
FIG. 23 is a schematic sectional view of the image forming apparatus, illustrating how the process cartridge is mounted into the image forming apparatus.
Figure 25:
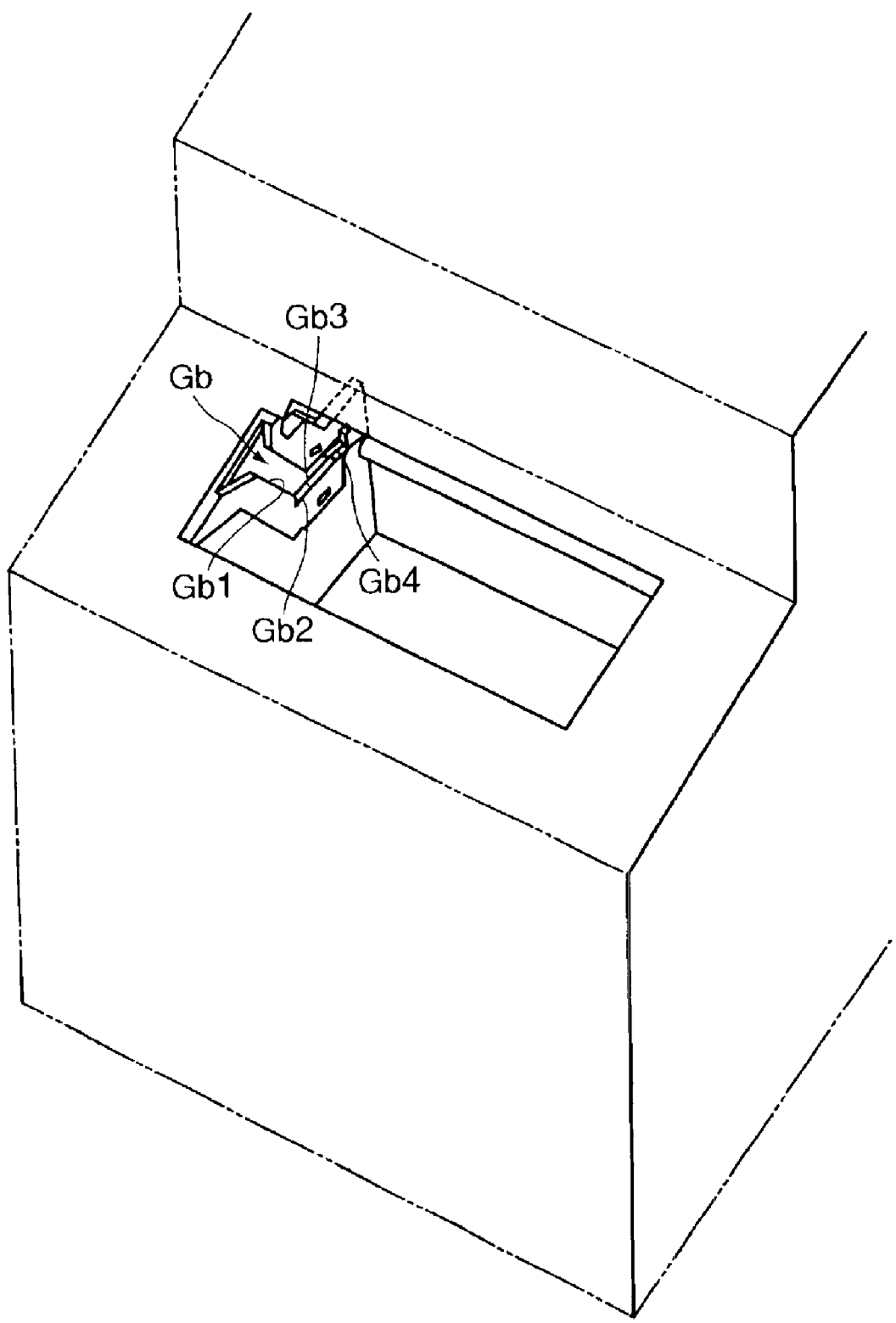
FIG. 25 is a perspective view of the other cartridge-guiding portion of the image forming apparatus, in the preferred embodiment of the present invention.

Further, referring to FIGS. 23 and 25, the image-forming-apparatus main assembly A0 is provided with a guiding portion Gb as a second cartridge guide on the main-assembly side, which coordinates with the side holder 107 in order to maintain the attitude of the process cartridge B set by the side holder 107 so that the process cartridge B does not become tilted relative to the drum-shaft direction.

Next, referring to FIGS. 22–25, the steps to be followed in order to mount the process cartridge B into the image-forming-apparatus main assembly A0 will be described.

First, a lid 6a which also serves as a delivery tray 6 of the image forming apparatus main assembly A0 is opened to expose the guiding portions Ga and Gb of the apparatus main assembly A0. Then, the process cartridge B is to be held so that its arcuate portion 107d and the rotation-control portion 107e are on the front and rear sides, respectively, as indicated by the single-dot line in FIGS. 22 and 23. Then, the arcuate portion 107d and the rotation-control portion 107e are to be rested on the first guiding surface Ga1, the front portion of which is somewhat undulatory, while holding the process cartridge B in the above-described manner. On the other side, therefore, the projections 102a and 102b of the process cartridge B are rested on the first guiding surface Gb1 of the guiding portion Gb.

Then, the process cartridge B set in the above-described manner is to be pushed into the image forming apparatus main assembly A0.

As the process cartridge B is pushed, the arcuate portion 107d and the rotation-control portion 107e of the process cartridge B are guided to their designated image-formation positions, while sliding on, and being thereby guided by, the second guiding surface Ga2 of the guiding portion Ga, which is roughly perpendicular to the first guiding surface Ga1, the third guiding surface Ga3 of the guiding portion Ga, which roughly horizontally extends from the bottom of the second guiding surface Ga2, and the fourth guiding surface Ga4 of the guiding portion Ga, which extends from the inward end of the third guiding surface Ga3 in an arcuately dipping manner.

As a result, the process cartridge B rests on the third guiding surface Ga3, with its arcuate portion 107d being in contact with the fourth guiding surface Ga4, as a first portion of catching and supporting the process cartridge B, and the curved surface of the rear portion of the rotation-control portion 107e being in contact with the second guiding surface Ga2, as shown in FIG. 26. In this state, the transfer roller 4 and the photoconductive drum 7 have come into contact with each other, and therefore, the process cartridge B has come under pressure working in the direction indicated by an arrow mark in FIG. 26. As a result, the third contact portion 107g is placed in contact with the second guiding surface Ga2 adjacent to the third guiding surface Ga3, preventing the positional deviation of the process cartridge B. The third contact portion 107g may be either integral with the second contact portion (rotation-control portion) 107e, or discrete.

On the other hand, the projections 102a and 102b, which are on the other side of the process cartridge B, are guided to their designated image-formation positions while sliding on, and being thereby guided by, the second guiding surface Gb2 of the guiding portion Gb, which is roughly perpendicular to the first guiding surface Gb1, the third guiding surface Gb3 of the guiding portion Gb, which roughly horizontally extends from the bottom of the second guiding surface Gb2, and the fourth guiding surface Gb4 of the guiding portion Gb, which extends from the inward end of the third guiding surface Gb3 in an arcuately dipping manner.

Figure 28:
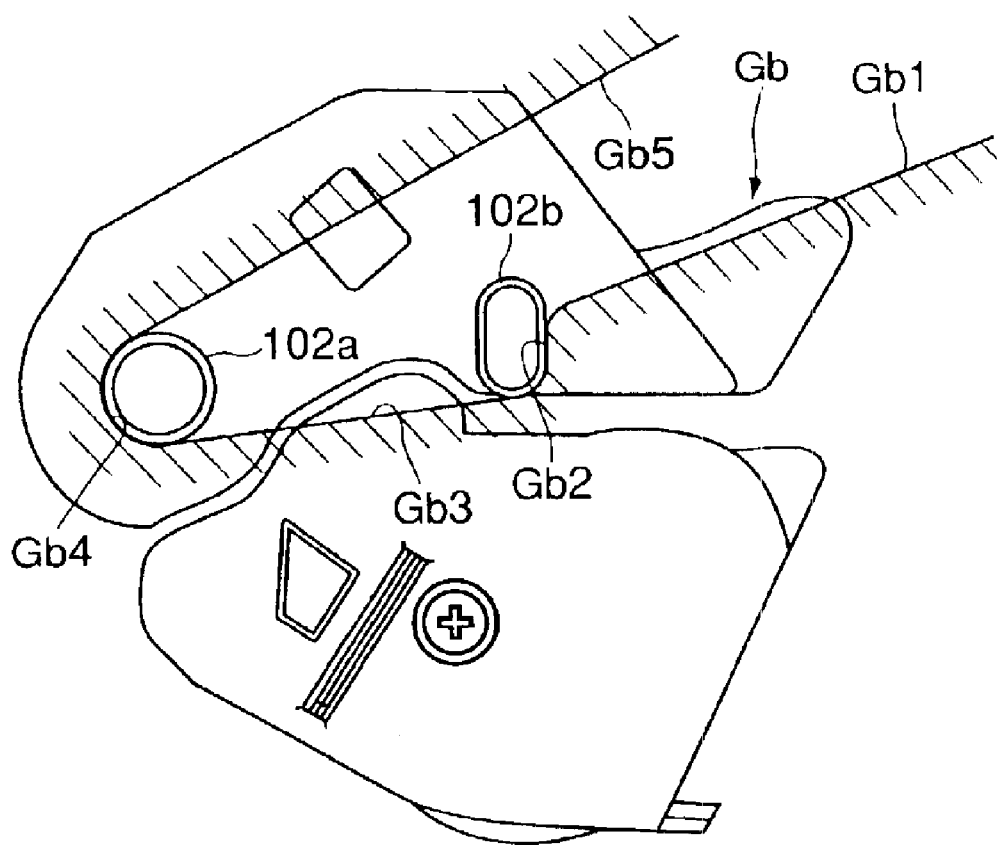
FIG. 28 is a drawing for illustrating how the process cartridge is accurately positioned relative to the image forming apparatus.

As a result, the process cartridge B rests on the third guiding surface Gb3, with its projections 102a and 102b being between the fourth guiding surface Gb4, as a second portion for catching and supporting the process cartridge B, and the second guiding surface Gb2, as shown in FIG. 28.

As a result, the process cartridge B is mounted into the proper position in the apparatus main assembly. Next, the lid 6a of the image-forming-apparatus main assembly A0 is to be closed. As the lid 6a is closed, the triangular coupling portion 7a1 of the cartridge B couples with the driving-force transmitting member 200, shown in FIG. 24, having the roughly triangular twisted hole, allowing the rotational driving force to be transmitted from the image-forming-apparatus main assembly A0 to the process cartridge B.

Figure 27:
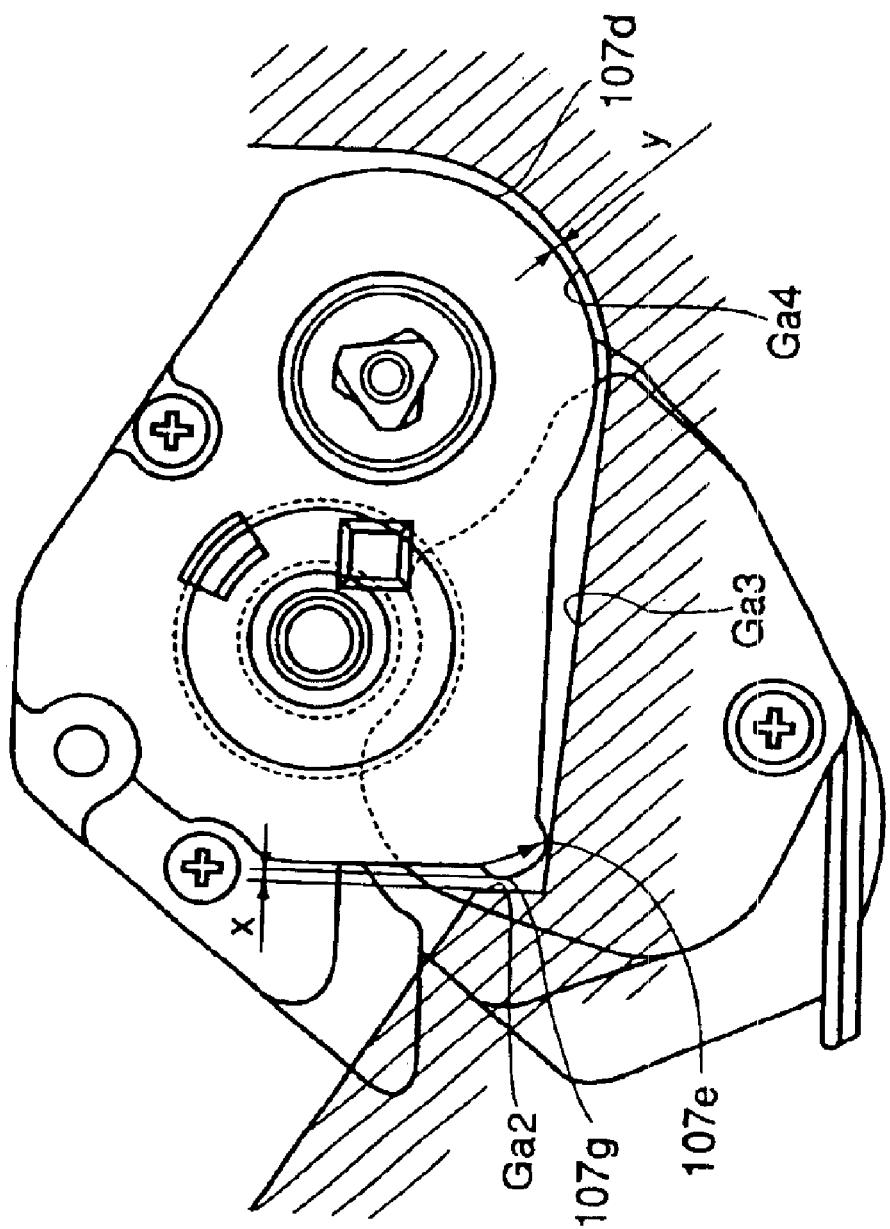
FIG. 27 is a drawing for illustrating how the process cartridge is accurately positioned relative to the image forming apparatus.

As a result, the process cartridge B is rotated about the rotational axis of the triangular coupling portion 7a1 having coupled as shown in FIG. 27, which coincides with the rotational axis of the photoconductive drum 7. Consequently, gaps x and y are created between the arcuate portion 107d and contact portion 107g of the process cartridge B, and the fourth guiding surface Ga4 and second guiding surface Ga2 of the guiding portion Ga, respectively, and the rotation-control portion 107e of the side holder 107 comes into contact with the third guiding surface Ga3, as a regulating surface, of the guiding portion Ga, fixing thereby the attitude of the process cartridge B in terms of the rotation of the process cartridge B about the rotational axis of the photoconductive drum 7.

On the other side of the process cartridge B in terms of the drum-shaft direction, as the process cartridge B is mounted into the image-forming-apparatus main assembly A0, the projection 102a of the drum-supporting frame 102, the axial line of which coincides with that of the photoconductive drum 7, settles into the U-shaped groove, as a cartridge-positioning portion, that is, the fourth guiding surface Gb4, and is kept there by the force generated by the resiliency of the transfer roller 4 and the force from a spring (unshown) for preventing the formation of a blurred image traceable to the driving of the process cartridge B. As for the other projection, that is, the projection 102b, of the drum-supporting frame 102, it is designed in position and size so that after the proper mounting of the process cartridge B into the image-forming-apparatus main assembly A0, it remains in non-contact with the image-forming-apparatus main assembly A0, as long as the component dimension errors and assembly errors of the image-forming-apparatus main assembly A0 are within the normal tolerance.

The above-described attitude of the process cartridge B is the attitude in which the process cartridge B is kept during an image-forming operation. Thus, an image-forming operation can be started as soon as the process cartridge B assumes this attitude in the image-forming-apparatus main assembly A0.

In order to extract the process cartridge B from the image-forming-apparatus main assembly A0, the above-described cartridge mounting steps are to be carried out in reverse. As the process cartridge B is pulled, the process cartridge B comes out of the apparatus main assembly, with the arcuate portion 107d and the rotation-control portion 107e sliding on the guiding portion Ga, and the projections 102a and 102b sliding on the guiding portion Gb. During this process of extracting the process cartridge B from the image-forming-apparatus main assembly A0, the arcuate portion 107d, and the top surface 107f opposing the rotation-control portion 107e across the cartridge mounting space, function as the cartridge-position controlling means on the side holder side 107 side, and the projections 102a and 102b function as the cartridge-position controlling means on the side opposite to the side holder 107 side.

In particular, when the process cartridge B is removed from the image-formation position, the projection 102b comes into contact with the fifth guiding surface Gb5, which is the top surface of the guiding portion Gb, preventing thereby the front side of the process cartridge B, in terms of the cartridge-extraction direction, from rotating upward more than a predetermined angle.

Figure 29:
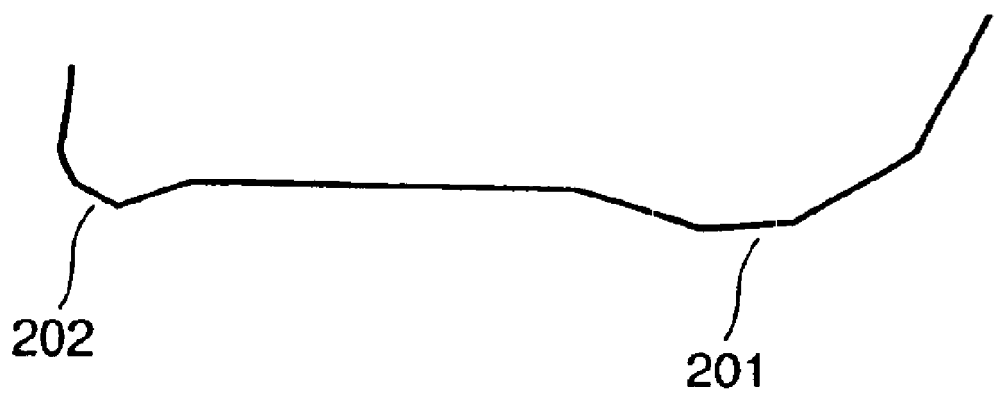
FIG. 29 is a schematic drawing of one of the modifications of the contact portions of the process cartridge in accordance with the present invention.
Figure 30:
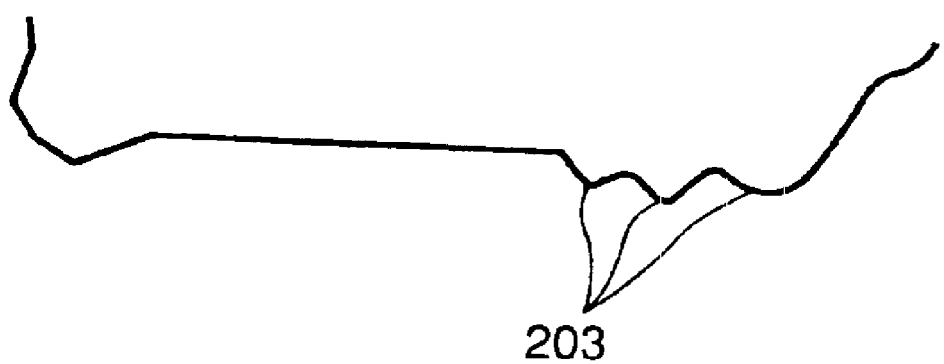
FIG. 30 is a schematic drawing of another modification of the contact portion of the process cartridge in accordance with the present invention.

It is not mandatory that the contours of the above-described first, second, and third contact portions of the process cartridge B are as described above. For example, the first and second contact portions may be polygonal (202 and 201, respectively) as shown in FIG. 29. Further, the second contact portion may have ridges 203 as shown in FIG. 30, as long as the counters of these contact portions perform the above-described cartridge-positioning functions. It is preferable, however, that the first, second, and third contact portions of the process cartridge B are arcuate, because when they are arcuate, a part of the second contact portion is allowed to come into contact with the fourth guiding surface Ga4, even if the process cartridge B deviates in attitude due to the tolerance in component dimension.

The above-described embodiment of the present invention is compatible with various well-known developing methods, for example, the two-component magnetic-brush developing method, the cascade-developing method, the touch-down developing method, cloud developing, etc.

As for the electrophotographic photoconductive substance compatible with the above described embodiment, such a photoconductive substance as amorphous silicon, amorphous selenium, zinc oxide, titanium oxide, and various organic photoconductors, can be included. Incidentally, the photoconductive drum in this embodiment comprises a cylinder formed of aluminum alloy or the like, and a layer of photoconductive substance is placed on the entirety of the peripheral surface of the cylinder by deposition, painting, or the like.

As for the material for the drum-supporting frame, the toner-storage developing-means frame, frame lid, etc., of a process cartridge in accordance with the present invention, there are such plastics as polystyrene, ABS (acrylonitrile-butadiene-styrene copolymer), denatured PPE resin (polyphenylene-ether), denatured PPO resin (polyphenylene oxide), polycarbonate, polyethylene, polypropylene, etc.

The above-described process cartridge is, for example, a cartridge comprising an electrophotographic photoconductive member, a developing means, and at least one more processing means. In other words, the present invention is compatible with: a cartridge in which an electrophotographic photoconductive member, a developing means, and a charging means are integrally disposed, and which is removably mountable in the main assembly of an image forming apparatus; a cartridge in which an electrophotographic photoconductive member and a developing means are integrally disposed, and which is removably mountable in the main assembly of an image forming apparatus; and the like, in addition to the process cartridge B in the above-described embodiment of the present invention.

In other words, the present invention is also compatible with: a cartridge in which an electrophotographic photoconductive member, and a charging means or a developing means, are integrally disposed, and which is removably mountable in an image forming apparatus; a process cartridge in which a charging means, a developing means, and an electrophotographic photoconductive member are integrally disposed, and which is removably mountable in an image forming apparatus; and a cartridge in which a minimum of a developing means and an electrophotographic photoconductive member are integrally disposed, and which is removably mountable in an image forming apparatus.

The image forming apparatus in the above described embodiment of the present invention is a laser-beam printer. However, the application of the present invention is not limited to a laser-beam printer. In other words, the present invention is also applicable to various image forming apparatuses other than a laser-beam printer, for example, an electrophotographic copying machine, a facsimile apparatus, a wordprocessor, etc., which is obvious.

As described above, the present invention makes it possible to more reliably mount a process cartridge into the main assembly of an image forming apparatus, and remove the process cartridge therefrom, compared to the prior arts. Further, the present invention makes it possible to more accurately position a process cartridge relative to the main assembly of an image forming apparatus, compared to the prior arts. Further, the present invention makes it possible to keep a process cartridge more stable in attitude during an image-forming operation, compared to the prior arts.

While the invention has been described with reference to the structures disclosed herein, it is not confined to the details set forth, and this application is intended to cover such modifications or changes as may come within the purposes of the improvements or the scope of the following claims.

What is claimed is:

1. A process cartridge detachably mountable to a main assembly of an electrophotographic image forming apparatus, said process cartridge comprising:

an electrophotographic photosensitive drum;

a process device actable on said electrophotographic photosensitive drum;

a first contact portion, provided on a bottom surface of a cartridge frame portion of said process cartridge, the cartridge frame portion being provided at one longitudinal end of said electrophotographic photosensitive drum and configured and positioned to support one longitudinal end portion of said electrophotographic photosensitive drum, wherein said first contact portion is guided by a first main assembly guide provided in the main assembly of the apparatus when said process cartridge is mounted to a mounting position in the main assembly of the apparatus, wherein said first contact portion is disposed at a leading portion of said process cartridge with respect to a mounting direction in which said process cartridge is mounted to the mounting position, and said first contact portion is mounted to contact a first main assembly receiving portion provided in the main assembly of the apparatus when said process cartridge is mounted to the mounting position;

a cartridge coupling disposed above said first contact portion when said process cartridge is mounted to the mounting position, said cartridge coupling being engageable with a main assembly coupling provided in the main assembly of the apparatus to receive a rotational driving force from the main assembly of the apparatus;

a second contact portion provided on the bottom surface of the cartridge frame portion of said process cartridge provided at the one longitudinal end of said electrophotographic photosensitive drum, wherein said second contact portion is disposed upstream of said first contact portion with respect to the mounting direction, wherein said second contact portion is effective to limit rotation of said process cartridge in a rotational direction of said electrophotographic photosensitive drum when said process cartridge mounted to the mounting position receives the rotational driving force from the main assembly of the apparatus; and a positioning portion projected outwardly from another cartridge frame portion of said process cartridge, the another cartridge frame portion being provided at the other longitudinal end of said electrophotographic photosensitive drum and being configured and positioned to support the other longitudinal end portion of said electrophotographic photosensitive drum, wherein said positioning portion is guided by a second main assembly guide provided in the main assembly of the apparatus when said process cartridge is mounted to the mounting position of the main assembly of the apparatus, and is positioned to contact a second main assembly receiving portion provided in the main assembly of the apparatus when said process cartridge is mounted to the mounting position.

2. A process cartridge according to claim 1, wherein said process device further comprises a charging roller configured and positioned to electrically charge said electrophotographic photosensitive drum, and a developing roller configured and positioned to develop an electrostatic latent image formed on said electrophotographic photosensitive drum and wherein the main assembly of the apparatus includes a transfer roller configured and positioned to transfer a developed image formed on said electrophotographic photosensitive drum onto a recording material, and wherein the rotational driving force is effective to rotate said electrophotographic photosensitive drum, said charging roller, said developing roller, and the transfer roller.

3. A process cartridge according to claim 1 or 2, wherein a leading side surface of said cartridge coupling is inward of an outer surface of said cartridge frame portion and is provided at the one longitudinal end of said electrophotographic photosensitive drum.

4. A process cartridge according to claim 1 or 2, wherein said second contact portion is an arcuate portion disposed at a corner portion of said cartridge frame portion which is provided at the one longitudinal end of said electrophotographic photosensitive drum.

5. A process cartridge according to claim 1 or 2, further comprising a mounting guide provided on the outside of the cartridge frame portion and which is provided at the other longitudinal end of said electrophotographic photosensitive drum, wherein said mounting guide is disposed upstream of said positioning portion with respect to the mounting direction, and wherein when said process cartridge is mounted to the mounting position, said mounting guide is guided by the second main assembly guide.

6. A process cartridge according to claim 1, wherein said process device further comprises a charging roller configured and positioned to electrically charge said electrophotographic photosensitive drum, and a developing roller configured and positioned to develop an electrostatic latent image formed on said electrophotographic photosensitive drum, and wherein the main assembly of the apparatus includes a transfer roller configured and positioned to transfer a developed image formed on said electrophotographic photosensitive drum onto a recording material, wherein said process cartridge further comprises a first helical gear and a second helical gear juxtaposed in the longitudinal direction of said electrophotographic photosensitive drum in the order named on the leading portion of said process cartridge with respect to the mounting direction and disposed above said first contact portion when said process cartridge is mounted to the mounting position, wherein said first helical gear is disposed on an outer side of said electrophotographic photosensitive drum, wherein when said process cartridge is mounted to the mounting position, said first helical gear is effective to transmit, to the transfer roller, a rotational driving force for rotating the transfer roller and to transmit, to said charging roller a rotational driving force for rotating said charging roller, and wherein said second helical gear is spaced from the outer side of said electrophotographic photosensitive drum, and wherein when said process cartridge is mounted to the mounting position, said second helical gear is effective to transmit, to said developing roller, a rotational driving force for rotating said developing roller.

7. A process cartridge according to claim 1, wherein said process device further comprises a developing roller configured and positioned to develop an electrostatic latent image formed on said electrophotographic photosensitive drum.

wherein the cartridge frame portion is a drum supporting frame, wherein one longitudinal end of said electrophotographic photosensitive drum is supported by the drum supporting frame, wherein one longitudinal end of said developing roller is supported by a developing device frame of said process cartridge, and wherein said drum supporting frame is disposed outside said developing device frame with respect to the longitudinal direction of said electrophotographic photosensitive drum.

8. A process cartridge according to claim 1, wherein said positioning portion, when said process cartridge is removed from the mounting position, contacts an upper surface of the second main assembly guide to prevent upward rotation of a leading side of said process cartridge beyond a predetermined degree with respect to a removing direction in which said process cartridge is removed from the mounting position.

9. An electrophotographic image forming apparatus for forming an image on a recording material, to which a process cartridge is detachably mountable, said apparatus comprising:

(i) a first main assembly guide provided in a main assembly of said electrophotographic image forming apparatus;

(ii) a first main assembly receiving portion provided in the main assembly of said electrophotographic image forming apparatus;

(iii) a second main assembly guide provided in the main assembly of said electrophotographic image forming apparatus;

(iv) a second main assembly receiving portion provided in the main assembly of said electrophotographic image forming apparatus; and (v) a mounting portion configured and positioned to detachably mount a process cartridge, which includes an electrophotographic photosensitive drum, a process device actable on the photosensitive drum, and a first contact portion provided on a bottom surface of a cartridge frame portion of the process cartridge, the cartridge frame portion being provided at one longitudinal end of the photosensitive drum and configured and positioned to support one longitudinal end portion of the photosensitive drum, the first contact portion being guided by said first main assembly guide when the process cartridge is mounted to a mounting position in the main assembly of said electrophotographic image forming apparatus, wherein the first contact portion is disposed at a leading portion of the process cartridge with respect to a mounting direction in which the process cartridge is mounted to the mounting position, and wherein the first contact portion is mounted to contact said first main assembly receiving portion provided in the main assembly of said electrophotographic image forming apparatus when the process cartridge is mounted to the mounting position, the process cartridge further including a cartridge coupling disposed above the first contact portion when the process cartridge is mounted to the mounting position and engageable with a main assembly coupling provided in the main assembly of said electrophotographic image forming apparatus to receive a rotational driving force from the main assembly of said electrophotographic image forming apparatus, and a second contact portion provided on the bottom surface of the cartridge frame portion of the process cartridge provided at the one longitudinal end of the photosensitive drum, the second contact portion being disposed upstream of the first contact portion with respect to the mounting direction, wherein the second contact portion is effective to limit rotation of the process cartridge in a rotational direction of the photosensitive drum when the process cartridge mounted to the mounting position receives the rotational driving force from the main assembly of said electrophotographic image forming apparatus, wherein the process cartridge further includes a positioning portion projected outwardly from another cartridge frame portion of the process cartridge, the another cartridge frame portion being provided at the other longitudinal end of the photosensitive drum and being configured and positioned to support the other longitudinal end portion of the electrophotographic photosensitive drum, the positioning portion being guided by said second main assembly guide when the process cartridge is mounted to the mounting position of the main assembly of said electrophotographic image forming apparatus, and being positioned to contact said second main assembly receiving portion when the process cartridge is mounted to the mounting position.

10. A process cartridge detachably mountable to a main assembly of an electrophotographic image forming apparatus, said process cartridge comprising:

an electrophotographic photosensitive drum;

a process device actable on said electrophotographic photosensitive drum;

a first contact portion provided on a bottom surface of a cartridge frame portion of said process cartridge, the cartridge frame portion being provided at one longitudinal end of said electrophotographic photosensitive drum and being configured and positioned to support one longitudinal end of said electrophotographic photosensitive drum, wherein said first contact portion is guided by a first main assembly guide provided in the main assembly of the apparatus when said process cartridge is mounted to a mounting position in the main assembly of the apparatus, wherein said first contact portion is disposed at a leading portion of said process cartridge with respect to a mounting direction in which said process cartridge is mounted to the mounting position, and wherein said first contact portion is mounted to contact a first main assembly receiving portion provided in the main assembly of the apparatus when said process cartridge is mounted to the mounting position; and a limiting portion, provided on the cartridge frame portion at a position behind said first contact portion with respect to the mounting direction, wherein said limiting portion is configured and positioned to limit movement of said process cartridge by an urging force applied to said photosensitive drum from a transferring roller provided in the main assembly of the image forming apparatus when said process cartridge is mounted to the mounting position by contact to a main assembly contact portion provided in the main assembly of the apparatus.

11. A process cartridge according to claim 10, wherein said process device further comprises a charging roller configured and positioned to electrically charge said electrophotographic photosensitive drum, and a developing roller configured and positioned to develop an electrostatic latent image formed on said electrophotographic photosensitive drum, and wherein the transferring roller is configured and positioned to transfer a developed image formed on said electrophotographic photosensitive drum onto a recording material, wherein said process cartridge further comprises a cartridge coupling engageable with a main assembly coupling provided in the main assembly of the apparatus to receive a rotational driving force from the main assembly of the apparatus, wherein said cartridge coupling is disposed at a position which is above said first contact portion when said process cartridge is mounted to the mounting position, wherein when said process cartridge is mounted to said mounting position, said cartridge coupling is engaged with the main assembly coupling to receive a rotational driving force from the main assembly of the apparatus, and wherein the rotational driving force is effective to rotate said photosensitive drum, said charging roller, said developing roller, and the transferring roller.

12. A process cartridge according to claim 11, wherein a leading side surface of said cartridge coupling is positioned inward of an outer surface of said cartridge frame portion provided at the one longitudinal end of said electrophotographic photosensitive drum.

13. A process cartridge according to claim 10 or 11, further comprising a mounting guide provided on the outside of the cartridge frame portion and which is provided at the other longitudinal end of said electrophotographic photosensitive drum, wherein said mounting guide is disposed upstream of said positioning portion with respect to the mounting direction, and wherein when said process cartridge is mounted to the mounting position, said mounting guide is guided by a second main assembly guide.

14. A process cartridge according to claim 10, wherein said process device further comprises a charging roller configured and positioned to electrically charge said electrophotographic photosensitive drum, and a developing roller configured and positioned to develop an electrostatic latent image formed on said electrophotographic photosensitive drum, and wherein the transferring roller is configured and positioned to transfer a developed image formed on said electrophotographic photosensitive drum onto a recording material, wherein said process cartridge further comprises a first helical gear and a second helical gear juxtaposed in the longitudinal direction of said electrophotographic photosensitive drum in the order named on the leading portion of said process cartridge with respect to the mounting direction and disposed above said first contact portion when said process cartridge is mounted to the mounting position, wherein said first helical gear is disposed on an outer side of said electrophotographic photosensitive drum, wherein when said process cartridge is mounted to the mounting position, said first helical gear is effective to transmit, to the transferring roller, a rotational driving force for rotating the transferring roller and to transmit, to said charging roller a rotational driving force for rotating said charging roller, and wherein said second helical gear is spaced from the outer side of said electrophotographic photosensitive drum, and wherein when said process cartridge is mounted to the mounting position, said second helical gear is effective to transmit, to said developing roller, a rotational driving force for rotating said developing roller.

15. A process cartridge according to claim 10, wherein said process device further comprises a developing roller configured and positioned to develop an electrostatic latent image formed on said electrophotographic photosensitive drum, wherein the cartridge frame portion is a drum supporting frame, wherein one longitudinal end of said electrophotographic photosensitive drum is supported by the drum supporting frame, wherein one longitudinal end of said developing roller is supported by a developing device frame of said process cartridge, and wherein said drum supporting frame is disposed outside said developing device frame with respect to the longitudinal direction of said electrophotographic photosensitive drum.

16. An electrophotographic image forming apparatus for forming an image on a recording material, to which a process cartridge is detachably mountable, said apparatus comprising:

(i) a first main assembly guide provided in a main assembly of said electrophotographic image forming apparatus;

(ii) a first main assembly receiving portion provided in the main assembly of said electrophotographic image forming apparatus;

(iii) a main assembly contact portion provided in the main assembly of said electrophotographic image forming apparatus; and (iv) a mounting portion configured and positioned to mount a process cartridge, which includes an electrophotographic photosensitive drum, a process device actable on the photosensitive drum, and a first contact portion provided on a bottom surface of a cartridge frame portion of the process cartridge, the cartridge frame portion being provided at one longitudinal end of the photosensitive drum and configured and positioned to support one longitudinal end of the photosensitive drum, the first contact portion being guided by said first main assembly guide when the process cartridge is mounted to a mounting position in the main assembly of said electrophotographic image forming apparatus, wherein the first contact portion is disposed at a leading portion of the process cartridge with respect to a mounting direction in which the process cartridge is mounted to the mounting position, and wherein the first contact portion is mounted to contact said first main assembly receiving portion provided in the main assembly of said electrophotographic image forming apparatus when the process cartridge is mounted to the mounting position, wherein the process cartridge also includes a limiting portion, provided on the cartridge frame portion at a position behind the first contact portion with respect to the mounting direction, wherein the limiting portion is configured and positioned to limit movement of the process cartridge by an urging force applied to the photosensitive drum from a transferring roller provided in the main assembly of said electrophotographic image forming apparatus when the process cartridge is mounted to the mounting position mounting by contact to said main assembly contact portion.

17. A process cartridge detachably mountable to a main assembly of an electrophotographic image forming apparatus including a transfer roller configured and positioned to transfer a developed image formed on an electrophotographic photosensitive drum of said process cartridge onto a recording material, said process cartridge comprising:

an electrophotographic photosensitive drum;
a process device actable on said electrophotographic photosensitive drum, wherein said process device comprises a charging roller configured and positioned to electrically charge said electrophotographic photosensitive drum, and a developing roller configured and positioned to develop an electrostatic latent image formed on said electrophotographic photosensitive drum;
a first contact portion, provided on a bottom surface of a cartridge frame portion of said process cartridge, the cartridge frame portion being provided at one longitudinal end of said electrophotographic photosensitive drum and configured and positioned to support one longitudinal end portion of said electrophotographic photosensitive drum,
wherein said first contact portion is guided by a first main assembly guide provided in the main assembly of the apparatus when said process cartridge is mounted to a mounting position in the main assembly of the apparatus,
wherein said first contact portion is disposed at a leading portion of said process cartridge with respect to a mounting direction in which said process cartridge is mounted to the mounting position, and said first contact portion is mounted to contact a first main assembly receiving portion provided in the main assembly of the apparatus when said process cartridge is mounted to the mounting position;
a cartridge coupling disposed above said first contact portion when said process cartridge is mounted to the mounting position, said cartridge coupling being engageable with a main assembly coupling provided in the main assembly of the apparatus to receive a rotational driving force from the main assembly of the apparatus;
a second contact portion provided on the bottom surface of the cartridge frame portion of said process cartridge provided at the one longitudinal end of said electrophotographic photosensitive drum,
wherein said second contact portion is disposed upstream of said first contact portion with respect to the mounting direction,
wherein said second contact portion is effective to limit rotation of said process cartridge in a rotational direction of said electrophotographic photosensitive drum when said process cartridge mounted to the mounting position receives the rotational driving force from the main assembly of the apparatus;
a positioning portion projected outwardly from another cartridge frame portion of said process cartridge, the another cartridge frame portion being provided at the other longitudinal end of said electrophotographic photosensitive drum and being configured and positioned to support the other longitudinal end portion of said electrophotographic photosensitive drum,
wherein said positioning portion is guided by a second main assembly guide provided in the main assembly of the apparatus when said process cartridge is mounted to the mounting position of the main assembly of the apparatus, and is positioned to contact a second main assembly receiving portion provided in the main assembly of the apparatus when said process cartridge is mounted to the mounting position,
wherein the rotational driving force is effective to rotate said electrophotographic photosensitive drum, said charging roller, said developing roller and the transfer roller,
wherein said second contact portion is an arcuate portion disposed at a corner portion of said cartridge frame portion which is provided at the one longitudinal end of said electrophotographic photosensitive drum; and
a first helical gear and a second helical gear juxtaposed in the longitudinal direction of said electrophotographic photosensitive drum in the order named on the leading portion of said process cartridge with respect to the mounting direction and disposed above said first contact portion when said process cartridge is mounted to the mounting position,
wherein said first helical gear is disposed on an outer side of said electrophotographic photosensitive drum,
wherein when said process cartridge is mounted to the mounting position, said first helical gear is effective to transmit, to the transfer roller, a rotational driving force for rotating the transfer roller and to transmit, to said charging roller a rotational driving force for rotating said charging roller, and
wherein said second helical gear is spaced from the outer side of said electrophotographic photosensitive drum, and
wherein when said process cartridge is mounted to the mounting position, said second helical gear is effective to transmit, to said developing roller, a rotational driving force for rotating said developing roller.

18. A process cartridge detachably mountable to a main assembly of an electrophotographic image forming apparatus including a transfer roller configured and positioned to transfer a developed image formed on an electrophotographic photosensitive drum of said process cartridge onto a recording material, said process cartridge comprising:

an electrophotographic photosensitive drum;

a process device actable on said electrophotographic photosensitive drum, wherein said process device comprises a charging roller configured and positioned to electrically charge said electrophotographic photosensitive drum, and a developing roller configured and positioned to develop an electrostatic latent image formed on said electrophotographic photosensitive drum;

a first contact portion, provided on a bottom surface of a cartridge frame portion of said process cartridge, the cartridge frame portion being provided at one longitudinal end of said electrophotographic photosensitive drum and configured and positioned to support one longitudinal end portion of said electrophotographic photosensitive drum, wherein said first contact portion is guided by a first main assembly guide provided in the main assembly of the apparatus when said process cartridge is mounted to a mounting position in the main assembly of the apparatus, wherein said first contact portion is disposed at a leading portion of said process cartridge with respect to a mounting direction in which said process cartridge is mounted to the mounting position, and said first contact portion is mounted to contact a first main assembly receiving portion provided in the main assembly of the apparatus when said process cartridge is mounted to the mounting position;

a cartridge coupling disposed above said first contact portion when said process cartridge is mounted to the mounting position, said cartridge coupling being engageable with a main assembly coupling provided in the main assembly of the apparatus to receive a rotational driving force from the main assembly of the apparatus;

a second contact portion provided on the bottom surface of the cartridge frame portion of said process cartridge provided at the one longitudinal end of said electrophotographic photosensitive drum, wherein said second contact portion is disposed upstream of said first contact portion with respect to the mounting direction, wherein said second contact portion is effective to limit rotation of said process cartridge in a rotational direction of said electrophotographic photosensitive drum when said process cartridge mounted to the mounting position receives the rotational driving force from the main assembly of the apparatus;

a positioning portion projected outwardly from another cartridge frame portion of said process cartridge, the another cartridge frame portion being provided at the other longitudinal end of said electrophotographic photosensitive drum and being configured and positioned to support the other longitudinal end portion of said electrophotographic photosensitive drum, wherein said positioning portion is guided by a second main assembly guide provided in the main assembly of the apparatus when said process cartridge is mounted to the mounting position of the main assembly of the apparatus, and is positioned to contact a second main assembly receiving portion provided in the main assembly of the apparatus when said process cartridge is mounted to the mounting position, wherein the rotational driving force is effective to rotate said electrophotographic photosensitive drum, said charging roller, said developing roller, and the transfer roller; and a first helical gear and a second helical gear juxtaposed in the longitudinal direction of said electrophotographic photosensitive drum in the order named on the leading portion of said process cartridge with respect to the mounting direction and disposed above said first contact portion when said process cartridge is mounted to the mounting position, wherein said first helical gear is disposed on an outer side of said electrophotographic photosensitive drum, wherein when said process cartridge is mounted to the mounting position, said first helical gear is effective to transmit, to the transfer roller, a rotational driving force for rotating the transfer roller and to transmit, to said charging roller a rotational driving force for rotating said charging roller, and wherein said second helical gear is spaced from the outer side of said electrophotographic photosensitive drum, and wherein when said process cartridge is mounted to the mounting position, said second helical gear is effective to transmit, to said developing roller, a rotational driving force for rotating said developing roller, and wherein said positioning portion, when said process cartridge is removed from the mounting position, contacts an upper surface of the second main assembly guide to prevent upward rotation of a leading side of said process cartridge beyond a predetermined degree with respect to a removing direction in which said process cartridge is removed from the mounting position.

19. A process cartridge detachably mountable to a main assembly of an electrophotographic image forming apparatus including a transfer roller configured and positioned to transfer a developed image formed on an electrophotographic photosensitive drum of said process cartridge onto a recording material, said process cartridge comprising:

an electrophotographic photosensitive drum;

a process device actable on said electrophotographic photosensitive drum, wherein said process device comprises a charging roller configured and positioned to electrically charge said electrophotographic photosensitive drum and a developing roller configured and positioned to develop an electrostatic latent image formed on said electrophotographic photosensitive drum;

a first contact portion, provided on a bottom surface of a cartridge frame portion of said process cartridge, the cartridge frame portion being provided at one longitudinal end of said electrophotographic photosensitive drum and configured and positioned to support one longitudinal end portion of said electrophotographic photosensitive drum, wherein said first contact portion is guided by a first main assembly guide provided in the main assembly of the apparatus when said process cartridge is mounted to a mounting position in the main assembly of the apparatus, wherein said first contact portion is disposed at a leading portion of said process cartridge with respect to a mounting direction in which said process cartridge is mounted to the mounting position, and said first contact portion is mounted to contact a first main assembly receiving portion provided in the main assembly of the apparatus when said process cartridge is mounted to the mounting position;

a cartridge coupling disposed above said first contact portion when said process cartridge is mounted to the mounting position, said cartridge coupling being engageable with a main assembly coupling provided in the main assembly of the apparatus to receive a rotational driving force from the main assembly of the apparatus;

a second contact portion provided on the bottom surface of the cartridge frame portion of said process cartridge provided at the one longitudinal end of said electrophotographic photosensitive drum, wherein said second contact portion is disposed upstream of said first contact portion with respect to the mounting direction, wherein said second contact portion is effective to limit rotation of said process cartridge in a rotational direction of said electrophotographic photosensitive drum when said process cartridge mounted to the mounting position receives the rotational driving force from the main assembly of the apparatus;

a positioning portion projected outwardly from another cartridge frame portion of said process cartridge, the another cartridge frame portion being provided at the other longitudinal end of said electrophotographic photosensitive drum and being configured and positioned to support the other longitudinal end portion of said electrophotographic photosensitive drum, wherein said positioning portion is guided by a second main assembly guide provided in the main assembly of the apparatus when said process cartridge is mounted to the mounting position of the main assembly of the apparatus, and is positioned to contact a second main assembly receiving portion provided in the main assembly of the apparatus when said process cartridge is mounted to the mounting position, wherein the rotational driving force is effective to rotate said electrophotographic photosensitive drum, said charging roller, said developing roller, and the transfer roller; and a mounting guide provided on the outside of the cartridge frame portion and which is provided at the other longitudinal end of said electrophotographic photosensitive drum, wherein said mounting guide is disposed upstream of said positioning portion with respect to the mounting direction, and wherein when said process cartridge is mounted to the mounting position, said mounting guide is guided by the second main assembly guide.

20. A process cartridge detachably mountable to a main assembly of an electrophotographic image forming apparatus including a transfer roller configured and positioned to transfer a developed image formed on an electrophotographic photosensitive drum of said process cartridge onto a recording material, said process cartridge comprising:

an electrophotographic photosensitive drum;

a process device actable on said electrophotographic photosensitive drum, wherein said process device comprises a charging roller configured and positioned to electrically charge said electrophotographic photosensitive drum, and a developing roller configured and positioned to develop an electrostatic latent image formed on said electrophotographic photosensitive drum;

a first contact portion, provided on a bottom surface of a cartridge frame portion of said process cartridge, the cartridge frame portion being provided at one longitudinal end of said electrophotographic photosensitive drum and configured and positioned to support one longitudinal end portion of said electrophotographic photosensitive drum, wherein said first contact portion is guided by a first main assembly guide provided in the main assembly of the apparatus when said process cartridge is mounted to a mounting position in the main assembly of the apparatus, wherein said first contact portion is disposed at a leading portion of said process cartridge with respect to a mounting direction in which said process cartridge is mounted to the mounting position, and said first contact portion is mounted to contact a first main assembly receiving portion provided in the main assembly of the apparatus when said process cartridge is mounted to the mounting position;

a cartridge coupling disposed above said first contact portion when said process cartridge is mounted to the mounting position, said cartridge coupling being engageable with a main assembly coupling provided in the main assembly of the apparatus to receive a rotational driving force from the main assembly of the apparatus;

a second contact portion provided on the bottom surface of the cartridge frame portion of said process cartridge provided at the one longitudinal end of said electrophotographic photosensitive drum, wherein said second contact portion is disposed upstream of said first contact portion with respect to the mounting direction, wherein said second contact portion is effective to limit rotation of said process cartridge in a rotational direction of said electrophotographic photosensitive drum when said process cartridge mounted to the mounting position receives the rotational driving force from the main assembly of the apparatus;

a positioning portion projected outwardly from another cartridge frame portion of said process cartridge, the another cartridge frame portion being provided at the other longitudinal end of said electrophotographic photosensitive drum and being configured and positioned to support the other longitudinal end portion of said electrophotographic photosensitive drum, wherein said positioning portion is guided by a second main assembly guide provided in the main assembly of the apparatus when said process cartridge is mounted to the mounting position of the main assembly of the apparatus, and is positioned to contact a second main assembly receiving portion provided in the main assembly of the apparatus when said process cartridge is mounted to the mounting position; and a first helical gear and a second helical gear juxtaposed in the longitudinal direction of said electrophotographic photosensitive drum in the order named on the leading portion of said process cartridge with respect to the mounting direction and disposed above said first contact portion when said process cartridge is mounted to the mounting position, wherein said first helical gear is disposed on an outer side of said electrophotographic photosensitive drum, wherein when said process cartridge is mounted to the mounting position, said first helical gear is effective to transmit, to the transfer roller, a rotational driving force for rotating the transfer roller and to transmit, to said charging roller a rotational driving force for rotating said charging roller, and wherein said second helical gear is spaced from the outer side of said electrophotographic photosensitive drum, and wherein when said process cartridge is mounted to the mounting position, said second helical gear is effective to transmit, to said developing roller, a rotational driving force for rotating said developing roller, and wherein said positioning portion, when said process cartridge is removed from the mounting position, contacts an upper surface of the second main assembly guide to prevent upward rotation of a leading side of said process cartridge beyond a predetermined degree with respect to a removing direction in which said process cartridge is removed from the mounting position.

21. A process cartridge according to claim 1, 17, 18, 19 or 20, wherein said cartridge coupling includes a twisted projection having a triangular cross-section.

* * * * *

UNITED STATES PATENT AND TRADEMARK OFFICE
CERTIFICATE OF CORRECTION

PATENT NO. : 6,937,832 B2
DATED : August 30, 2005
INVENTOR(S) : Minoru Sato et al.

It is certified that error appears in the above-identified patent and that said Letters Patent is hereby corrected as shown below:

Title page,
Item [75], Inventors, "Minoru Sato, Shizuoka-Ken (JP)" should read -- Minoru Sato, Numazu (JP) --; "Yoshiyuki Batori, Shizuoka-Ken (JP)" should read -- Yoshiyuki Batori, Mishima (JP) --; and "Masanari Morioka, Shizuoka-Ken (JP)" should read -- Masanari Morioka, Numazu (JP) --.
Item [57], ABSTRACT,
Line 2, "electrophotographic." should read -- electrophotographic apparatus. --.
Line 13, "includes;" should read -- includes: --.

Column 3,
Lines 31 and 66, "above described" -- above-described --.

Column 4,
Line 29, "thereof" should read -- thereof. --.

Column 12,
Line 20, "arc" should read -- are --.

Column 15,
Line 3, "train in" should read -- train --.

Column 16,
Line 50, "toner-scaling" should read -- toner sealing --.

Column 17,
Line 20, "fist" should read -- first --.
Line 26, "110g," should read -- 10gl, --.

Column 21,
Line 21, "comer" should read -- corner --.

Column 24,
Line 28, "above described" should read -- above-described --.

Column 25,
Line 3, "above described" should read -- above-described --.

Column 26,
Line 44, "comer" should read -- corner --.

UNITED STATES PATENT AND TRADEMARK OFFICE
CERTIFICATE OF CORRECTION

PATENT NO. : 6,937,832 B2
DATED : August 30, 2005
INVENTOR(S) : Minoru Sato et al.

It is certified that error appears in the above-identified patent and that said Letters Patent is hereby corrected as shown below:

Column 27,
Line 30, "drum." should read -- drum, --.

Column 34,
Line 48, "drum" should read -- drum, --.

Signed and Sealed this

Eleventh Day of April, 2006

JON W. DUDAS
*Director of the United States Patent and Trademark Office*